United States Patent
Sheldon-Coulson et al.

(10) Patent No.: US 10,578,075 B2
(45) Date of Patent: Mar. 3, 2020

(54) SELF-PROPELLED BUOYANT ENERGY CONVERTER AND METHOD FOR DEPLOYING SAME

(71) Applicants: Garth Alexander Sheldon-Coulson, Moorpark, CA (US); Brian Lee Moffat, Simi Valley, CA (US)

(72) Inventors: Garth Alexander Sheldon-Coulson, Moorpark, CA (US); Brian Lee Moffat, Simi Valley, CA (US)

(73) Assignee: Lone Gull Holdings, Ltd., Portland, OR (US)

( * ) Notice: Subject to any disclaimer, the term of this patent is extended or adjusted under 35 U.S.C. 154(b) by 0 days.

(21) Appl. No.: 15/902,581

(22) Filed: Feb. 22, 2018

(65) Prior Publication Data

US 2018/0245564 A1     Aug. 30, 2018

Related U.S. Application Data

(60) Provisional application No. 62/622,879, filed on Jan. 27, 2018, provisional application No. 62/533,058, (Continued)

(51) Int. Cl.
    *F03B 13/18*      (2006.01)
    *F03B 13/20*      (2006.01)
    (Continued)

(52) U.S. Cl.
     CPC .......... *F03B 13/189* (2013.01); *F03B 13/142* (2013.01); *F03B 13/183* (2013.01); *F03B 13/1805* (2013.01); *F03B 13/1875* (2013.01); *F03B 13/1885* (2013.01); *F03B 13/20* (2013.01); *F03D 3/002* (2013.01); *F03D 3/005* (2013.01); *F03D 3/065* (2013.01); *F03D 3/068* (2013.01); *F03D 13/10* (2016.05); *F03D 13/25* (2016.05); *H02K 7/075* (2013.01); *F05B 2210/16* (2013.01); *F05B 2240/133* (2013.01); *F05B 2240/212* (2013.01); *F05B 2240/40* (2013.01); *F05B 2240/93* (2013.01); *F05B 2240/931* (2013.01); *F05B 2240/96* (2013.01); (Continued)

(58) Field of Classification Search
     CPC ........ F03B 13/189; F03B 13/10; F03B 13/25; F03B 13/142; F03B 13/1805; F03B 13/183; F03B 13/1875; F03B 13/1885; F03B 13/20; F03D 3/002; F03D 3/005; F03D 3/065; F03D 3/068
See application file for complete search history.

(56) References Cited

U.S. PATENT DOCUMENTS 3,965,364 A * 6/1976 Gustafson ............. F03B 13/183
                                                    290/53
4,123,185 A * 10/1978 Hagen ..................... E02B 3/062
                                                   405/76

(Continued)

*Primary Examiner* — Tara Mayo-Pinnock
(74) *Attorney, Agent, or Firm* — Fulwider Patton LLP

(57) ABSTRACT

Disclosed is a novel method, process, and system (hereinafter "method" or "process") for deploying, stationing, and translocating buoyant wind- and wave-energy converters and/or other buoyant structures or devices, as well as farms of same. Also disclosed is a novel apparatus and/or machine comprising a farm of buoyant wave energy converters deployed by said method and/or configured to be deployed by said method.

3 Claims, 48 Drawing Sheets

Related U.S. Application Data filed on Jul. 16, 2017, provisional application No. 62/473,361, filed on Mar. 18, 2017, provisional application No. 62/463,629, filed on Feb. 25, 2017.

(51) Int. Cl.
| | |
|---|---|
| *F03D 3/00* | (2006.01) |
| *F03D 3/06* | (2006.01) |
| *H02K 7/075* | (2006.01) |
| *F03B 13/14* | (2006.01) |
| *F03D 13/25* | (2016.01) |
| *F03D 13/10* | (2016.01) |

(52) U.S. Cl.
CPC ....... *F05B 2240/97* (2013.01); *F05B 2270/18* (2013.01); *Y02E 10/38* (2013.01); *Y02E 10/727* (2013.01)

(56) References Cited

U.S. PATENT DOCUMENTS

| | | | | |
|---|---|---|---|---|
| 4,159,427 | A * | 6/1979 | Wiedemann | B63H 13/00 290/55 |
| 5,555,838 | A * | 9/1996 | Bergman | B63B 35/44 114/265 |
| 6,100,600 | A * | 8/2000 | Pflanz | B01D 61/58 290/54 |
| 2003/0193197 | A1* | 10/2003 | Hibbs | F03B 13/183 290/53 |
| 2007/0046027 | A1* | 3/2007 | Stewart | F03B 13/1815 290/43 |
| 2007/0173141 | A1* | 7/2007 | Hine | B63H 1/36 440/13 |
| 2009/0175685 | A1* | 7/2009 | Bowers | E02B 1/003 405/52 |
| 2009/0295167 | A1* | 12/2009 | Clidaras | F03B 13/20 290/55 |
| 2016/0003213 | A1* | 1/2016 | Yu | F03B 13/183 416/6 |

\* cited by examiner

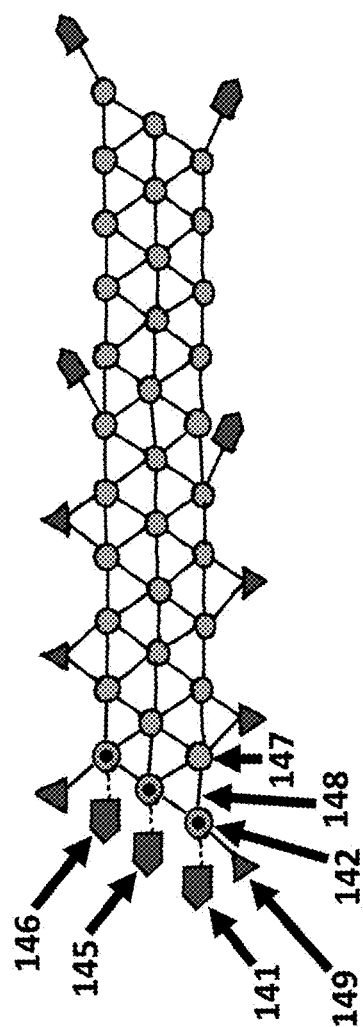
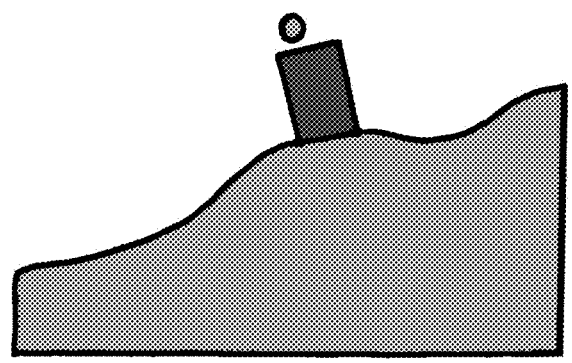
FIG. 7

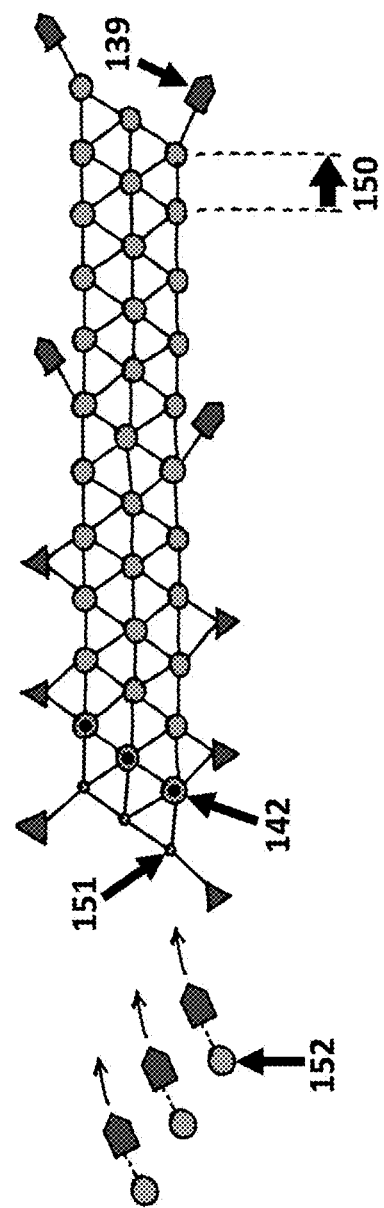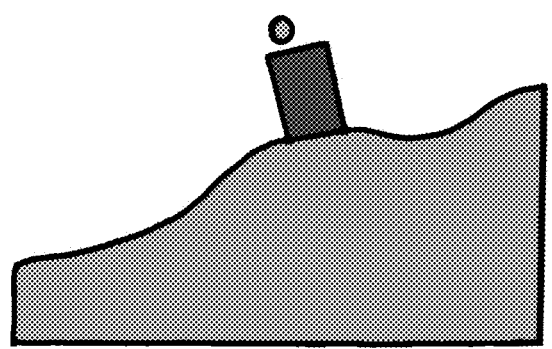
FIG. 8

SELF-PROPELLED BUOYANT ENERGY CONVERTER AND METHOD FOR DEPLOYING SAME

CROSS-REFERENCES TO RELATED APPLICATIONS

This application claims priority from Provisional Patent Application No. 62/463,629, filed Feb. 25, 2017; Provisional Patent Application No. 62/473,361, filed Mar. 18, 2017; Provisional Patent Application No. 62/533,058, filed Jul. 16, 2017; and Provisional Patent Application No. 62/622,879, filed Jan. 27, 2018; the contents of which are incorporated herein by reference in their entireties.

BACKGROUND

In the prior art, buoyant wave energy converters ("converters") are typically deployed in a "static" fashion, meaning that during deployment a converter is operatively connected to at least one mooring and/or anchor and consequently the converter is not able to move significantly from its position of initial deployment after said initial deployment. Unless a ship or boat returns to move or decommission the converter, or unless there is a catastrophic failure of the moorings, the converter will remain approximately at its designated location. The approximate and/or average position of the converter will remain approximately static, at least within a margin of a few tens of meters, because the converter's movement will be constrained by its moorings and/or anchors. Although the converter may be able to move laterally within a range of a few tens of meters owing to slack in its mooring lines and/or the (typically unintentional) gradual sliding of its anchor(s) along the seafloor, by and large the converter's geographical position will remain relatively fixed.

Farms of multiple wave energy converters are typically deployed in a similar manner, each converter being deployed "statically" so that it does not move significantly from its initial deployment location. If, for example, a farm of 100 converters is to be deployed, each of those converters will typically be deployed statically, by preselecting a location and then deploying the converter statically at that location. Typically, a converter is towed to a specific location by boat or ship, or carried to that location on the deck of a boat or ship, whereupon it is anchored and/or moored by a crew, typically by anchoring it to the seafloor using an anchor or driven pile or screw. With respect to farms of wave energy converters, this static deployment method is analogous to the standard method of deploying wind turbines in a wind farm, each wind turbine having a fixed position and/or location determined by the longitude and latitude where that turbine's tower is sunk into the earth and/or seafloor. In the typical method of deploying converters, as in the typical method of deploying wind turbines, each device is deployed at its selected location and will remain at that location for the duration of its operative life. Consequently, although the size of a farm may grow through the addition of new converters, each individual converter in the farm does not move.

A disadvantage of this "static" deployment method is that deploying a farm consisting of a large number of converters typically involves towing or carrying a large number of converters out to their selected static positions in the ocean and using crews to moor and configure the converters at those locations. In challenging ocean conditions typical of wave energy converter deployments, the mooring and configuring of devices in this manner can be dangerous. And, owing to the large number of towing "trips" required to deploy a large number of converters, the "static" deployment method tends to be costly.

SUMMARY OF THE INVENTION

This disclosure, as well as most of the discussion regarding same, is made in reference to the deployment of farms of ocean wave energy converters. However, the scope of this disclosure applies with equal force and equal benefit to the deployment of a set, collection, group, and/or farm, of any type and/or combination of buoyant structure, machine, device, vessel, floating wind turbine, and/or ocean energy device.

This disclosure, as well as most of the discussion regarding same, is made in reference to the deployment of farms of wave energy converters on the surface of an ocean. However, the scope of this disclosure applies with equal force and equal benefit to the deployment of wave energy converters and/or other devices on the surface of an inland sea, a lake, and/or any other body of water or fluid.

The disclosed novel method of deploying a farm of buoyant wave energy converters involves the "extrusion" of the farm by growing it outward from one edge of the farm (an "expanding edge"), at or near an original deployment location (a "root location"), over the course of days, weeks, months, and/or years. Individual ones of the converters move, shift, migrate, or are projected away from the root location as time passes, while new converters are deployed behind them (at or near the expanding edge of the farm) and mutually interlinked with them. At least some of the converters of the farm move, i.e. change position, after being initially deployed. The farm as a whole, or at least some portion of the farm, translates along and/or across the surface of the ocean to accommodate the addition of further converters at or near the root location.

The earlier-deployed converters and the later-deployed converters form part of the same mutually interconnected network of converters. The extent of the farm (the area of ocean that it covers) increases over time through the addition of further converters at, near, and/or adjacent to the root, i.e. at the "base" or "expanding edge" of the growing farm. The extruded farm forms, in various embodiments, the shape of an elongate strand, the shape of an approximately rectangular array, and/or the shape of a tentacle. The shape of the farm is not essential and those skilled in the art will choose a shape, and a pattern and/or plan for "growing" that shape, that is appropriate to a given deployment.

As a farm is extruded, the farm as a whole (or at least some plurality of converters within it) translates laterally through space as it grows and/or spreads (i.e. along and/or across the surface of the ocean), entailing that at least some individual ones of the converters do not maintain an approximately static position, but rather move to new positions on the water's surface as the farm grows. Individual ones of the converters can cumulatively move many kilometers or tens of kilometers or more as a farm grows.

The mechanisms and/or methods disclosed herein, facilitate not only the progressive and/or extrusive deployment of farms of converters, but also, in at least some embodiments, the translocation of portions and/or entire farms in response to factors, conditions, and/or considerations including, but not limited to, those involving, at least in part:
- seasonal weather patterns
- local, national, and/or international politics
- local, national, and/or international economics piracy, warfare, and/or conflict
humanitarian needs.

An individual converter may move slowly and continuously throughout the entire time period of the farm's growth (in which case the farm is "continuously extruded," e.g. at a rate and in a direction controlled by the farm's operator), or it may move in "spurts" as part of discrete "extrusion operations" initiated by the farm's operator (at times controlled by the farm's operator). In either case, extrusion involves the translation or shifting of at least some existing converters away from a root location so that further converters can be added behind them and operatively interlinked with the farm. At some point in time, the farm operator may decide that the farm has reached its maximum extent and shall no longer grow. At that time, the operator can turn the farm into a "static" farm wherein there is no further movement of the converters. Or, the operator may use the mechanisms within the farm that support the farm's migration and/or movement in order to shift the location of the farm, and/or a portion thereof, in response to changing weather conditions and/or changing opportunities or needs.

The "operator" may be partially or entirely automated, e.g. a computerized and/or artificially-intelligent controlling system, or an operator may be guided and/or assisted by such an automated system and cooperative elements of control may be incorporated into a farm in order to facilitate such automated, and/or partially automated, control of an extruded farm's position and/or changes in position.

A variety of means are disclosed to cause and/or to allow the converters to take their designated position within an extruded farm and/or to move away from a root location. In an embodiment, propulsive units are included within the farm and are interlinked with the converters. Such propulsive units can include buoys having motor-driven propellers. Such propulsive units can include buoys having wave-driven propulsive flaps. In an embodiment, the converters have propulsive components such as propellers or wave-driven propulsive flaps. In an embodiment, the farm or portions of the farm are moved by tug boats or other marine vessels. The exact means of propelling the farm, or any portion thereof, away from a root location, and/or from a respective expanding edge or base, is not essential to the disclosure, and all means are included within the scope of this disclosure.

In a preferred embodiment, the farm is in operation (e.g. produces electricity and transmits it to shore) at the same time that, or at some of the same times that, it is being extruded. Thus, means are provided for maintaining an operative electrical connection between a farm and an electrical grid, and/or end-user, on shore even while the farm is being extruded, i.e. even while new converters are being added and/or while the farm is translating and/or moving and/or displacing away from its root location(s).

The period over which a farm is extruded can be many months or years. A farm can be extruded and/or grown to be of indefinite size.

In an embodiment, the farm is grown at its expanding edge or base, at the farm's root location, through the addition of individual converters, i.e. one-by-one. In an embodiment, the farm is grown at its expanding edge or base, at the farm's root location, through the addition of pre-connected segments, and/or sub-groups, consisting of multiple pre-interlinked converters.

In a preferred embodiment, the farm forms a single operative unit wherein some or all of the converters are interlinked with one another using linkages such as chains, said linkages being adapted and configured to maintain the approximate positions of some of the converters relative to others of the converters. In an embodiment, some or all of the linkages are configured to be adjacent to the surface. In an embodiment, some or all of the linkages contain elements and/or assemblies configured to give the linkages an elastic and/or expandable quality, thereby giving to the farm a flexible and/or dynamically positionally-restoring character. In an embodiment, some or all of the linkages carry insulated conducting wire(s) adapted to transmit electricity within and/or among converters, and/or enabling the converters to transmit the electricity they generate at least in part across linkages to one or more shared power transmission cables and thereby to shore. In some embodiments, the electricity, and/or a portion thereof, produced by the converters is used at sea for a useful purpose, e.g. creating aerosols for the purpose of seeding clouds and increasing the earth's albedo.

In some embodiments, submerged bypasses are provided within the farm allowing boats to pass though the farm where in the absence of the bypasses linkages might otherwise obstruct their passage.

An advantage of the disclosed method and apparatus is that it avoids the need for converters to be initially deployed (i.e. "hooked up") far from shore. Instead, many, if not all, converters can be initially deployed and/or added to the farm close to shore, at or near the "root" of the farm, where ocean conditions are milder and where there is easier and/or more proximate access by boats from shore. In one embodiment, converters are initially deployed from a dock or platform at the shoreline, or from an offshore platform like an oil rig. The disclosed method reduces, and/or eliminates, the need for crews to hook up the electrical connections of converters in high seas. And, there is a reduced need, if not the absence of a need, for a large number of "trips" to tow devices out to distant operative locations, saving time and expense.

For the purpose of the current disclosure, "propulsion" represents a thrust, and/or force, generated by an object, mechanism, machine, device, system, and/or module, that moves a corresponding "propelled" object, e.g., a wave energy conversion device, in a direction.

Self-Propelled Wave Energy Converter

Disclosed herein is a self-propelled, free-floating wave energy conversion (WEC) device.

A self-propelled WEC embodiment of the present disclosure generates electrical power (and/or another generates another useful form of energy and/or performs useful work) in response to the forces and/or motions imparted to it by passing waves.

A self-propelled WEC embodiment comprises a buoy and a flexibly connected "inertial mass" (i.e., a negatively buoyant object, such as a water-filled vessel) suspended from the buoy at a depth below the buoy. A lower end of the flexible connector is connected to the inertial mass. The flexible connector may be of any type, including, but not limited to: ropes, steel cables, synthetic cables, chains, and/or linkages.

In a self-propelled WEC embodiment, an upper end of the flexible connector is connected to a pulley that is rotatably connected to a power take-off (PTO) mechanism. An embodiment rotatably connects its pulley to the rotor of a generator. Another rotatably connects its pulley to a crankshaft that drives hydraulic pistons thereby pressurizing hydraulic fluid which rotates a hydraulic motor which energizes an electrical generator.

In a self-propelled WEC embodiment, an upper end of the flexible connector is connected to a "linear" PTO in which the linear extension of a PTO element generates electrical power or compresses a gas or fluid. In an embodiment, an upper end of the flexible connector pulls the shaft (e.g., containing magnets) of a linear generator. In an embodiment, an upper end of the flexible connector pulls an hydraulic piston thereby compressing hydraulic fluid.

A self-propelled WEC embodiment comprises a buoy and a flexibly connected constricted tube suspended from the buoy at a depth below the buoy. A lower end of the flexible connector is connected to an upper end of the constricted tube, and an upper end of the flexible connector is connected to the buoy. Within a constricted portion of the tube is a turbine which rotates in response to the passage of water through the tube. And, a generator rotatably connected to the turbine generates electrical power in response to the turbine's rotation.

As the buoy moves up and down in response to the passage of waves, the constricted tube is moved up and down through water in which the surface wave motion is substantially absent. The inertia of the water inside the tube causes it to resist the up and down accelerations of the tube, which, in turn, causes it to move past and/or through the turbine thereby generating electrical power.

A self-propelled WEC embodiment propels itself by means of thrust generated by a rigid sail. A self-propelled WEC embodiment propels itself by means of thrust generated by a ducted fan. A self-propelled WEC embodiment propels itself by means of thrust generated by a motor-driven propeller. A self-propelled WEC embodiment propels itself by means of thrust generated by a motor-driven jet of water. A self-propelled WEC embodiment propels itself by means of thrust generated by a rigid vertical panel that can be rotated about a vertical axis so as to adjust the angle at which a wind strikes a planar surface of the panel. A self-propelled WEC embodiment propels itself by means of thrust generated by a Flettner Rotor. A self-propelled WEC embodiment propels itself by means of thrust generated by surge-driven propulsive flaps. A self-propelled WEC embodiment propels itself by means of thrust generated by heave-driven propulsive flaps.

A self-propelled WEC embodiment utilizes at least a portion of its generated electrical power to energize and/or operate computational circuits, computers, CPUs, GPUs, TPUs, memory circuits, digital networks, routers, switches, and/or other digital data processing mechanisms, systems, modules, and/or machines.

A self-propelled WEC embodiment utilizes at least a portion of its generated electrical power to energize and/or operate chemical processing mechanisms, systems, modules, and/or machines, e.g., to produce hydrogen, ammonia, and/or other chemicals.

The scope of the present disclosure includes, but is not limited to, self-propelled WEC embodiments that incorporate, utilize, energize, and/or include, any and every type of wave-energy conversion device, mechanism, system, module, and/or machine.

The scope of the present disclosure includes, but is not limited to, self-propelled WEC embodiments that incorporate, utilize, energize, and/or include, any and every type of PTO.

The scope of the present disclosure includes, but is not limited to, self-propelled WEC embodiments that incorporate, utilize, energize, control, operate, and/or include, any and every type of propulsion.

The scope of the present disclosure includes, but is not limited to, self-propelled WEC embodiments that incorporate, utilize, energize, and/or include, any and every type of energy-consuming mechanism, system, module, and/or machine, with and/or through which at least a portion of the power generated by the embodiment is consumed.

Surface Drone-Propelled Wave Energy Converter

Disclosed herein is a free-floating wave energy conversion (WEC) device that generates electrical power (and/or another generates another useful form of energy and/or performs useful work) in response to the forces and/or motions imparted to it by passing waves.

An embodiment includes a flexibly connected free-floating self-propelled drone, buoy, vessel, mechanism, system, module, and/or machine. The self-propelled drone generates thrust and pulls the embodiment across the surface of the body of water on which the embodiment floats. A drone-propelled embodiment energizes its drone with at least a portion of the power that it generates in response to wave motion, e.g., power that is transmitted to the drone via an electrical cable attached to, and/or incorporated within, the flexible connector which tethers it to the buoy portion of the embodiment.

The drone of a drone-propelled WEC embodiment propels itself by means of thrust generated by a rigid sail. The drone of a drone-propelled WEC embodiment propels itself by means of thrust generated by a ducted fan. The drone of a drone-propelled WEC embodiment propels itself by means of thrust generated by a motor-driven propeller. The drone of a drone-propelled WEC embodiment propels itself by means of thrust generated by a motor-driven jet of water. The drone of a drone-propelled WEC embodiment propels itself by means of thrust generated by a rigid vertical panel that can be rotated about a vertical axis so as to adjust the angle at which a wind strikes a planar surface of the panel. The drone of a drone-propelled WEC embodiment propels itself by means of thrust generated by a Flettner Rotor. The drone of a drone-propelled WEC embodiment propels itself by means of thrust generated by surge-driven propulsive flaps. The drone of a drone-propelled WEC embodiment propels itself by means of thrust generated by heave-driven propulsive flaps.

A drone-propelled WEC embodiment comprises a buoy and a flexibly connected "inertial mass" (i.e., a negatively buoyant object, such as a water-filled vessel) suspended from the buoy at a depth below the buoy. A lower end of the flexible connector is connected to the inertial mass. The flexible connector may be of any type, including, but not limited to: ropes, steel cables, synthetic cables, chains, and/or linkages.

In a drone-propelled WEC embodiment, an upper end of the flexible connector is connected to a pulley that is rotatably connected to a power take-off (PTO) mechanism. An embodiment rotatably connects its pulley to the rotor of a generator. Another rotatably connects its pulley to a crankshaft that drives hydraulic pistons thereby pressurizing hydraulic fluid which rotates a hydraulic motor which energizes an electrical generator.

In a drone-propelled WEC embodiment, an upper end of the flexible connector is connected to a "linear" PTO in which the linear extension of a PTO element generates electrical power or compresses a gas or fluid. In an embodiment, an upper end of the flexible connector pulls the shaft (e.g., containing magnets) of a linear generator. In an embodiment, an upper end of the flexible connector pulls an hydraulic piston thereby compressing hydraulic fluid.

A drone-propelled WEC embodiment comprises a buoy and a flexibly connected constricted tube suspended from the buoy at a depth below the buoy. A lower end of the flexible connector is connected to an upper end of the constricted tube, and an upper end of the flexible connector is connected to the buoy. Within a constricted portion of the tube is a turbine which rotates in response to the passage of water through the tube. And, a generator rotatably connected to the turbine generates electrical power in response to the turbine's rotation.

As the buoy moves up and down in response to the passage of waves, the constricted tube is moved up and down through water in which the surface wave motion is substantially absent. The inertia of the water inside the tube causes it to resist the up and down accelerations of the tube, which, in turn, causes it to move past and/or through the turbine thereby generating electrical power.

A drone-propelled WEC embodiment utilizes at least a portion of its generated electrical power to energize and/or operate computational circuits, computers, CPUs, GPUs, TPUs, memory circuits, digital networks, routers, switches, and/or other digital data processing mechanisms, systems, modules, and/or machines.

A drone-propelled embodiment utilizes at least a portion of its generated electrical power to energize and/or operate chemical processing mechanisms, systems, modules, and/or machines, e.g., to produce hydrogen, ammonia, and/or other chemicals.

The scope of the present disclosure includes, but is not limited to, drone-propelled embodiments that incorporate, utilize, energize, and/or include, any and every type of wave-energy conversion device, mechanism, system, module, and/or machine.

The scope of the present disclosure includes, but is not limited to, drone-propelled embodiments that incorporate, utilize, energize, and/or include, any and every type of PTO.

The scope of the present disclosure includes, but is not limited to, drone-propelled embodiments that incorporate, utilize, energize, control, operate, and/or include, any and every type of flexibly connected free-floating self-propelled drone, buoy, vessel, mechanism, system, module, and/or machine.

The scope of the present disclosure includes, but is not limited to, drone-propelled WEC embodiments that incorporate, utilize, energize, control, operate, and/or include, drones that generate thrust by, and/or through the use of, any and every type of propulsion.

The scope of the present disclosure includes, but is not limited to, drone-propelled embodiments that incorporate, utilize, and/or include, any and every type of flexible connector that connects the wave-energy-conversion buoy to the drone, including, but not limited to: ropes, steel cables, synthetic cables, chains, elastic connectors, and/or linkages.

The scope of the present disclosure includes, but is not limited to, drone-propelled embodiments that incorporate, utilize, energize, and/or include, any and every type of energy-consuming mechanism, system, module, and/or machine, with and/or through which at least a portion of the power generated by the embodiment is consumed.

Sub-Surface Drone-Propelled Wave Energy Converter

Disclosed herein is a free-floating wave energy conversion (WEC) device that generates electrical power (and/or another generates another useful form of energy and/or performs useful work) in response to the forces and/or motions imparted to it by passing waves.

An embodiment includes a flexibly connected submerged self-propelled drone (e.g., an "autonomous underwater vehicle" or AUV), buoy, vessel, mechanism, system, module, and/or machine. The submerged self-propelled drone generates thrust and pulls the embodiment, from a position beneath the embodiment, so as to move the embodiment across the surface of the body of water on which the embodiment floats. An AUV-propelled embodiment energizes its underwater drone with at least a portion of the power that it generates in response to wave motion, e.g., power that is transmitted to the drone via an electrical cable attached to, and/or incorporated within, the flexible connector which tethers it to the buoy portion of the embodiment.

The drone of an AUV-propelled WEC embodiment propels itself by means of thrust generated by a motor-driven propeller. The drone of an AUV-propelled WEC embodiment propels itself by means of thrust generated by a motor-driven jet of water. The drone of an AUV-propelled WEC embodiment propels itself by means of thrust generated by surge-driven propulsive flaps. The drone of an AUV-propelled WEC embodiment propels itself by means of thrust generated by heave-driven propulsive flaps.

An AUV-propelled WEC embodiment comprises a buoy and a flexibly connected "inertial mass" (i.e., a negatively buoyant object, such as a water-filled vessel) suspended from the buoy at a depth below the buoy. A lower end of the flexible connector is connected to the inertial mass. The flexible connector may be of any type, including, but not limited to: ropes, steel cables, synthetic cables, chains, and/or linkages.

In an AUV-propelled WEC embodiment, an upper end of the flexible connector is connected to a pulley that is rotatably connected to a power take-off (PTO) mechanism. An embodiment rotatably connects its pulley to the rotor of a generator. Another rotatably connects its pulley to a crankshaft that drives hydraulic pistons thereby pressurizing hydraulic fluid which rotates a hydraulic motor which energizes an electrical generator.

In an AUV-propelled WEC embodiment, an upper end of the flexible connector is connected to a "linear" PTO in which the linear extension of a PTO element generates electrical power or compresses a gas or fluid. In an embodiment, an upper end of the flexible connector pulls the shaft (e.g., containing magnets) of a linear generator. In an embodiment, an upper end of the flexible connector pulls an hydraulic piston thereby compressing hydraulic fluid.

An AUV-propelled WEC embodiment comprises a buoy and a flexibly connected constricted tube suspended from the buoy at a depth below the buoy. A lower end of the flexible connector is connected to an upper end of the constricted tube, and an upper end of the flexible connector is connected to the buoy. Within a constricted portion of the tube is a turbine which rotates in response to the passage of water through the tube. And, a generator rotatably connected to the turbine generates electrical power in response to the turbine's rotation.

As the buoy moves up and down in response to the passage of waves, the constricted tube is moved up and down through water in which the surface wave motion is substantially absent. The inertia of the water inside the tube causes it to resist the up and down accelerations of the tube, which, in turn, causes it to move past and/or through the turbine thereby generating electrical power.

An AUV-propelled WEC embodiment utilizes at least a portion of its generated electrical power to energize and/or operate computational circuits, computers, CPUs, GPUs, TPUs, memory circuits, digital networks, routers, switches, and/or other digital data processing mechanisms, systems, modules, and/or machines.

An AUV-propelled embodiment utilizes at least a portion of its generated electrical power to energize and/or operate chemical processing mechanisms, systems, modules, and/or machines, e.g., to produce hydrogen, ammonia, and/or other chemicals.

The scope of the present disclosure includes, but is not limited to, AUV-propelled embodiments that incorporate, utilize, energize, and/or include, any and every type of wave-energy conversion device, mechanism, system, module, and/or machine.

The scope of the present disclosure includes, but is not limited to, AUV-propelled embodiments that incorporate, utilize, energize, and/or include, any and every type of PTO.

The scope of the present disclosure includes, but is not limited to, AUV-propelled embodiments that incorporate, utilize, energize, control, operate, and/or include, any and every type of flexibly connected free-floating self-propelled drone, buoy, vessel, mechanism, system, module, and/or machine.

The scope of the present disclosure includes, but is not limited to, AUV-propelled WEC embodiments that incorporate, utilize, energize, control, operate, and/or include, drones that generate thrust by, and/or through the use of, any and every type of propulsion.

The scope of the present disclosure includes, but is not limited to, AUV-propelled embodiments that incorporate, utilize, and/or include, any and every type of flexible connector that connects the wave-energy-conversion buoy to the drone, including, but not limited to: ropes, steel cables, synthetic cables, chains, elastic connectors, and/or linkages.

The scope of the present disclosure includes, but is not limited to, AUV-propelled embodiments that incorporate, utilize, energize, and/or include, any and every type of energy-consuming mechanism, system, module, and/or machine, with and/or through which at least a portion of the power generated by the embodiment is consumed.

Aerial Drone-Propelled Wave Energy Converter

Disclosed herein is a free-floating wave energy conversion (WEC) device that generates electrical power (and/or another generates another useful form of energy and/or performs useful work) in response to the forces and/or motions imparted to it by passing waves.

An embodiment includes a flexibly connected self-propelled aerial drone (e.g., an "unmanned aerial vehicle" or UAV), buoy, vessel, mechanism, system, module, and/or machine. The submerged self-propelled drone generates thrust and pulls the embodiment, from a position beneath the embodiment, so as to move the embodiment across the surface of the body of water on which the embodiment floats. A UAV-propelled embodiment energizes its aerial drone with at least a portion of the power that it generates in response to wave motion, e.g., power that is transmitted to the drone via an electrical cable attached to, and/or incorporated within, the flexible connector which tethers it to the buoy portion of the embodiment.

The drone of a UAV-propelled WEC embodiment propels itself by means of thrust generated by a wing. The drone of a UAV-propelled WEC embodiment propels itself by means of thrust generated by a ducted fan. The drone of a UAV-propelled WEC embodiment propels itself by means of thrust generated by a Flettner Rotor.

A UAV-propelled WEC embodiment comprises a buoy and a flexibly connected "inertial mass" (i.e., a negatively buoyant object, such as a water-filled vessel) suspended from the buoy at a depth below the buoy. A lower end of the flexible connector is connected to the inertial mass. The flexible connector may be of any type, including, but not limited to: ropes, steel cables, synthetic cables, chains, and/or linkages.

In a UAV-propelled WEC embodiment, an upper end of the flexible connector is connected to a pulley that is rotatably connected to a power take-off (PTO) mechanism. An embodiment rotatably connects its pulley to the rotor of a generator. Another rotatably connects its pulley to a crankshaft that drives hydraulic pistons thereby pressurizing hydraulic fluid which rotates a hydraulic motor which energizes an electrical generator.

In a UAV-propelled WEC embodiment, an upper end of the flexible connector is connected to a "linear" PTO in which the linear extension of a PTO element generates electrical power or compresses a gas or fluid. In an embodiment, an upper end of the flexible connector pulls the shaft (e.g., containing magnets) of a linear generator. In an embodiment, an upper end of the flexible connector pulls an hydraulic piston thereby compressing hydraulic fluid.

A UAV-propelled WEC embodiment comprises a buoy and a flexibly connected constricted tube suspended from the buoy at a depth below the buoy. A lower end of the flexible connector is connected to an upper end of the constricted tube, and an upper end of the flexible connector is connected to the buoy. Within a constricted portion of the tube is a turbine which rotates in response to the passage of water through the tube. And, a generator rotatably connected to the turbine generates electrical power in response to the turbine's rotation.

As the buoy moves up and down in response to the passage of waves, the constricted tube is moved up and down through water in which the surface wave motion is substantially absent. The inertia of the water inside the tube causes it to resist the up and down accelerations of the tube, which, in turn, causes it to move past and/or through the turbine thereby generating electrical power.

A UAV-propelled WEC embodiment utilizes at least a portion of its generated electrical power to energize and/or operate computational circuits, computers, CPUs, GPUs, TPUs, memory circuits, digital networks, routers, switches, and/or other digital data processing mechanisms, systems, modules, and/or machines.

A UAV-propelled embodiment utilizes at least a portion of its generated electrical power to energize and/or operate chemical processing mechanisms, systems, modules, and/or machines, e.g., to produce hydrogen, ammonia, and/or other chemicals.

The scope of the present disclosure includes, but is not limited to, UAV-propelled embodiments that incorporate, utilize, energize, and/or include, any and every type of wave-energy conversion device, mechanism, system, module, and/or machine.

The scope of the present disclosure includes, but is not limited to, UAV-propelled embodiments that incorporate, utilize, energize, and/or include, any and every type of PTO.

The scope of the present disclosure includes, but is not limited to, UAV-propelled embodiments that incorporate, utilize, energize, control, operate, and/or include, any and every type of flexibly connected free-floating self-propelled drone, buoy, vessel, mechanism, system, module, and/or machine.

The scope of the present disclosure includes, but is not limited to, UAV-propelled WEC embodiments that incorporate, utilize, energize, control, operate, and/or include, drones that generate thrust by, and/or through the use of, any and every type of propulsion.

The scope of the present disclosure includes, but is not limited to, UAV-propelled embodiments that incorporate, utilize, and/or include, any and every type of flexible connector that connects the wave-energy-conversion buoy to the drone, including, but not limited to: ropes, steel cables, synthetic cables, chains, elastic connectors, and/or linkages.

The scope of the present disclosure includes, but is not limited to, UAV-propelled embodiments that incorporate, utilize, energize, and/or include, any and every type of energy-consuming mechanism, system, module, and/or machine, with and/or through which at least a portion of the power generated by the embodiment is consumed.

Self-Propelled Farms of Energy Converters

Disclosed herein is a free-floating farm comprised of a plurality of linked, and/or flexibly connected, free-floating wave energy conversion (WEC) devices wherein at least one is a "self-propelled WEC embodiment" of the current disclosure of a type including, but not limited to, those described above, e.g., including at least one free-floating WEC which directly incorporates a self-propulsion mechanism, and/or which is flexibly connected to a self-propelled drone.

The free-floating WEC devices, of which the "self-propelled farm embodiment" is comprised, are linked to one another by "inter-device flexible connectors" including, but not limited to: ropes, steel cables, synthetic cables, chains, and/or linkages. A self-propelled farm embodiment includes, incorporates, and/or utilizes, inter-device flexible connectors that are "elastic" and store potential energy when they are pulled to span a length greater than a threshold length, and which contract and return to a length no greater than that threshold length through the release of at least a portion of that stored potential energy when the force pulling its ends apart ends, and/or is sufficiently diminished.

Elastic inter-device flexible connectors can comprise lengths of flexible, but non-stretching cables that connect a first free-floating WEC to a first float, and connect the first float to a submerged weight, and connect the submerged weight to a second float, and connect the second float to a second free-floating WEC. When the separation of the first and second free-floating WECs is no greater than a nominal separation distance, the elastic inter-device flexible connector is relaxed, and the first and second floats float adjacent to one another (e.g., they touch one another and cannot come into closer proximity) and support the weight that tends to hang directly beneath them.

However, when the first and second free-floating WECs are pulled apart, and subsequently become separated by a distance greater than the nominal separation distance, then the first and second floats are pulled apart, and the weight suspended between them is raised to a lesser depth, thereby storing gravitational potential energy. As the weight is raised, and the first and second floats move further apart, the force required to further separate them increases exponentially.

By contrast, then the separating force diminishes or ends, then the raised weight falls, releasing its gravitational potential energy, and simultaneously pulling the first and second floats back together, and thereby pulling the first and second free-floating WECs back to a separation distance no greater than the nominal separation distance.

Elastic inter-device flexible connectors can comprise lengths of cable and/or rope comprised of inherently elastic material, e.g., nylon. An elastic inter-device flexible connector can be comprised of a cable that is wound about a flexible and/or compressible object, such that when subjected to a separating force, the compressible object is compressed which increases the "effective" length of the cable. And, there are other cable designs, materials, configurations, assemblies, and mechanisms, which are sufficient to create elastic inter-device flexible connectors consistent with the current disclosure and all such alternatives, variations, designs, materials, mechanisms, and assemblies, are included within the scope of the current disclosure.

The inter-device flexible connectors can be attached to, and/or incorporate and/or include, an electrical power cable that permits electrical power to be shared between and/or among the interconnected free-floating WECs and/or any other interconnected objects, buoys, vessels, platforms, machines, mechanisms, and/or devices.

The inter-device flexible connectors can be attached to, and/or incorporate and/or include, a network cable that permits digital data to be shared between and/or among the interconnected free-floating WECs and/or any other interconnected objects, buoys, vessels, platforms, machines, mechanisms, and/or devices. Network cables included within the scope of the present disclosure include, but are not limited to, those designed for the purpose of, and/or to transmit: LAN, Internet, Ethernet, digital images, data files, data packets, and TCI/IP.

The inter-device flexible connectors can be attached to, and/or incorporate and/or include, a "signals" cable that permits analog data to be shared between and/or among the interconnected free-floating WECs and/or any other interconnected objects, buoys, vessels, platforms, machines, mechanisms, and/or devices. Signals cables included within the scope of the present disclosure include, but are not limited to, those designed for the purpose of, and/or to transmit, analog sensor values arising from cameras, radars, sonars, antennas, strain gauges, microphones, hydrophones, and thermometers.

A self-propelled farm embodiment includes a "control module," e.g., on one of the free-floating WECs of which the farm is comprised, that determines the desired course and speed of the farm, and controls the propulsion systems on the various WECs in order to achieve that desired course and speed.

The scope of the present disclosure includes, but is not limited to, self-propelled farm embodiments that include any number of two or more interconnected free-floating WECs, of which any number of one or more are self-propelled.

The scope of the present disclosure includes, but is not limited to, self-propelled farm embodiments in which the constituent free-floating WECs are connected, tethered, and/or linked, together, by flexible connectors that incorporate, utilize, and/or include, ropes, steel cables, synthetic cables, chains, and/or linkages.

The scope of the present disclosure includes, but is not limited to, self-propelled farm embodiments in which the constituent free-floating WECs are connected, tethered, and/or linked, together, by elastic flexible connectors that manifest elasticity through the storage and release of potential energies arising from: gravitational forces (i.e., through the raising of weights suspended in water, and/or in air), elastic physical deformations (e.g., "stretching") of materials within the connectors, elastic physical deformations (e.g., "compression") of materials about which the connectors are deviated, diverted, and/or wound, buoyant forces (i.e., through the submergence of buoyant materials, elements, and/or objects, and/or portions thereof, from above to below an upper surface of a body of water), etc.

A self-propelled farm embodiment, and/or one or more of the free-floating WECs or other objects within the embodiment, utilizes at least a portion of its WEC-generated electrical power to energize and/or operate computational circuits, computers, CPUs, GPUs, TPUs, memory circuits, digital networks, routers, switches, and/or other digital data processing mechanisms, systems, modules, and/or machines.

A self-propelled farm embodiment, and/or one or more of the free-floating WECs or other objects within the embodiment, utilizes at least a portion of its generated electrical power to energize and/or operate chemical processing mechanisms, systems, modules, and/or machines, e.g., to produce hydrogen, ammonia, and/or other chemicals.

Included within the scope of the present disclosure is every self-propelled farm embodiment, including, but not limited to, each embodiment that includes, incorporates, and/or operates, a free-floating WEC that extracts power from water waves, and converts it into at least one alternate form of energy, e.g., to electrical power, with, through, and/or by means of, a method, design, mechanism, system, module, technology, and/or machine that includes, but is not limited to, every known and unknown method, design, mechanism, system, module, technology, and/or machine.

Included within the scope of the present disclosure is every self-propelled farm embodiment, including, but not limited to, each embodiment that includes, incorporates, and/or operates, a free-floating WEC that generates power, e.g., electrical power, with, through, and/or by means of, a power-take-off (PTO) method, design, mechanism, system, module, technology, and/or machine that includes, but is not limited to, every known and unknown PTO method, design, mechanism, system, module, technology, and/or machine.

The scope of the present disclosure includes, but is not limited to, surface-water drone-propelled farm embodiments, and/or farm embodiments including one or more surface-water-drone-propelled WECs, that incorporate, utilize, energize, control, operate, and/or include, any and every type of flexibly connected free-floating self-propelled surface-water drone, buoy, vessel, mechanism, system, module, and/or machine.

The scope of the present disclosure includes, but is not limited to, underwater drone-propelled farm embodiments, and/or farm embodiments including one or more underwater-drone-propelled WECs, that incorporate, utilize, energize, control, operate, and/or include, any and every type of flexibly connected self-propelled underwater drone, buoy, vessel, mechanism, system, module, and/or machine.

The scope of the present disclosure includes, but is not limited to, aerial drone-propelled farm embodiments, and/or farm embodiments including one or more aerial-drone-propelled WECs, that incorporate, utilize, energize, control, operate, and/or include, any and every type of flexibly connected self-propelled aerial drone, buoy, vessel, mechanism, system, module, and/or machine.

The scope of the present disclosure includes, but is not limited to, drone-propelled WEC embodiments that incorporate, utilize, energize, control, operate, and/or include, drones that generate thrust by, and/or through the use of, any and every type of propulsion.

The scope of the present disclosure includes, but is not limited to, drone-propelled embodiments that incorporate, utilize, and/or include, any and every type of flexible connector that connects the wave-energy-conversion buoy to the drone, including, but not limited to: ropes, steel cables, synthetic cables, chains, elastic cables, elastic connectors, elastic connectors, and/or linkages.

The scope of the present disclosure includes, but is not limited to, drone-propelled embodiments that incorporate, utilize, energize, and/or include, any and every type of energy-consuming mechanism, system, module, and/or machine, with and/or through which at least a portion of the power generated by the embodiment is consumed.

BRIEF DESCRIPTION OF THE DRAWINGS

FIG. 7 illustrates a conceptual top-down view of the same extruded farm embodiment of the present disclosure illustrated and discussed in relation to FIG. 6.

FIG. 8 illustrates a conceptual top-down view of the same extruded farm embodiment of the present disclosure illustrated and discussed in relation to FIGS. 6 and 7.

DETAILED DESCRIPTION OF THE PREFERRED EMBODIMENTS

Figure 1:
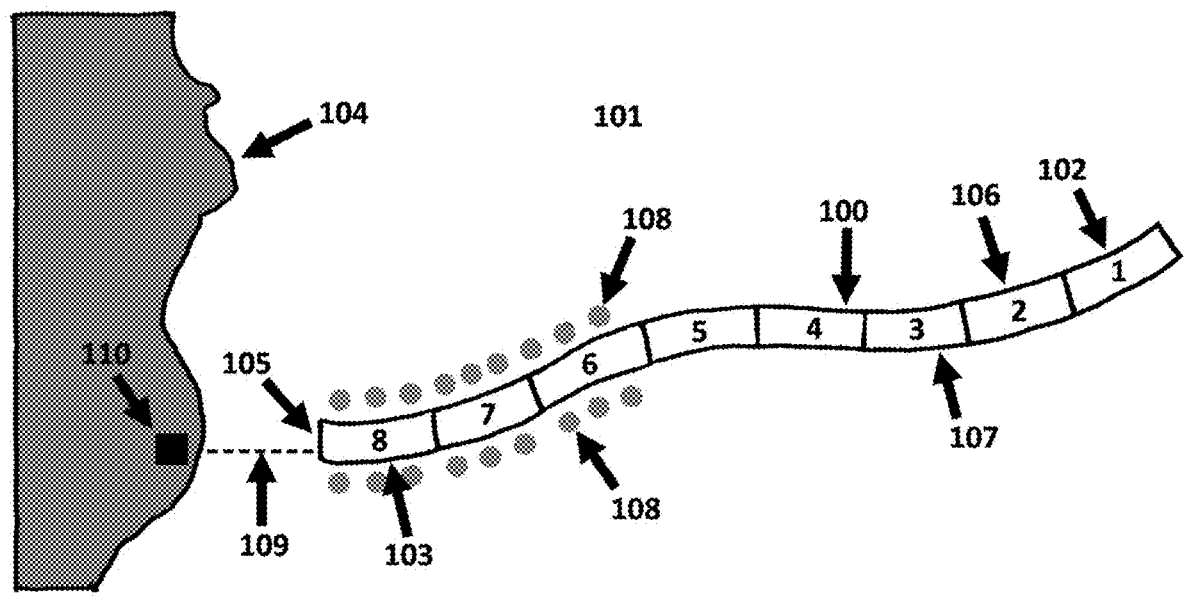
FIG. 1 illustrates a conceptual top-down schematic of an embodiment of the current disclosure.

For a fuller understanding of the nature and objects of the disclosure, reference should be made to the following detailed description, taken in connection with the accompanying drawings, in which:

FIG. 1 illustrates a conceptual top-down schematic of an extruded farm embodiment of the current disclosure.

A farm embodiment of the present disclosure 100 includes a plurality of individual wave energy converters floating on the surface of a body of water 101. The converters are not shown individually in this schematic. The shown farm consists of eight conceptual segments numbered 1 (at 102) through 8 (at 103). The segment numbers indicate the order in which those segments (i.e., the converters within each respective segment) were originally deployed, and/or interlinked with the farm.

Note that the eight shown segments are not necessarily physically differentiated or separated from one another, but rather can be "conceptual segments" meaning that the segment numbers are a means of designating subsets of the farm's converters for explanatory purposes.

With respect to the illustrated farm 100, the length, and/or distance spanned, from the left side of segment 8 (103) to the right side of segment 1 (102) might be, for instance, 5 km.

Shoreline 104 is adjacent to the body of water 101. The length of the pictured section and/or portion of shoreline 104 might be, e.g., 3 km.

Each segment, e.g. 103, contains a plurality of wave energy converters, e.g. about 50 wave energy converters per segment. The converters of each segment can be distributed approximately uniformly or non-uniformly within the segment. The converters of the farm, and hence of each segment, can be interlinked by linkages as shown in subsequent figures (e.g. FIG. 6) so that the converters of the farm all form a single operative unit. The lateral movement of one converter can directly cause and/or promote the lateral movement of other, adjacent converters by creating a tension in, and/or contributing a tension to, at least one of said linkages, and can indirectly cause the lateral movement of other, non-adjacent converters by creating a tension in, and/or contributing a tension to, more than one of said linkages. The structure and function of these linkages is described in greater depth in subsequent figure descriptions.

The linkages of an extruded farm of the current disclosure can be disposed and configured so as to be adjacent to the surface of the body of water. As described below, some of the linkages and/or converters in a farm can be operatively connected to anchors thereby limiting and/or constraining, at least in part, the ability of the farm's converters to move laterally. Such connections to anchors can be temporary so that the connections thereto can be "disconnected" during periods of time when the operator of the farm commences an "extrusion operation" i.e. a lateral translation and/or movement of at least some converters in the farm.

The "root location," or "root," 105 of the farm is the approximate location from which the farm is, and/or has been, "extruded." Every converter in the shown farm was initially deployed at or around the root 105. Segment 1 102 is the "oldest," or earliest-deployed segment in the farm. The converters of segment 1 were the first converters of the farm to be deployed. Subsequently, the converters of segment 2 106 were deployed and linked to converters adjacent to an edge and/or end of segment 1.

Subsequently, the converters of segment 3 107 were deployed and linked to converters adjacent to an edge and/or end of segment 2 106. Hence, the farm "grew" or was "extruded" outward to the right, i.e. toward 102, and/or away from the shore 104, and/or toward and/or into deeper parts of the ocean 101. Segment 8 103 is currently the "youngest" or "most newly deployed" or "latest deployed" segment of this farm, at this time. An end of the farm consisting of relatively newly deployed converters can be referred to as a "base," "root," and/or "expanding edge," of the farm.

Figure 2:
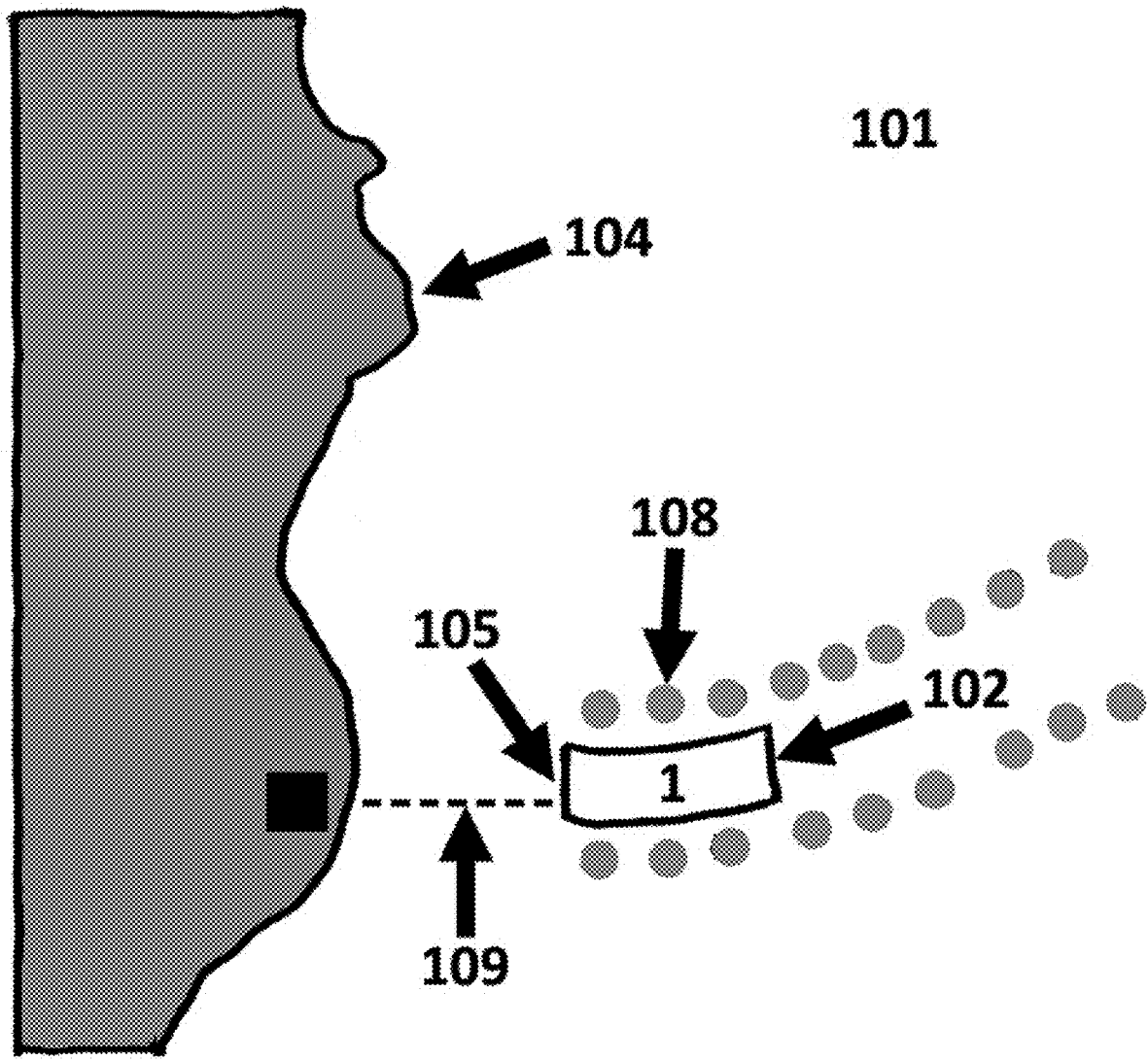
FIG. 2 illustrates a conceptual top-down view of the same extruded farm embodiment of the present disclosure illustrated and discussed in relation to FIG. 1.

At a time when only the converters of segment 1 103 had been deployed, the farm at that time took the form shown in FIG. 2, i.e. the converters of segment 1 were located at, near, or adjacent to the root 105. Before, or at the same time as, further converters were added to the farm, e.g. before or at the same time as the converters of segment 2 106 were added to the farm, the converters of segment 1 102 were caused to move away from their initial deployment locations near the root, toward subsequent locations further away from the root, e.g. toward 102 or toward the right side of the figure.

The "farm extrusion" process of the current disclosure involves converters being added to the farm in one location (i.e. the root location 105) and the moving, translating, shifting, and/or displacement of deployed converters toward different and/or distant locations as the farm grows, e.g. in order to allow new converters to be added to the farm near the root location. For instance, when and/or immediately after the converters of segment 2 106 were added, the converters of segment 2 were located near 105. Subsequently, in order for the farm to later take the form shown in FIG. 1, the converters of segment 2 106 moved toward 102. All the said converters (both the older-deployed and newer-deployed converters) are interlinked in a single megastructure or flotilla.

In the shown embodiment, a multiplicity of propulsive units are interlinked with the converters giving the farm operator the ability to cause the converters to move in the manner described, e.g. rightward and/or away from the shoreline and/or into the open ocean. In the shown embodiment, the propulsive units include buoys having motor-driven propellers, as well as buoys having wave-driven propulsive flaps (i.e. buoys that use specially disposed flaps to convert wave-caused up-and-down movement of the buoys into thrusting forces in a chosen direction). The propulsive units can have remote controlled, location-aware, manual, semi-, and/or fully-automated control systems (e.g. systems that include a GPS locator) so that the operator of the farm can specify and/or control the movements of the converters by issuing commands to the propulsive units remotely, e.g. by sending a signal via a satellite, radio, LAN, or daisy-chained Wi-Fi link.

A plurality of anchors 108 can be disposed around and/or within an entire farm, or a portion of a farm, e.g. with respect to the extruded farm illustrated in FIG. 1, around segments 6 through 8, and are operatively connected to the farm by linkages similar to those used to interconnect the converters of the farm. The individual linkages are not shown in this schematic.

Electrical cable 109 can carry at least some of the electrical output of the farm back to a grid, substation, end user, factory, chemical fuel synthesis facility, etc., on shore, at least some of the time. Electrical cable 109 is operatively connected to at least one converter of the farm at around 105, and/or to a floating or submerged substation or relay interlinked and/or operatively connected to the farm around 105. Electrical cable 109 can be operatively connected to a grid, substation 110, end user, factory, chemical fuel synthesis facility, etc. Electrical cable 1-15 can be floating, submerged, and/or buried under the seafloor.

Farm 100 is shown as having been extruded approximately normal to the shoreline 104. However, the direction and orientation of the extrusion can be any orientation and any direction. For example, the extrusion can be parallel to a shoreline or toward a shoreline. The extrusion can begin near an island. The extrusion can proceed toward an island. The extrusion can begin at or near an offshore platform.

The distance of the root location 105 from shoreline 104 or substation 110 can be any distance. The root location can be near, and/or adjacent to, an offshore platform. It can be near, and/or adjacent to, one or more factory ships. It can be near, and/or adjacent to, one or more islands, atolls, floating communities (e.g. seasteading), etc.

In some embodiments, there is no electrical cable 109 connecting the farm to a shoreline. Instead, the electrical output of the farm is used by an end-user on a (floating or non-floating) offshore platform, by boats, by buoys, by machines on platforms within the farm itself, by submerged equipment beneath the farm, etc.

The root location 105 can move and/or change over time and/or in response to changing factors (e.g. weather) relevant to a deployment's safety, efficiency, cost, etc. A farm can be repositioned from time to time so that the root location (the approximate location or region where new devices are added to the farm) is at a first location at a first time and at a second location at a second time.

The scope of the present disclosure covers deployment methods wherein some but not all of the devices in a farm are deployed by "extrusion." For example, if some converters of segment 1 102 were deployed at the root and were caused to move to the region 102, while other converters of segment 1 were deployed by a boat or ship directly at region 102 and interlinked with the devices that were deployed by extrusion, the farm would fall under the scope of the present disclosure.

The scope of the present disclosure includes the deployment of both floating wave-energy converters, and floating wind turbines, in the same fashion as described above. In other words, the scope of the present disclosure includes a deployment scheme for wind turbines, and/or other floating machines, devices, platforms, vessels, buoys, etc., that is described by replacing the phrases "wave energy converter" and "converter" by the phrase "floating wind turbine" and/or equivalent phrases describing other floating machines, devices, platforms, vessels, buoys, etc., throughout this document.

FIG. 2 illustrates a conceptual top-down view of the same extruded farm embodiment of the present disclosure illustrated and discussed in relation to FIG. 1, but the embodiment configuration illustrated in FIG. 2 corresponds to a time before the configuration illustrated in FIG. 1.

Figure 3:
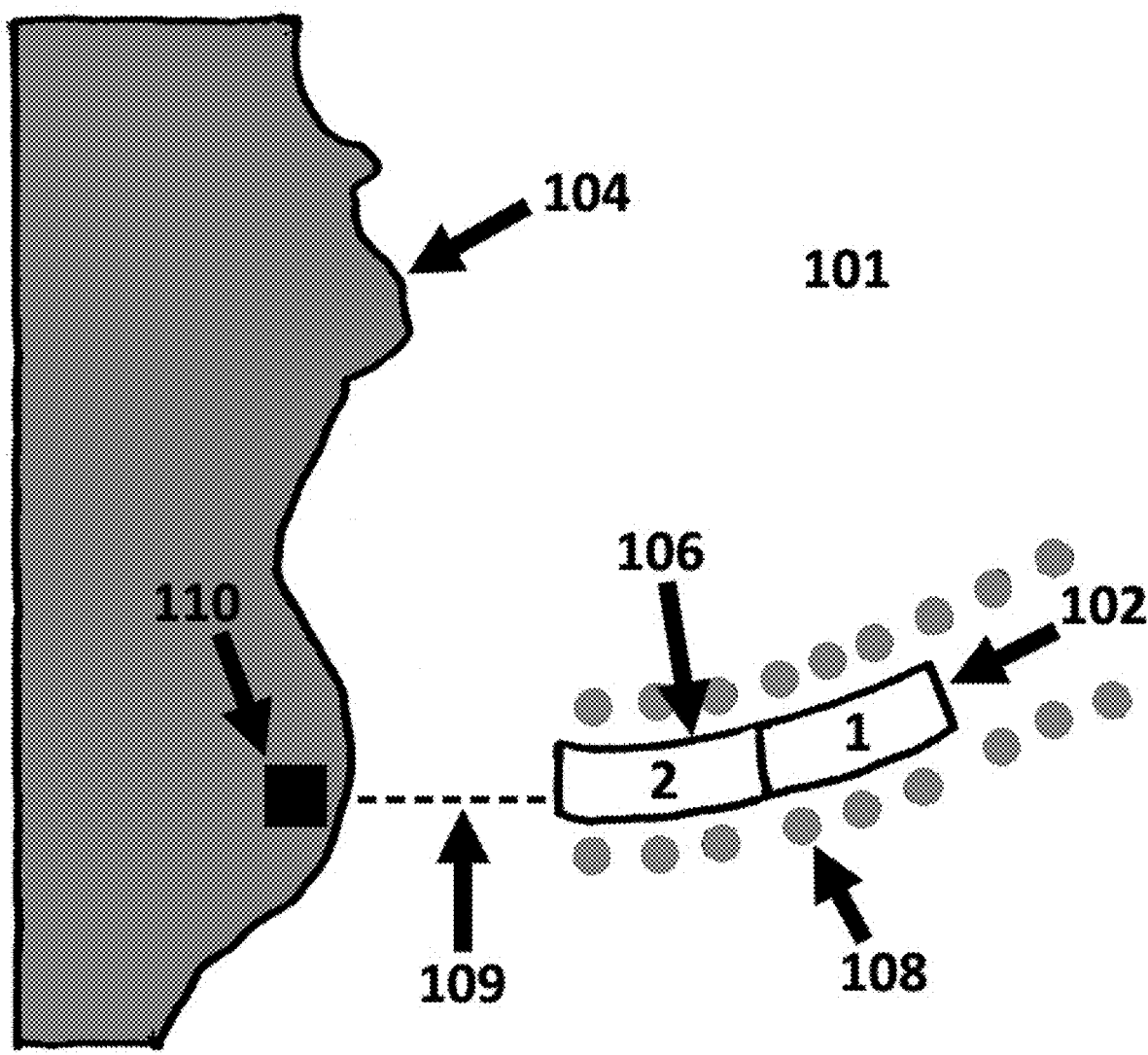
FIG. 3 illustrates a conceptual top-down view of the same extruded farm embodiment of the present disclosure illustrated and discussed in relation to FIGS. 1 and 2.

FIG. 2 illustrates approximately the same area of shoreline 104 and ocean 101 shown in FIG. 1 but at a time earlier in the farm's deployment, e.g. several months or years before the farm took the form or had the configuration shown in FIG. 1, but before the farm took the form or had the configuration shown in FIG. 3.

Farm 102 floats on the surface of a body of water 101 near shoreline 104. A plurality of wave energy converters comprise or make up segment 1 102 of the farm. These converters are interlinked using linkages as shown in later figures. The converters are generating electricity from waves propagating over the surface of body of water 101 and are transmitting at least a portion of this electricity back to shore over electrical cable 109 which can be submerged or buoyed and is operatively connected directly and/or indirectly to each converter of segment 1 102. At least some linkages between the converters carry an electrical current and allow the converters to "pool" and/or combine the electrical power they are generating so that some or all of that electrical power can all be transmitted to shore along a single cable 109. A farm can use multiple electrical cables for transmission of electricity back to shore (this configuration not shown).

At least some of anchors 108 can be operatively connected to at least some of the converters of segment 1 102. When the converters of segment 1 need to be "moved" as part of an "extrusion operation" to make room for the addition of additional converters to the farm near the root, they can be disconnected from one or more of the anchors temporarily and/or in alternating fashion. The anchors 108 are optional. For station-keeping, the farm can eschew anchors and rely entirely on "propulsive mooring" i.e. the use of propulsive units such as buoys having motors and propellers. The farm can also be "continuously extruded" so that it has a continuous slow movement away from the root 105 (at least on average), instead of relying on discrete "extrusion operations," translocations, movements, and/or displacements.

FIG. 3 illustrates a conceptual top-down view of the same extruded farm embodiment of the present disclosure illustrated and discussed in relation to FIGS. 1 and 2, but the embodiment configuration illustrated in FIG. 3 corresponds to a time before the configuration illustrated in FIG. 1 and after the configuration illustrated in FIG. 2.

FIG. 3 illustrates approximately the same area of shoreline 104 and ocean 101 shown in FIGS. 1 and 2 but at a time later in the farm's deployment than FIG. 2, e.g. several days, weeks, or months afterwards. Additional wave energy converters have been added to the farm, forming segment 2 106, and these converters of segment 2 have been interlinked with the converters of segment 1 102 by linkages. Wave energy converters (and/or floating wind turbines) of segments 1 and 2 are operative and are transmitting power to a user, e.g., 110, or grid on shore by electrical cable 109.

Figure 4:
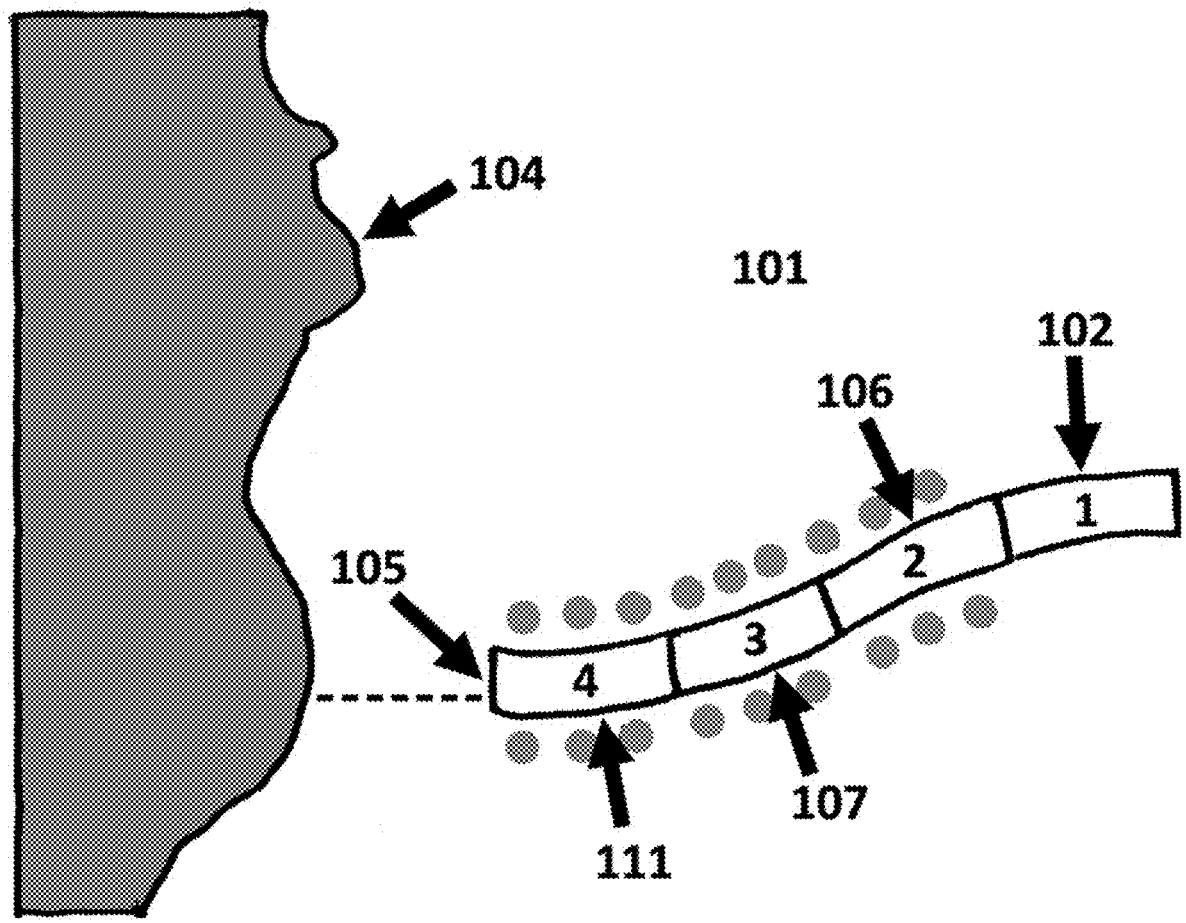
FIG. 4 illustrates a conceptual top-down view of the same extruded farm embodiment of the present disclosure illustrated and discussed in relation to FIGS. 1-3.

FIG. 4 illustrates a conceptual top-down view of the same extruded farm embodiment of the present disclosure illustrated and discussed in relation to FIGS. 1-3, but the embodiment configuration illustrated in FIG. 4 corresponds to a time before the configuration illustrated in FIG. 1 and after the configurations illustrated in FIGS. 2 and 3.

FIG. 4 illustrates approximately the same area of shoreline 104 and ocean 101 shown in FIGS. 1-3 but at a time earlier in the farm's deployment than FIG. 1, e.g. several days, weeks, or months earlier, and later in the farm's deployment than FIGS. 2-3, e.g. several days, weeks, or months afterwards.

Additional wave energy converters have been added to the farm, each being added near root location 105. These new converters have formed two new (conceptual) segments 3 107 and 4 111. At least some of the converters of segment 3 were added after the converters of segment 2 106, and at least some of the converters of segment 4 111 were added after the converters of segment 3 107. Because at one time (e.g. FIG. 3) the converters of segment 2 106 were nearer the root than they are in FIG. 4, the farm operator has "moved" the converters of segment 2 106 to a new set of locations indicated by the box for segment 2 in FIG. 4, i.e. a set of locations farther from the root. Indeed, the entire farm has translated or shifted rightward.

In this way, the farm as a whole is being formed by "extrusion" from a location at or near the root 105, and near a shoreline 104, in relatively shallow water, and is beginning to form a "strand" or other elongate form with one end at the root 105 and another end some distance from the root. The movement of converters away from the root is being provided by propulsive units interlinked with the converters, and/or by tug vessels or drones that attach to them and pull them, and/or by propulsive elements (like propellers) on the converters themselves, and/or by some other propulsive means. It is within the scope of the present disclosure when the propulsion of any embodiment disclosed, or not disclosed, is aided by a prevailing current, e.g. through drag-inducing plates, sails, barriers, flaps, etc., and winds, e.g. through sails (rigid and/or flexible), kites, obstructive barriers or walls, etc.

Through the addition of more wave energy converters to the root 105 of the extruding farm, and through the concomitant and/or concerted movement of the farm away from the root, the elongate farm illustrated in FIG. 1 may be achieved, without the need for transporting and/or pulling converters from shore to the end of the farm (e.g. the distal end of segment 1 102) most distant from shore. Through the addition of converters to a base maximally proximate to shore (and/or to one or more other convenient platforms and/or locations), time, fuel, and other resources expended in the movement of converters, are conserved. Through the addition of converters to a base maximally proximate to shore the safety and health of workers, and other human factors diminished by prolonged exposure to high seas, are also conserved, if not promoted.

Figure 5:
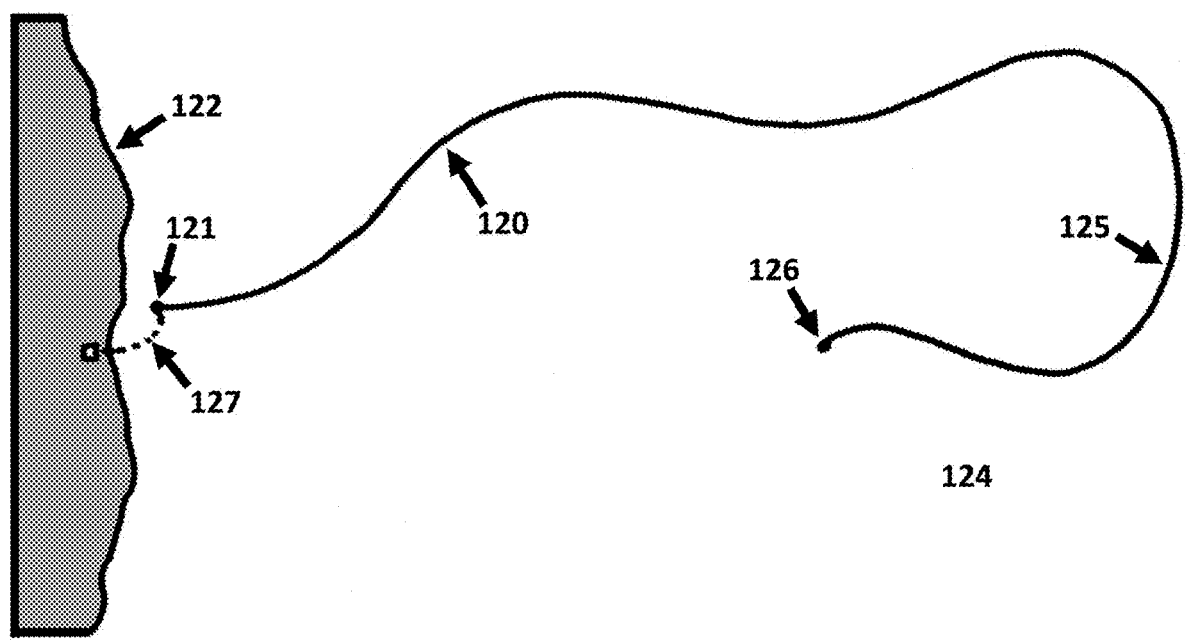
FIG. 5 illustrates a conceptual top-down view of an embodiment of the present disclosure.

FIG. 5 illustrates a conceptual top-down view of an embodiment of the present disclosure.

FIG. 5 illustrates the same or a similar farm as the one(s) pictured in FIGS. 1-4 but at a much later time in its deployment and/or extrusion. FIG. 5 is significantly "zoomed out" relative to the previous figures.

A farm embodiment 120 of the present disclosure has been extruded from a root location 121 near shore 122. Farm 120 now forms an elongate strand extending out into the ocean 124 substantially away from shoreline 122. However, farm 120 also "curves back" toward the shoreline at around 125. An anchor has been provided for the farm at 126 (this is optional). All the converters of the farm are operatively interlinked using linkages and many, if not all, of the converters are generating electricity from waves passing over the surface of the body of water on which the farm floats. This generated electricity is being transmitted, shared, combined, and/or pooled, along linkages and/or cables within the farm. Finally, the combined electricity being generated by the entire farm, and/or a portion thereof, is passing through electrical cable 127 to shore.

In this embodiment, the length of the entire farm, from 121 to 126, can be arbitrarily large, e.g. 10 km, 50 km, 100 km, or 1000 km.

Figure 6:
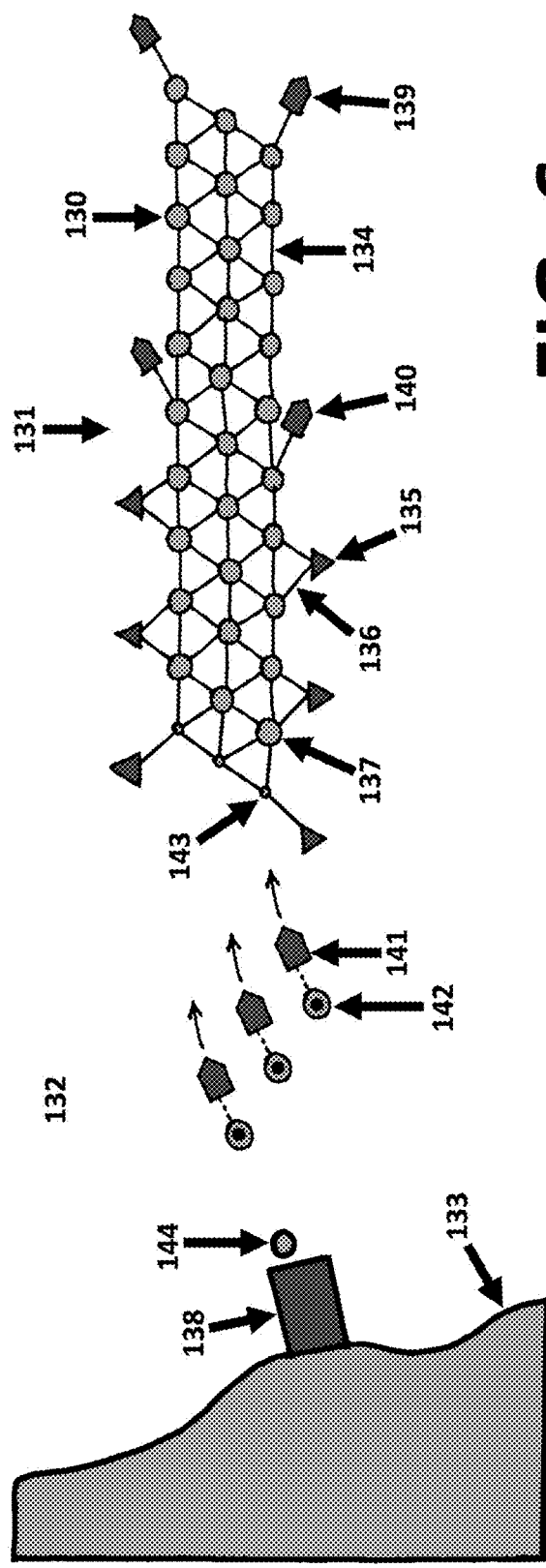
FIG. 6 illustrates a conceptual top-down view of an embodiment of the present disclosure.

FIG. 6 illustrates a conceptual top-down view of an embodiment of the present disclosure. This figure illustrates in greater detail one extruded-farm embodiment of the present disclosure, and one example of the "farm extrusion process" near a root or base of an extruded farm.

A plurality of converters, e.g. 130, are part of an extruded farm 131 and the converters float on the surface of a body of water 132. A shoreline 133 is adjacent to the body of water 132. The wave energy converters, e.g. 130, are indicated by larger shaded circles. The wave energy converters, e.g. 130, are interlinked by linkages, e.g. 134, designated by lines. The converters are operatively interlinked with anchors, e.g. 135, designated by dark triangles.

Linkages, e.g., 136, operatively connect some of the converters to some of the anchors, and the linkages can be similar to the linkages, e.g., 134, connecting the converters to one another. The linkages connecting the anchors to adjacent converters can be disconnected to allow the farm to translate and/or move as part of an extrusion process and/or operation.

Some of the converters, e.g. 137, shown are more recently deployed than others of the converters, e.g. 130. Converter 137 was deployed more recently than converter 130. When converter 130 was initially deployed (i.e. first operatively connected to other converters and "turned on" so that it could generate electricity) it was at approximately the same geodetic position (e.g. same approximate latitude and longitude) on the surface of the water that converter 137 is at in this figure. Since that time, the portion or segment of the farm containing converter 130 has migrated, shifted, and/or moved rightward, away from assembly platform 138, and shoreline 133, and additional converters have been added to the farm, e.g. converter 137. Hence, a portion of the farm has been "extruded."

A plurality of propulsive units, e.g. 139 and 140, are operatively connected to the farm. In the displayed embodiment, these propulsive units are autonomous drone vessels, each having a propeller. In other embodiments, these propulsive units are buoys, each having a propeller or having other thrust-producing elements, such as wave-driven propulsive flaps. The propulsive units are designated by the dark five-sided, arrow shaped symbols, e.g. 140.

Three tug boats, e.g. 141, are towing recently-manufactured converters, e.g. 142, out to the farm for initial deployment at locations near converter 137, e.g. at imminent deployment location 143. The imminent deployment locations are indicated by smaller circles. And, in the illustrated embodiment, these imminent deployment locations are simple "placeholder" buoys which are interlinked with the farm. Each placeholder buoy is eventually replaced with a new converter, e.g. 142. And, the introduction of each new converter, e.g. 142, is facilitated by the pre-configured linkages that are held in place by the placeholder buoy. After one or more new converters are linked to a nascent and/or extruding farm, new linkages can be connected to its base and/or expanding edge, and those linkages can be held in their desired and/or proper interlinked configuration through the use of intermediary placeholder buoys providing the temporary connection points that will be supplanted through the substitution of converters for those buoys.

Another converter 144 has been recently manufactured, assembled, and/or transported, to the assembly platform and/or area 138, and/or shoreline 133, and placed in the water awaiting towing to the farm.

Power cable(s) (not shown) can transmit power from the incomplete and growing farm back to facility 138 and/or to other location(s) on shore 133.

The linkages, e.g. 134, connect some of the converters to others of the converters. The linkages are so disposed and configured so as to be adjacent to the surface of the water, e.g. they are typically not configured to be in contact with the seafloor. The linkages can include chains, cables, navigational or mooring buoys, weights, ballasts, etc. The linkages can be configured with floats, weights, and/or ballasts in an assembly and/or arrangement that gives the linkages an elastic character. By "elastic character" we mean that a linkage whose endpoints are drawn apart can develop an opposing force that will tend to draw said endpoints back together, hence exerting an elastic restoring force on converters that have "drifted away" from one another, drawing them back closer together.

The shapes formed by the lattice, grid and/or graph of linkages need not be triangles. Instead, the linkages can be configured in other shapes, patterns, and/or relationships, including, but not limited to, shapes approximating rectangles, pentagons, hexagons, etc.

FIG. 7 illustrates a conceptual top-down view of the same extruded farm embodiment of the present disclosure illustrated and discussed in relation to FIG. 6, but the embodiment configuration illustrated in FIG. 7 corresponds to a time after the configuration illustrated in FIG. 6.

Subsequent to the farm having the configuration shown in FIG. 6, the three tug boats 141, 145 and 146 here deploy and attach three converters, e.g. 142, (indicated by circles with central dots) to the expanding edge of the farm, e.g. near a "root" or "root location" of the farm, operatively connecting those converters, e.g., 142, to the other converters, e.g., 147, of the farm by linkages, e.g. 148. The converters can also be operatively connected to anchors, e.g. 149, though this is optional. By the addition of these three converters 141, 145 and 146 to the extruding farm, the number of converters in the farm has increased by three, and the farm's extent has increased (e.g., by one "row" of converters).

FIG. 8 illustrates a conceptual top-down view of the same extruded farm embodiment of the present disclosure illustrated and discussed in relation to FIGS. 6 and 7, but the embodiment configuration illustrated in FIG. 8 corresponds to a time after the configuration illustrated in FIG. 7.

Subsequent to the farm in FIG. 7 having the configuration illustrated therein, the newly deployed converters, e.g. 142, are now operatively connected and/or interlinked with the other converters of the farm, and can be generating electricity. Propulsive units, e.g. 139, cause the farm to translate rightward, i.e. pull the farm rightward 150. New imminent deployment locations, e.g., 151, are created through the addition of linkages to the newly added converters, e.g. 142, and through the connection of placeholder buoys to those added linkages. These new pre-linked placeholder buoys are prepared and ready to receive three new converters, e.g. 152 which, like the previously deployed converters, e.g., 142, are being towed to the expanding edge of the farm by tug boats from a shoreline fabrication, assembly, and/or deployment, facility.

Figure 9:
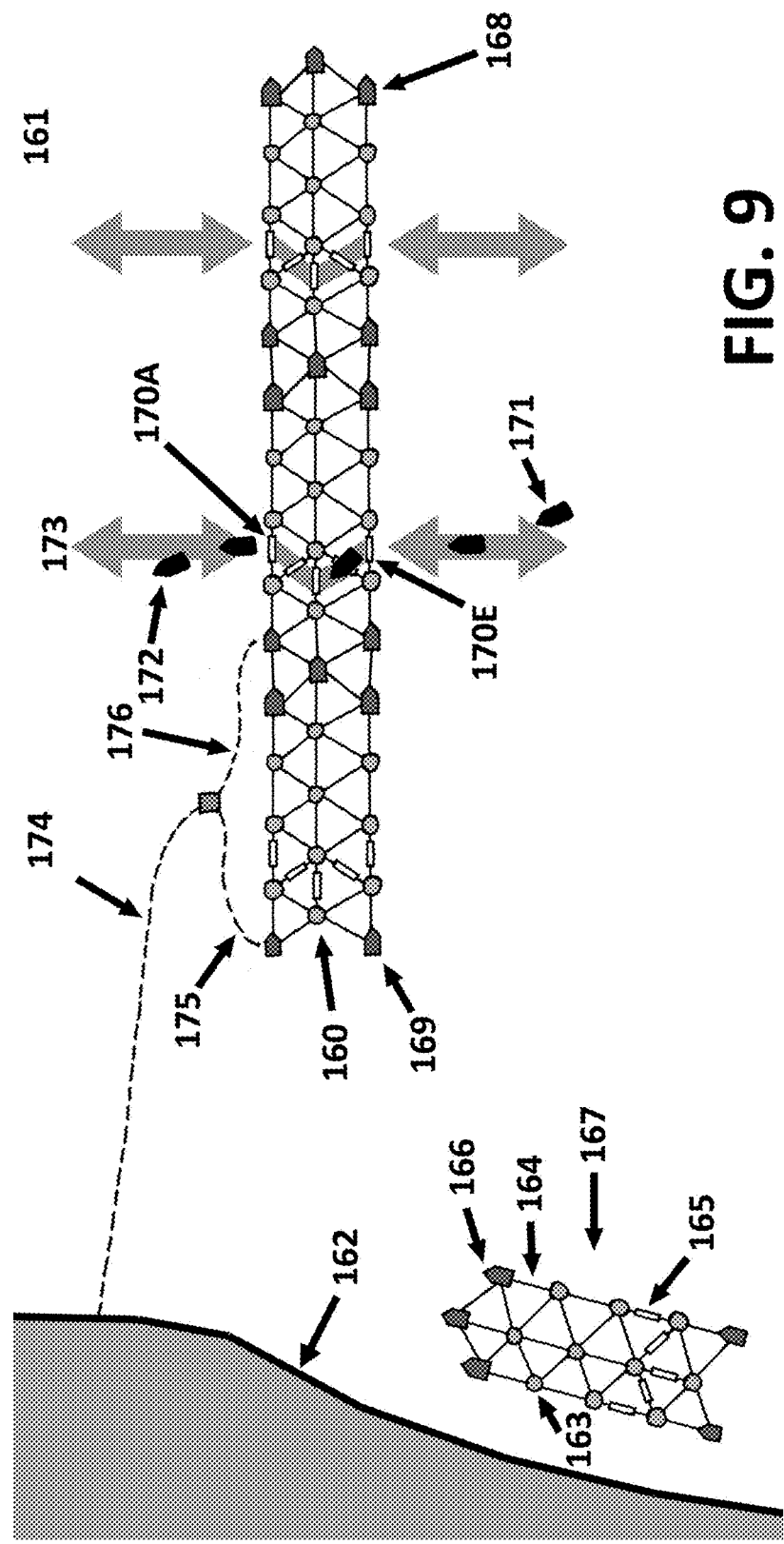
FIG. 9 illustrates a conceptual top-down view of an extruded farm embodiment of the present disclosure.

FIG. 9 illustrates a conceptual top-down view of an extruded farm embodiment of the present disclosure.

A farm is being "extruded" from a location (proximate to 160) in a body of water 161 that is relatively near a shoreline 162. An assembly of wave energy converters, e.g. 163, linkages, e.g. 164, "bypass" linkages, e.g. 165, and propulsive buoys and/or vessels, e.g. 166, has been assembled and/or interlinked into a network 167 proximate to the shore 162, a process which has possibly benefited from milder conditions and proximity to the converters being delivered, fabricated, and/or assembled, on the land 162.

A "bypass" linkage, e.g., 165, is one in which a sufficiently wide or extensive portion of a linkage is submerged to a depth that permits the passage of floating craft (e.g. boats) of sufficiently shallow draft.

The extruding farm 168 is being incrementally increased in length and in its number of constituent converters, and its oldest portion and/or "tip," e.g. 168, is being incrementally "pushed," projected, moved, translocated, and/or deployed, into ever deeper waters, and/or to ever increasing distances from shore 162, at least in part through propulsive forces imparted and/or contributed by one or more of the propulsive buoys, e.g. 168 and 169.

A set of adjacent "bypass" linkages, e.g. 170A-170E, provide a route through which boats, e.g. 171 and 172, ships, etc. may transit the farm in a direction approximately normal to the farm's longitudinal axis. The gray arrows, e.g., 173, and/or lines in the illustrated farm indicate the presence of "bypass" passages through the farm suitable for the transit of boats.

Electrical power being generated by the illustrated nascent extruding farm is transmitted to shore by means of a subsea power cable 174, and by either or both of two intermediate power cables 175 and 176. When the extruding farm is moved further out to sea, the intermediate power cable, e.g. 176, furthest from shore 162, is disconnected, and the farm is moved. The other still-connected intermediate power cable, e.g. 175, moves away from shore in concert with the farm, and the remaining disconnected intermediate power cable, e.g. 176, is then connected to a converter among those converters newly added to the expanding edge and/or base of the farm.

For example, after intermediate power cable 176 is disconnected from the farm, and the farm is advanced to a position further from the shore 162, the new set of pre-linked converters 167, will be brought proximate to the base of the farm and connected and/or linked thereto. At that time, or prior to that time, disconnected intermediate power cable 176 will be connected to a component, e.g. to converter 163, within the set of converters newly added to the base, and not constituting the new base of the farm.

The use of two intermediate power cables is arbitrary, and this disclosure applies with equal force to those embodiments that use a single power cable, multiple power cables, or no power cables. However, with respect to this illustrated embodiment, the use of two intermediate power cables, which are alternately disconnected and reconnected, ensures a desirable continuity in the communication of generated electrical power from the farm to the shore 162.

Figure 10:
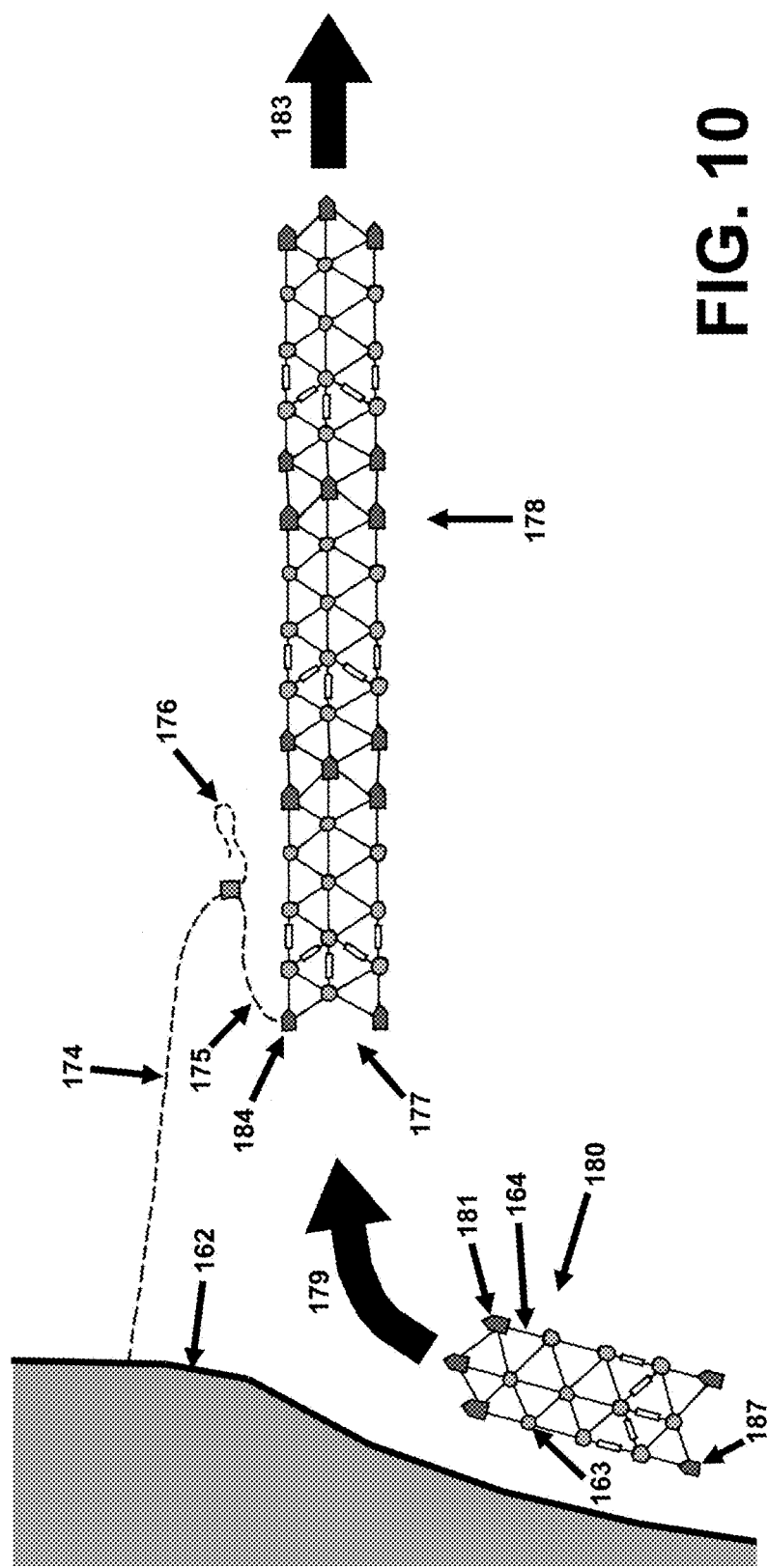
FIG. 10 illustrates a conceptual top-down view of the same extruded farm embodiment of the present disclosure illustrated and discussed in relation to FIG. 9.

FIG. 10 illustrates a conceptual top-down view of the same extruded farm embodiment of the present disclosure illustrated and discussed in relation to FIG. 9, but the embodiment configuration illustrated in FIG. 10 corresponds to a time after the configuration illustrated in FIG. 9.

In this embodiment, converters, e.g., 163, are not added one-by-one to the base 177 of the extruding farm 178 as in some of the previous figures. Instead, converters are added 179 to the base 177 in units composed of pre-interlinked sub-segments, e.g., 180, of converters, e.g., 163, and propulsive buoys, e.g., 181. In other words, before being attached to the "extruding farm," converters are first connected into an "extrusion unit and/or component farm" 180 and/or "sub-segment" that can be moved or towed to the "extruding farm" 178 as a unit.

A sub-segment, e.g., 180, is connected to the extruding farm by linkages. When a new sub-segment 180 is attached and/or operatively connected to the farm, the farm grows by a number of converters equal to the number of converters in that new sub-segment.

Sub-segment 180 includes a plurality of converters, e.g. 163. In the shown embodiment, the sub-segment also includes a plurality of propulsive units, e.g. 181, which are optional. The converters (and, optionally, propulsive units) of the sub-segment are interlinked using linkages, e.g. 164.

Sub-segment 180 (i.e. the converters, propulsive buoys, and linkages thereof) can have been configured and interlinked at a location relatively distant from the extruding farm and thereafter transported and/or towed to the base 177 of the farm.

A sub-segment can be towed to the farm's "root location" 177 or "base" using tug boats or other propulsive means.

Farm 178 sends its electrical output to shore by electrical cable 174 and 175. The illustrated embodiment has disconnected electrical cable portion 176 in order to prepare for the advancement and/or extrusion of the farm in a direction 183 away from the farm's root location, e.g. near 177.

Shown is a method and mechanism by which a farm can maintain its electrical linkage to the shoreline 162 even as the farm is being "grown" or "extruded" and hence even as converters located at the base or root move to positions that are distant from the base or root. At all times, either electrical cable segment 175, or electrical cable segment 176, or both, are operatively connected to the farm. Electrical cable segment 175 is operatively connected to the farm at cable attachment point 184. When the farm grows, one electrical cable segment (e.g. 176) can be disconnected from its respective connection point while the other remains connected. When new converters are added to the farm, the disconnected electrical cable segment can be re-attached to the farm (e.g. at 187). Then, the process can be repeated by disconnecting and reconnecting the other electrical cable segment 175. This alternating process can be repeated indefinitely allowing the farm to grow, and be extended to arbitrarily great lengths, while preserving continuity in the connection permitting its power to be transmitted to shore, and while limiting the deployment and/or connection of new sub-assemblies of converters to a single limited and relatively easily accessible root location.

Figure 11:
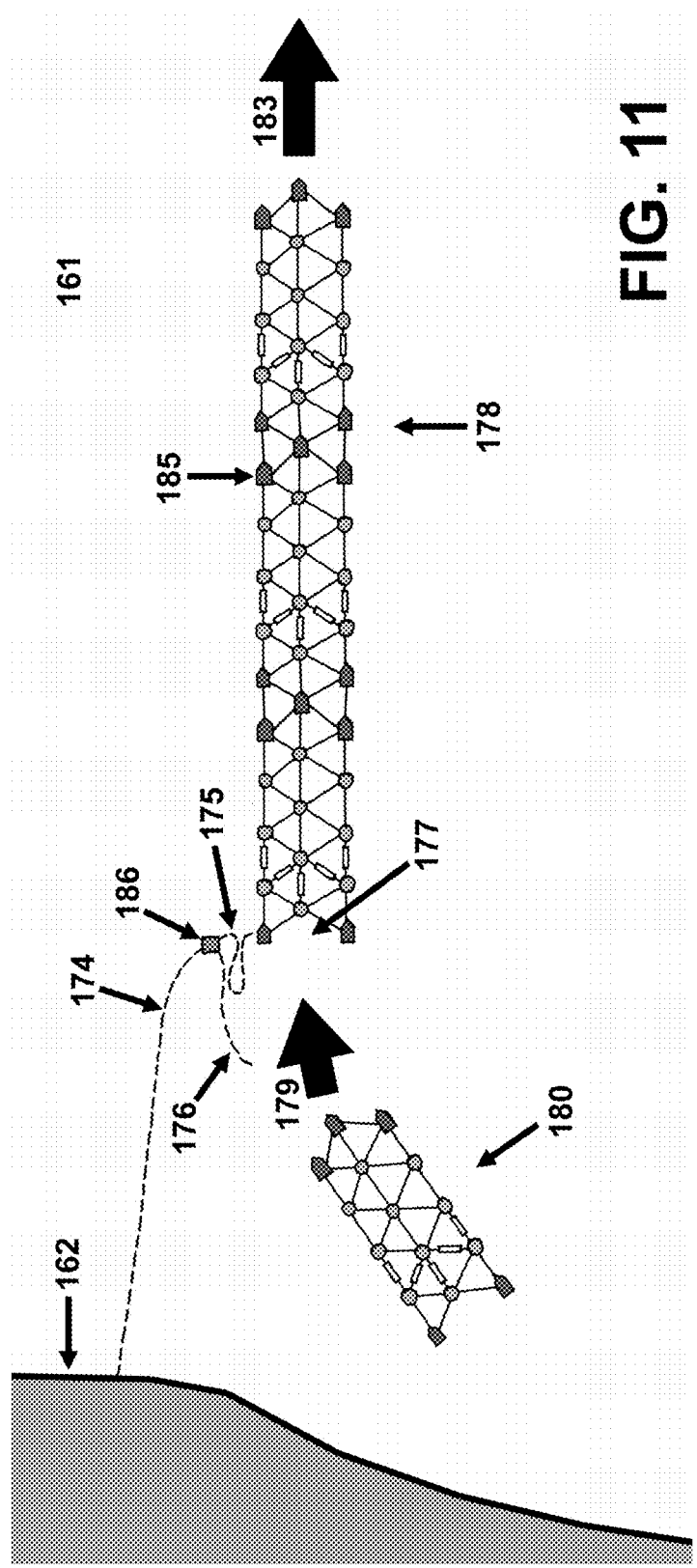
FIG. 11 illustrates a conceptual top-down view of the same extruded farm embodiment of the present disclosure illustrated and discussed in relation to FIGS. 9 and 10.

FIG. 11 illustrates a conceptual top-down view of the same extruded farm embodiment of the present disclosure illustrated and discussed in relation to FIGS. 9 and 10, but the embodiment configuration illustrated in FIG. 11 corresponds to a time after the configuration illustrated in FIG. 10.

FIG. 11 illustrates the same area of the ocean 161 and shoreline 162 as FIGS. 9 and 10, and the same farm embodiment pictured therein, but at a later time.

Pre-interlinked sub-segment 180 corresponds to pre-interlinked sub-segment 180 of FIG. 10. Sub-segment 180 is being moved 179 into position at the base 177 of farm 178. (Farm 178 corresponds to farm 178 of FIG. 10.) Farm 178 is being moved in a direction 183 away from the shoreline 162. Hence, the converters of the farm 178 are moving 183 away from the shoreline 162, and likewise away the farm's "root location" 177, to make room for the converters of sub-segment 180. The farm is moved by propulsive units, e.g. 185.

Electrical cable segment 176 is the same disconnected cable 176 illustrated in FIG. 10, and in FIG. 11 that cable 176 is being prepared for attachment to sub-segment 180 at attachment point 163.

Electrical cable segment 175 remains attached to extruding farm 178. Electrical cable segments 174 and 175 transmit electricity from the converters of the extruding farm to a grid and/or end-user on land 162. The extruding farm remains operatively connected to electrical cable 174 so long as electrical cable segment 175 or electrical cable 176 is operatively connected to the farm. Electrical junction 186 "splits" the electrical connection so that either electrical segment 176, or electrical segment 175, or both, can provide the desired operative electrical connection of the farm to the consumers on shore.

Figure 12:
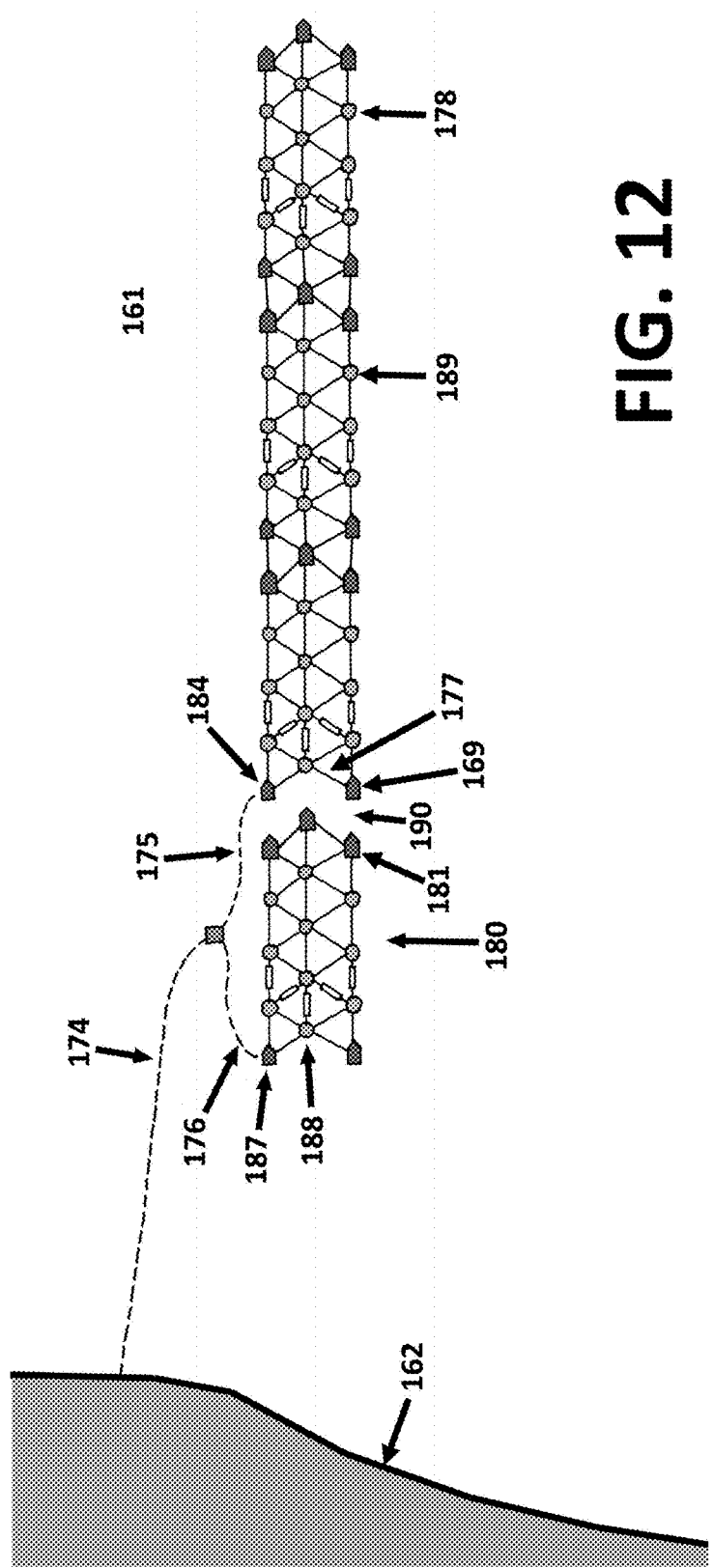
FIG. 12 illustrates a conceptual top-down view of the same extruded farm embodiment of the present disclosure illustrated and discussed in relation to FIGS. 9-11.

FIG. 12 illustrates a conceptual top-down view of the same extruded farm embodiment of the present disclosure illustrated and discussed in relation to FIGS. 9-11, but the embodiment configuration illustrated in FIG. 12 corresponds to a time after the configuration illustrated in FIG. 11.

FIG. 12 illustrates the same farm embodiment and same region of ocean 161 and shoreline 162 shown in FIGS. 9-11. Pre-interlinked sub-segment 180, which corresponds to 180 of FIG. 11, has been moved into position adjacent to the base 177 of farm 178, which corresponds to 178 of FIG. 11. Hence, the converters of sub-segment 180, e.g. converter 188, are nearly in position to be operatively connected and/or interlinked with the converters, e.g. 189, of farm 178.

Even prior to their being interlinked together, both the farm 178, and the module and/or assembly of pre-linked converters, e.g. 180, are connected, via respective connecting power cables 175 and 176, to the primary power cable 174.

At a later stage of deployment, the gap 190 will be "closed" through the introduction of linkages between the converters and/or propulsive buoys on either side of the gap, after which the converters and propulsive buoys of the newly added set of such components will constitute the new "base" and/or "expanding edge" of the farm. And, the converters and propulsive buoys that formerly constituted the farm's base will begin their journey away from the shore 162 and/or the farm base.

Figure 13:
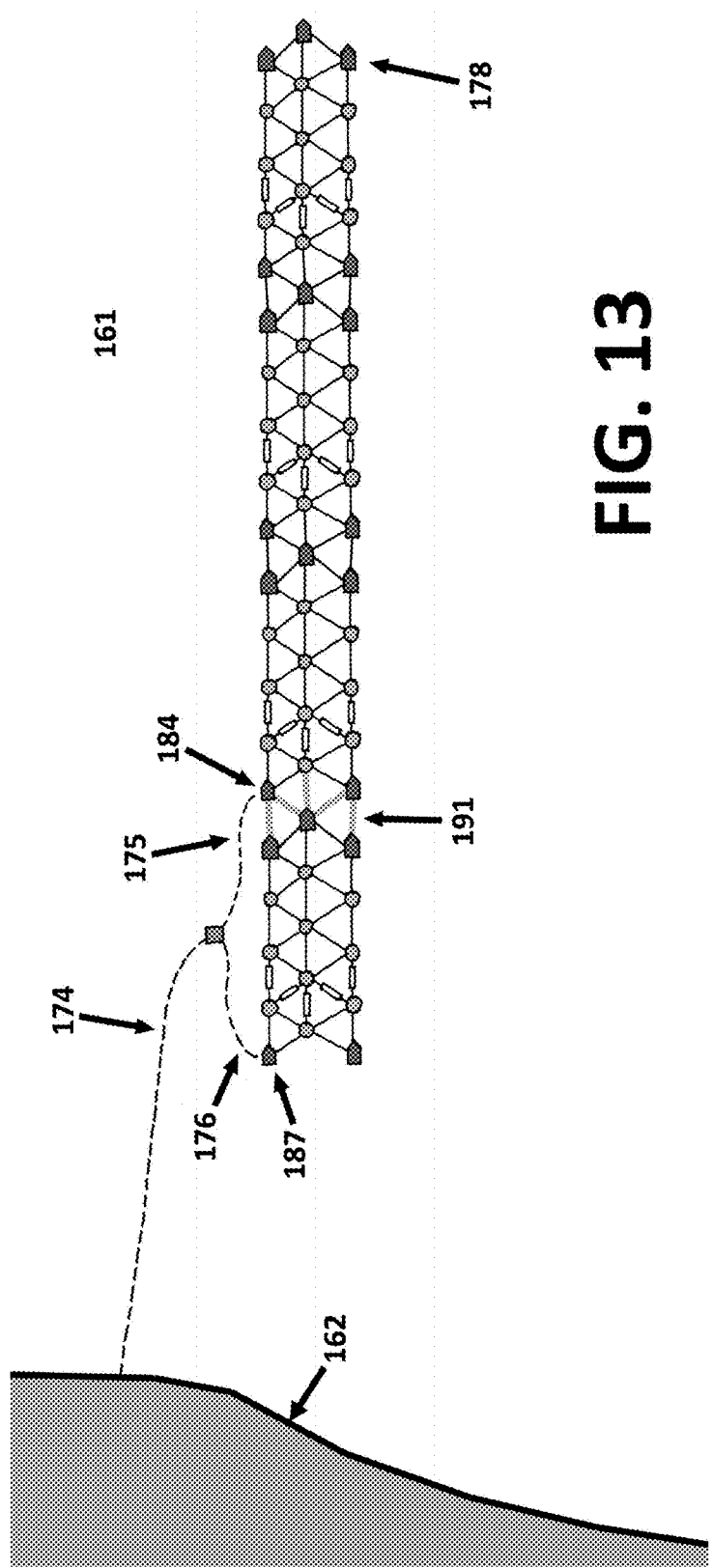
FIG. 13 illustrates a conceptual top-down view of the same extruded farm embodiment of the present disclosure illustrated and discussed in relation to FIGS. 9-12.

FIG. 13 illustrates a conceptual top-down view of the same extruded farm embodiment of the present disclosure illustrated and discussed in relation to FIGS. 9-12, but the embodiment configuration illustrated in FIG. 13 corresponds to a time after the configuration illustrated in FIG. 12.

FIG. 13 illustrates the same farm embodiment and same region of ocean 161 and shoreline 162 shown in FIGS. 9-12. The disconnected pre-interlinked sub-segment 180 of FIG. 12 has now been fully connected, operationally, electrically, and physically, to the extruding farm 178 by the linkages illustrated in gray at 191. The two connecting power cables 175 and 176 now provide redundant transmission at least a portion of the farm's generated electrical power to shore via power cable 174.

The process and/or methodology of increasing the length of, and/or growing, the extruding farm, that is illustrated in FIGS. 9-13 may be repeated an arbitrarily a great number of times, thereby increasing the length and number of constituent converters within the farm by an equally arbitrary degree.

Figure 14:
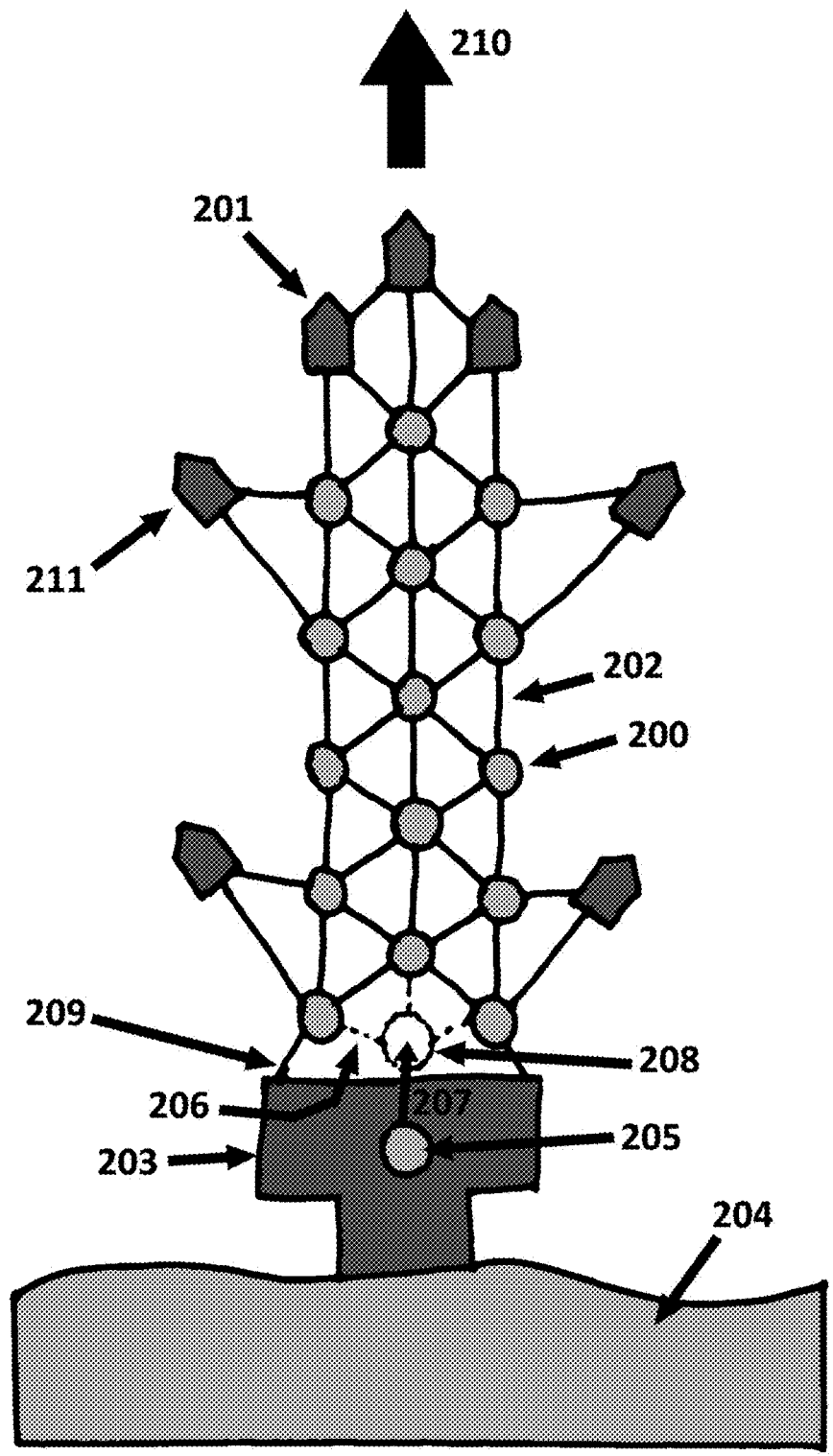
FIG. 14 illustrates a conceptual top-down view of an extruded farm embodiment of the present disclosure.

FIG. 14 illustrates a conceptual top-down view of an extruded farm embodiment of the present disclosure.

In this illustration, wave energy converters are represented as gray circles, e.g. 200. Propulsive buoys and/or vessels are represented as darker gray pentagons, e.g. 201. And, linkages binding together, preferably in an "elastic" fashion, converters and propulsive buoys, are represented as connecting lines, e.g. 202.

The illustrated farm of converters is tethered to a platform 203 connected to, projecting from, and/or adjacent to, a landmass 204 and/or shoreline thereof. Converters, e.g. 205, and linkages, e.g. 206, (as well as propulsive buoys and corresponding linkages thereto) are received, fabricated, and/or assembled on or near the platform 203. They, e.g. converter 205, are then moved 207 to, or proximate to, the base of the farm and are then operably connected, linked, and/or added, to the expanding edge, e.g. 208, of the farm at locations proximate to the platform 203. New linkages are added as needed, e.g. to 206, so as to operably connect and/or link, new converters and propulsive buoys to the base of the farm.

As converters, propulsive buoys, and linkages, are added to the expanding edge of the farm, the tethers, e.g. 209, connecting elements of the farm to the platform are moved to newly-added elements thereby facilitating the migration 210 of the distal end, e.g. 201, of the farm away from its base driven, at least in part, through propulsive forces imparted to the farm by at least some of the propulsive buoys, e.g. 201 and 211, therein.

Figure 15:
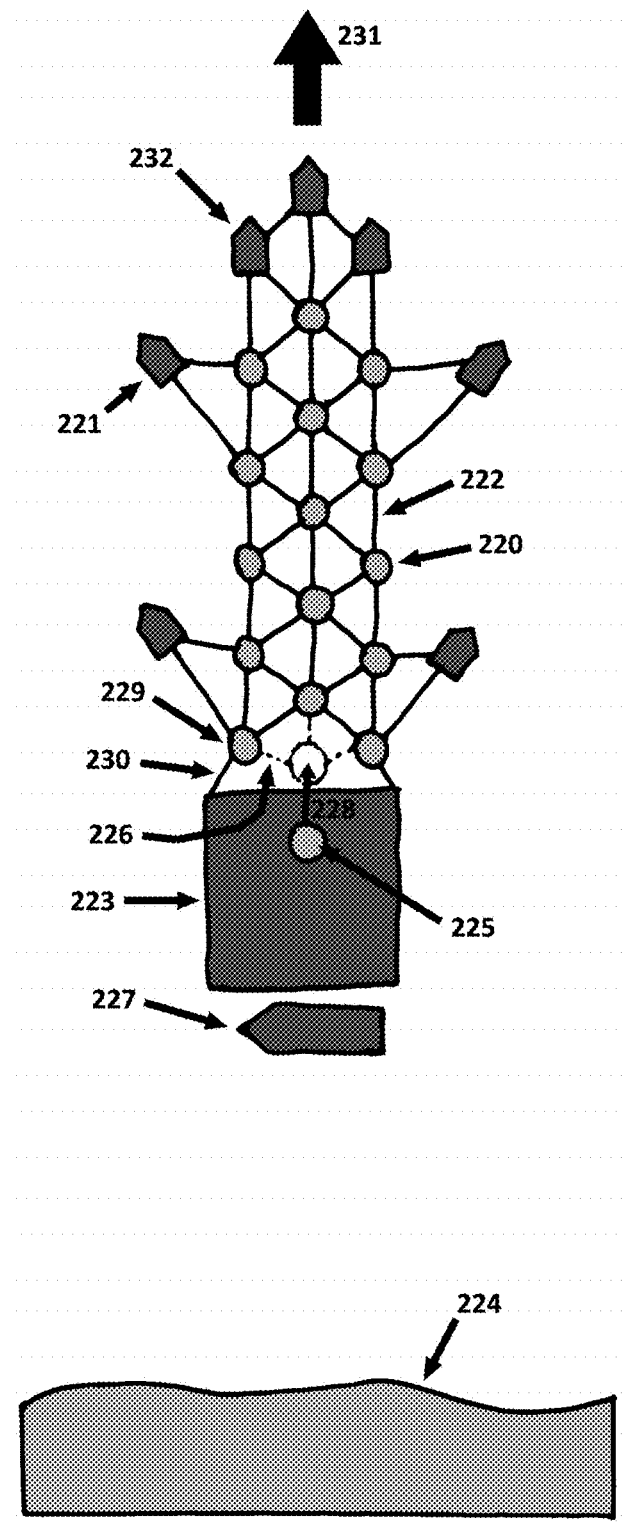
FIG. 15 illustrates a conceptual top-down view of an extruding farm embodiment of the present disclosure similar to the embodiment illustrated and discussed in relation to FIG. 14.

FIG. 15 illustrates a conceptual top-down view of an extruding farm embodiment of the present disclosure similar to the embodiment illustrated and discussed in relation to FIG. 14.

In this illustration, wave energy converters are represented as gray circles, e.g. 220. Propulsive buoys and/or vessels are represented as darker gray pentagons, e.g. 221. And, linkages binding together, preferably in an "elastic" fashion, converters and propulsive buoys, are represented as connecting lines, e.g. 222.

The illustrated farm of converters is tethered to a platform 223 floating in the sea or standing on the seafloor, and located some distance from a landmass 224 and/or shoreline thereof.

Converters, e.g. 225, and linkages, e.g. 226, (as well as propulsive buoys and corresponding linkages thereto) are received, e.g. from ship 227, fabricated and/or assembled, e.g. with materials and/or components received by ship 227, on or near the platform 223. They, e.g. converter 225, are then moved 228 to, or proximate to, the base of the farm and are then operably connected, linked, and/or added, to the expanding edge, e.g. 229, of the farm at locations proximate to the platform 223. New linkages are added as needed, e.g. to 226, so as to operably connect and/or link, new converters and propulsive buoys to the base of the farm.

As converters, propulsive buoys, and linkages, are added to the expanding edge of the farm, the tethers, e.g. 230, connecting elements of the farm to the platform are moved to newly-added elements thereby facilitating the migration 231 of the distal end, e.g. 232, of the farm away from its base driven, at least in part, through propulsive forces imparted to the farm by at least some of the propulsive buoys, e.g. 232 and 221, therein.

FIGS. 16-20 illustrate one of many potential methods, processes, and/or dynamics, by which an extruded farm may be extruded and/or propelled away from a root location while being extended through the addition of supplemental converters, linkages, and/or propulsive buoys, at the expanding edge of the farm.

Figure 16:
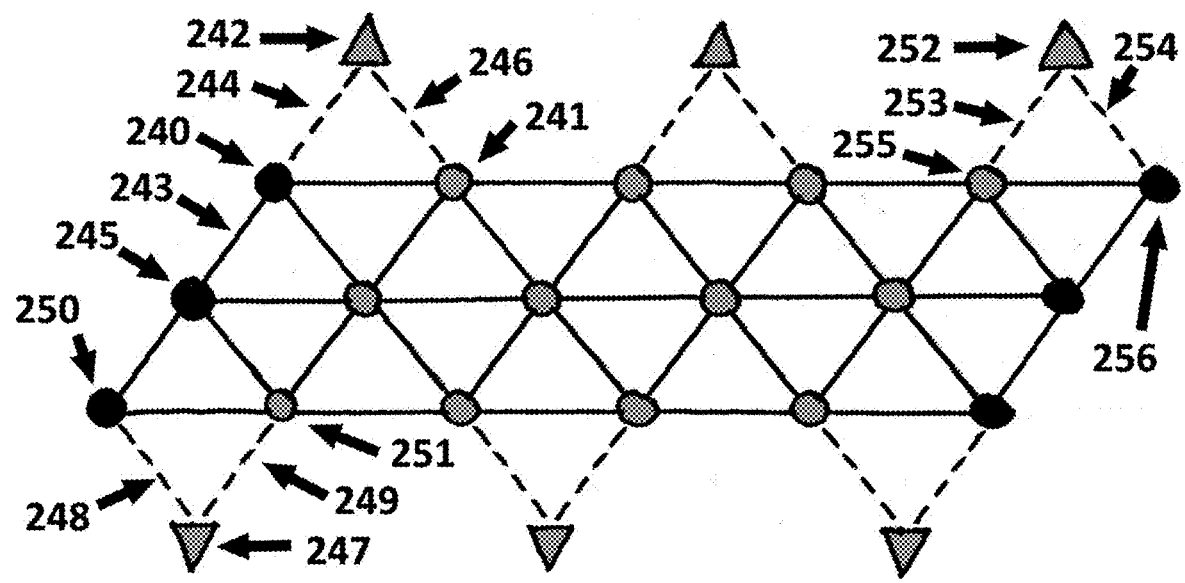
FIG. 16 illustrates a conceptual top-down symbolic view of an extruded farm embodiment of the present disclosure.

FIG. 16 illustrates a conceptual top-down symbolic view of an extruded farm embodiment of the present disclosure. This figure illustrates one of many methods by which an extruded farm may be "extruded." In this case, the connection of converters, along the sides of an elongate distribution of converters, are disconnected from one of the two anchors to which they are typically connected, i.e. they are disconnected from a "lead" or distal converter which is furthest from the farm base. They remain connected to at least one anchor, i.e. to a "trailing" converter which is nearest the farm base.

The farm is advanced (e.g. to the right), at least in part, through a concerted shortening of the linkages between each anchor and the respective trailing converter to which it is connected. When the distance between each anchor and its respective tethered trailing converter is of minimal length, then the remaining (former "lead") linkage, which had been disconnected from the respective lead converter, is reconnected to the converter "behind" the trailing converter. Thus, the former trailing converter has become, with respect to its respective anchor, the current lead converter.

The linkage connecting each newly connected, currently trailing, converter to its respective anchor, is shortened. Simultaneously, the linkage connecting each formerly trailing, and now lead, converter to its respective anchor is relaxed, allowing it to lengthen. This cycle of pulling the trailing converters away from the farm root location, and then reattaching linkages to converters thus pulled forward, and repeating, results in the entire farm, and/or a portion thereof, being moved relative to the stationary anchors.

Such pulling of a farm away from its root location may be aided by thrusts and/or forces generated and/or imparted by propulsive buoys, tugs, and/or other sources of pulling.

In the illustration of FIG. 16, wave energy converters are represented as black or gray circles, e.g. 240 and 241. The triangles, e.g. 242, represent anchoring elements, e.g. the mooring buoys tethered to anchors, and/or propulsive buoys. And, the linkages binding those converters and anchoring elements together, preferably in an "elastic" fashion, are represented as solid, e.g. 243, and dashed, e.g. 244, connecting lines. The linkages connecting anchoring elements to converters are represented as dashed lines in order to facilitate their discernment and to denote the possibility that these linkages possess special connectors, designs, features, and/or other attributes, that facilitate their repeated disconnection and reconnection to converters (i.e. during the process of farm extrusion). While most of the converters are represented by gray circles, e.g. 241, some of the converters are represented by black circles, e.g. 245, in order to facilitate the reader's ability to discern their movement from left to right in the illustrations as the process of farm extrusion is illustrated.

With respect to this disclosure, unless stated otherwise, references to "anchors" is intended to be inclusive of deadweight anchors resting on a seafloor, and/or embedded anchors, e.g. of the kind screwed and/or driven into the seafloor, and/or the mooring buoys tethered to the same. References to "anchors" is intended to also be inclusive of propulsive buoys and/or vessels, tugs, etc.

Anchor 242 is connected, via linkages 244 and 246, to converters 240 and 241, respectively. Anchor 247 is connected, via linkages 248 and 249, to converters 250 and 251, respectively. Anchor 252 is connected, via linkages 253 and 254, to converters 255 and 256, respectively.

Converters 240, 245, and 250, are the left-most converters in this farm or farm segment. Converter 256 is the right-most converter in this farm or farm segment.

Figure 17:
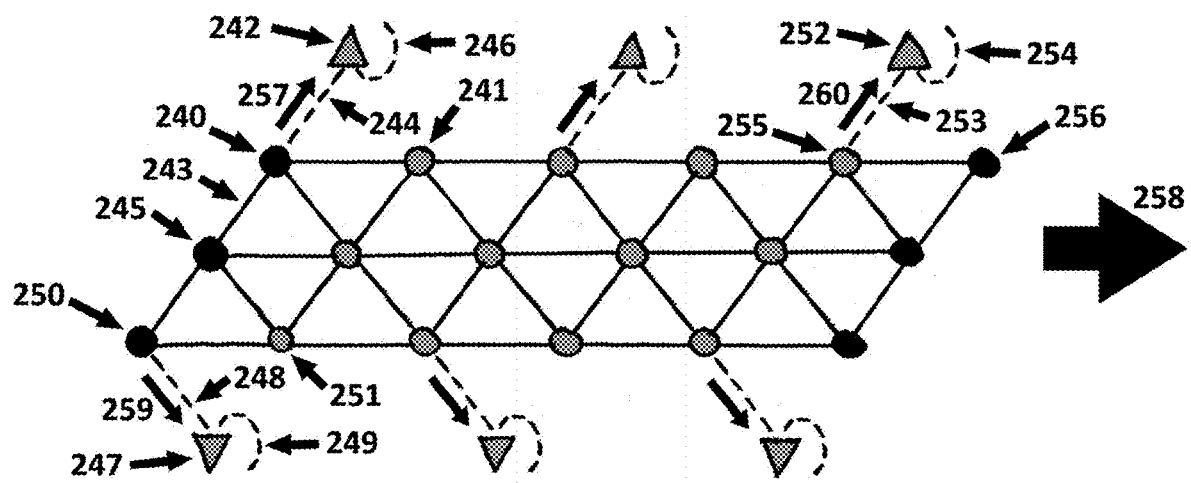
FIG. 17 illustrates a conceptual top-down view of the same extruded farm embodiment of the present disclosure illustrated and discussed in relation to FIG. 16.

FIG. 17 illustrates a conceptual top-down view of the same extruded farm embodiment of the present disclosure illustrated and discussed in relation to FIG. 16, but the embodiment configuration illustrated in FIG. 17 corresponds to a time after the configuration illustrated in FIG. 16.

The illustration in FIG. 17 is a temporal continuation of the process of extrusion begun with the farm configuration illustrated in FIG. 16. FIG. 17 illustrates a configuration typical and/or representative of the initiation of a cycle of "extrusion" in the illustrated farm.

In this illustration, wave energy converters are represented as black or gray circles, e.g. 240 and 251. The triangles, e.g. 242, represent anchoring elements, e.g. anchors and/or propulsive buoys. And, the linkages binding those converters and anchoring elements together, preferably in an "elastic" fashion, are represented as solid, e.g. 243, and dashed, e.g. 244, connecting lines. The linkages connecting anchoring elements to converters are represented as dashed lines in order to facilitate their discernment and to denote the possibility that these linkages possess special connectors, designs, features, and/or other attributes, that facilitate their repeated disconnection and reconnection to converters (i.e. during the process of farm extrusion). While most of the converters are represented by gray circles, e.g. 241, some of the converters are represented by black circles, e.g. 245, in order to facilitate the reader's ability to discern their movement from left to right in the illustrations as the process of farm extrusion is illustrated.

Whereas, anchor 242 was connected to both converters 240 and 241 in the farm configuration illustrated in FIG. 16, its connection to converter 241, via linkage 246, has now been severed. And, anchor 242's connection to converter 240, via linkage 244, is being shortened 257, e.g. through the use of a winching mechanism on anchor 242's associated mooring buoy (represented by the same triangle).

A similar action occurs with respect to every other anchor.

As the still connected linkages are shortened, the elongate farm is pulled 258 away from its root location (to the left, from where converters 240, 245, and 250 originated).

Figure 18:
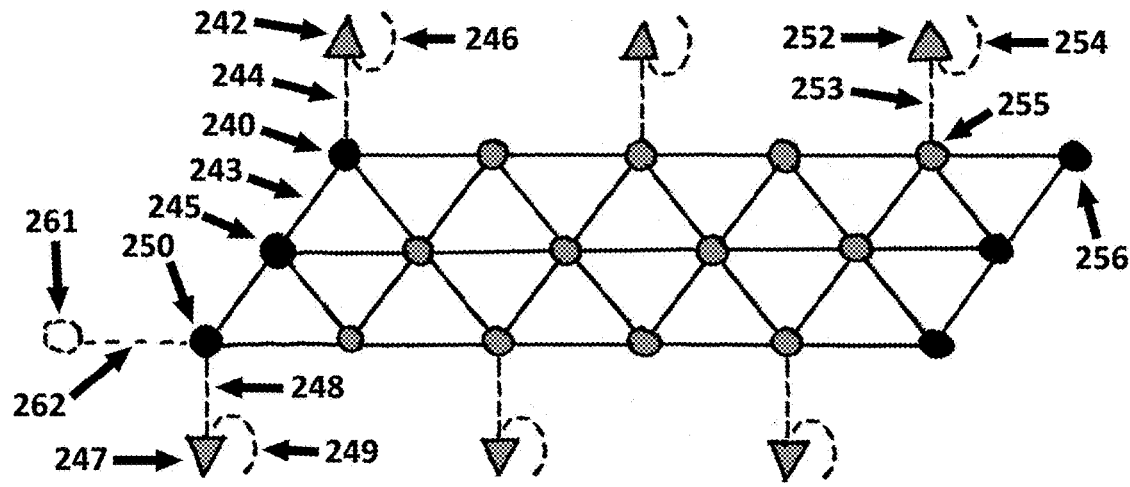
FIG. 18 illustrates a conceptual top-down view of the same extruded farm embodiment of the present disclosure illustrated and discussed in relation to FIGS. 16 and 17.

FIG. 18 illustrates a conceptual top-down view of the same extruded farm embodiment of the present disclosure illustrated and discussed in relation to FIGS. 16 and 17, but the embodiment configuration illustrated in FIG. 18 corresponds to a time after the configuration illustrated in FIG. 17.

The illustration in FIG. 18 is a temporal continuation of the process of extrusion begun with the farm configuration illustrated in FIG. 16, and continued with the farm configuration illustrated in FIG. 17.

In this illustration, wave energy converters are represented as black or gray circles, e.g. 240 and 255. The triangles, e.g. 242, represent anchoring elements, e.g. anchors and/or propulsive buoys. And, the linkages binding those converters and anchoring elements together, preferably in an "elastic" fashion, are represented as solid, e.g. 243, and dashed, e.g. 244, connecting lines. The linkages connecting anchoring elements to converters are represented as dashed lines in order to facilitate their discernment and to denote the possibility that these linkages possess special connectors, designs, features, and/or other attributes, that facilitate their repeated disconnection and reconnection to converters (i.e. during the process of farm extrusion). While most of the converters are represented by gray circles, e.g. 255, some of the converters are represented by black circles, e.g. 245, in order to facilitate the reader's ability to discern their movement from left to right in the illustrations as the process of farm extrusion is illustrated.

The linkage 244 connecting anchor 242 to converter 240 has been shortened, and converter 240 has been brought forward and/or away from the farm's root location through the shortening.

A similar action occurs with respect to every other linkage connecting an anchor and its respective converter.

A new converter 261 is connected via a new linkage 262 to converter 250. Whereas converter 250 had defined, in part, the expanding edge of the extruding farm, in FIG. 16, it has now moved away from the root location, and new converter 261 will now help to define the new expanding edge of the farm.

Figure 19:
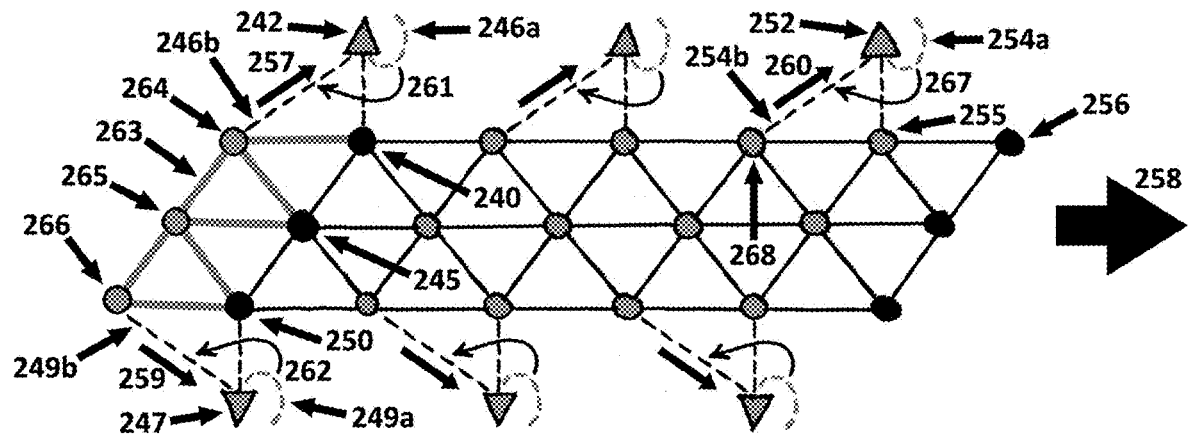
FIG. 19 illustrates a conceptual top-down view of the same extruded farm embodiment of the present disclosure illustrated and discussed in relation to FIGS. 16-18.

FIG. 19 illustrates a conceptual top-down view of the same extruded farm embodiment of the present disclosure illustrated and discussed in relation to FIGS. 16-18, but the embodiment configuration illustrated in FIG. 19 corresponds to a time after the configuration illustrated in FIG. 18.

This illustration is a temporal continuation of the process of extrusion begun with the farm configuration illustrated in FIG. 16, and continued with the farm configurations illustrated in FIGS. 17 and 18.

In this illustration, wave energy converters are represented as black or gray circles, e.g. 240 and 255. The triangles, e.g. 242, represent anchoring elements, e.g. anchors and/or propulsive buoys. And, the linkages binding those converters and anchoring elements together, preferably in an "elastic" fashion, are represented as solid, e.g. 263, and dashed, e.g. 246b, connecting lines. The linkages connecting anchoring elements to converters are represented as dashed lines in order to facilitate their discernment and to denote the possibility that these linkages possess special connectors, designs, features, and/or other attributes, that facilitate their repeated disconnection and reconnection to converters (i.e. during the process of farm extrusion). While most of the converters are represented by gray circles, e.g. 255, some of the converters are represented by black circles, e.g. 245, in order to facilitate the reader's ability to discern their movement from left to right in the illustrations as the process of farm extrusion is illustrated.

With respect to the original farm configuration illustrated in FIG. 16, three new converters 264, 265, and 266 have been added to the expanding edge of the farm by linkages represented as thick gray lines, e.g. 263, and now constitute the farm's expanding edge.

The linkage 246a, which was disconnected from converter 241 in FIG. 17, is now reconnected 261 to newly added converter 264, and thereby links it to anchor 242. As that linkage 246b is shortened 257, the corresponding linkage 244 which is at its shortest length is now relaxed, allowing it to lengthen in concert with the shortening of linkage 246b. This shortening of linkage 246b, and relaxation of linkage 244, helps to again move 258 the farm away from its root location.

A similar action occurs with respect to every other anchor and its respective converter(s).

Figure 20:
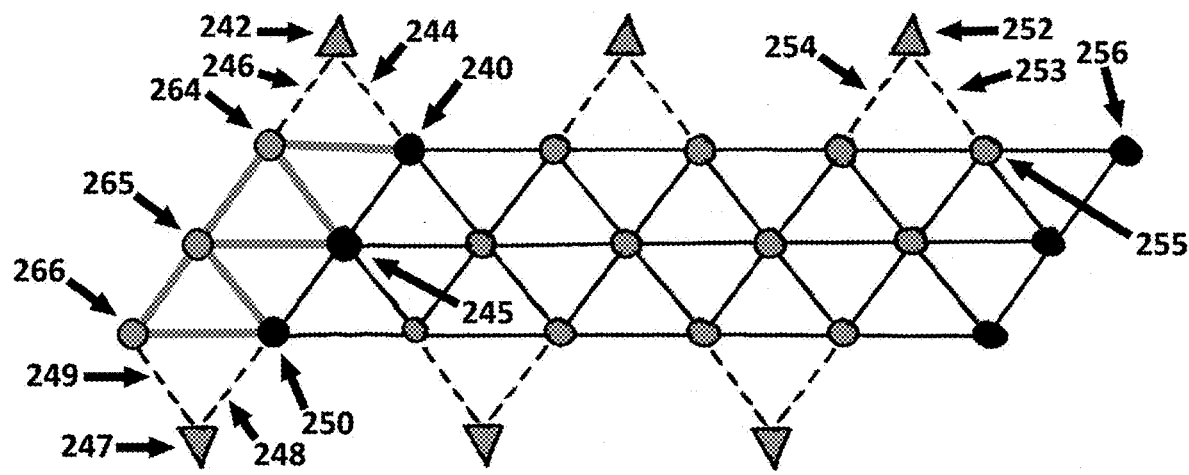
FIG. 20 illustrates a conceptual top-down view of the same extruded farm embodiment of the present disclosure illustrated and discussed in relation to FIGS. 16-19.

FIG. 20 illustrates a conceptual top-down view of the same extruded farm embodiment of the present disclosure illustrated and discussed in relation to FIGS. 16-19, but the embodiment configuration illustrated in FIG. 20 corresponds to a time after the configuration illustrated in FIG. 19.

This illustration is a completion of a cycle of farm extrusion the farm configuration illustrated in FIG. 16, and continued with the farm configurations illustrated in FIGS. 17-19.

In this illustration, wave energy converters are represented as black or gray circles, e.g. 240 and 255. The triangles, e.g. 242, represent anchoring elements, e.g. anchors and/or propulsive buoys. And, the linkages binding those converters and anchoring elements together, preferably in an "elastic" fashion, are represented as solid and dashed, e.g. 244, connecting lines. The linkages connecting anchoring elements to converters are represented as dashed lines in order to facilitate their discernment and to denote the possibility that these linkages possess special connectors, designs, features, and/or other attributes, that facilitate their repeated disconnection and reconnection to converters (i.e. during the process of farm extrusion). While most of the converters are represented by gray circles, e.g. 255, some of the converters are represented by black circles, e.g. 245, in order to facilitate the reader's ability to discern their movement from left to right in the illustrations as the process of farm extrusion is illustrated.

With respect to the original farm configuration illustrated in FIG. 16, three new converters 264, 265, and 266 have been added to the expanding edge of the farm by linkages represented as thick gray lines, e.g. 263, and now constitute the farm's expanding edge.

With respect to the original farm configuration illustrated in FIG. 16, the three converters 240, 245, and 250, which had constituted the farm's expanding edge, have now moved, and/or been moved, one "row" to the right. Similarly, the three converters, e.g. 256, represented by black circles at the right side of the farm, have moved, and/or been moved, one "row" of converters to the right of anchor 252.

The illustrated extruded farm now includes three additional converters, and has been lengthened by a commensurate amount. The expanding edge of the farm, e.g. converters 264, 265, and 266, are in the same root location that was occupied by converters 240, 245, and 250, in the original shorter farm configuration illustrated in FIG. 16. However, the "leading edge" and/or "tip" of the farm, e.g. converter 256, has now been extended, lengthened, and/or moved, to a position even further from the farm's root location.

Figure 21:
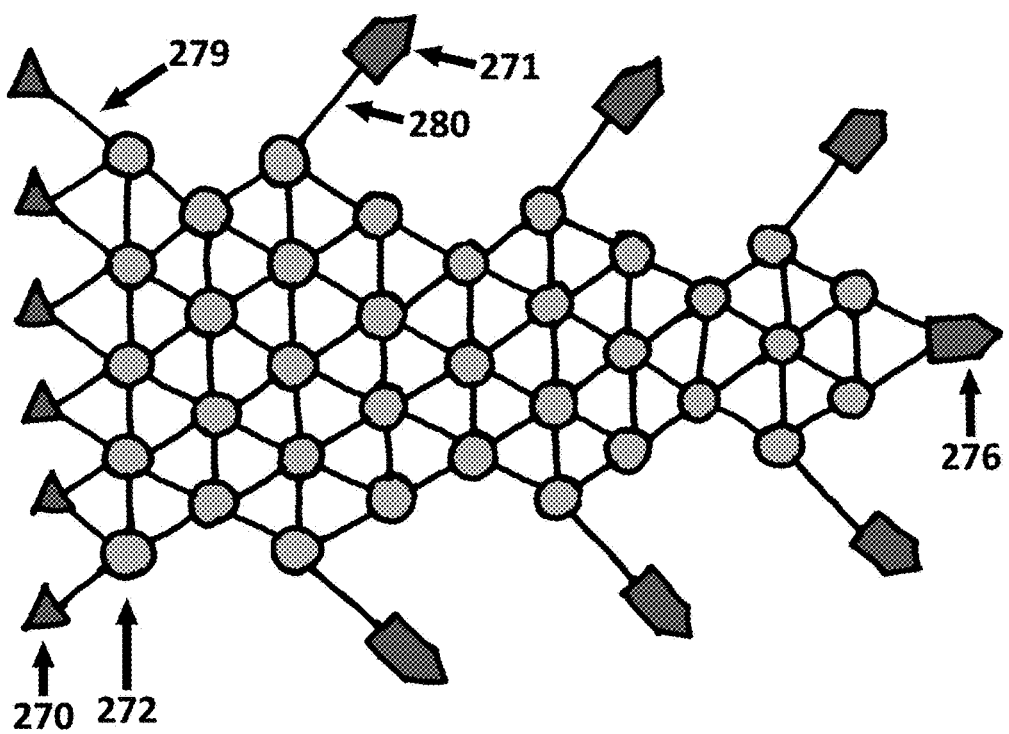
FIG. 21 illustrates a conceptual top-down symbolic view of an extruded farm embodiment of the present disclosure.
Figure 22:
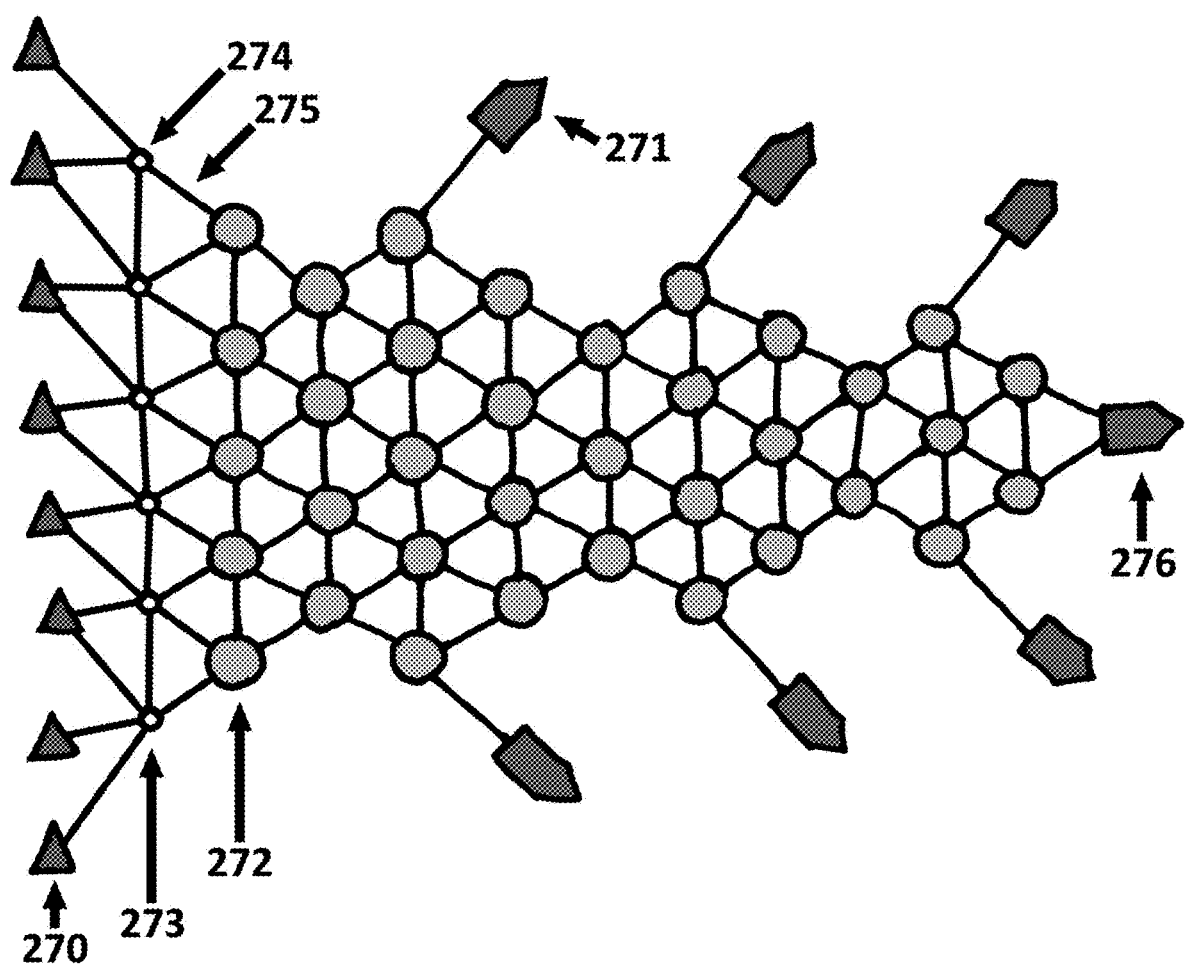
FIG. 22 illustrates a conceptual top-down view of the same extruded farm embodiment of the present disclosure illustrated and discussed in relation to FIG. 21.
Figure 23:
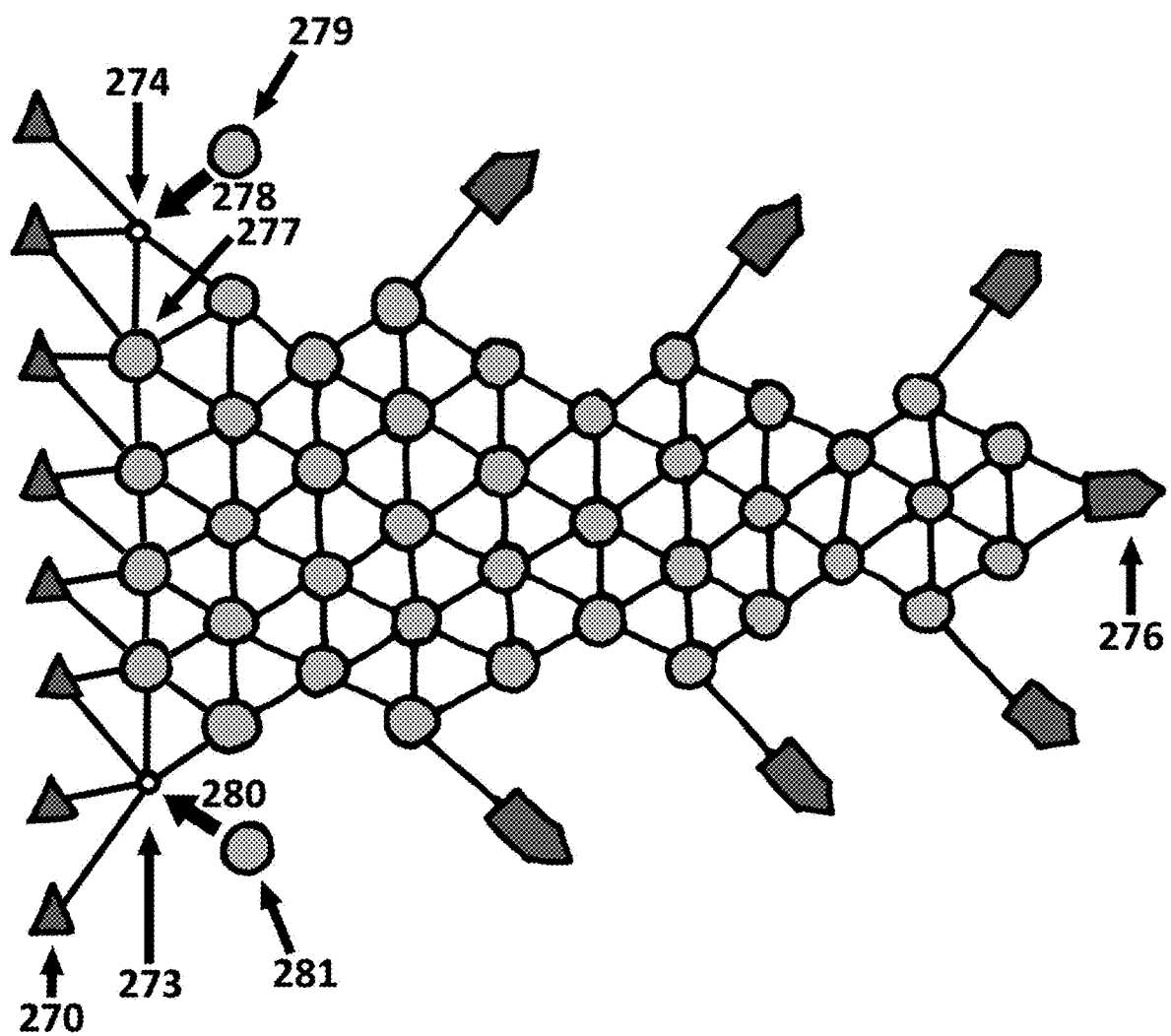
FIG. 23 illustrates a conceptual top-down view of the same extruded farm embodiment of the present disclosure illustrated and discussed in relation to FIGS. 21 and 22.

FIGS. 21-23 illustrate an embodiment of the present disclosure as it undergoes a process whereby converters are added to the farm's expanding edge, and the farm is lengthened and projected further away from that root location (and into the sea).

FIG. 21 illustrates a conceptual top-down symbolic view of an extruded farm embodiment of the present disclosure.

An elongate network of wave energy converters is tethered to a left-most array 270 of anchors. Propulsive buoys and/or vessels, e.g. 271, pull the farm away from the anchors and create, establish, maintain, and/or restore, an appropriate degree of separation among the converters, and a helpful degree of tension within the linkages that bind them together.

In this extruded farm, the anchors 270 are proximate to the farm's root location, and the left-most column 272 of converters constituted the farm's current expanding edge.

FIG. 22 illustrates a conceptual top-down view of the same extruded farm embodiment of the present disclosure illustrated and discussed in relation to FIG. 21, but the embodiment configuration illustrated in FIG. 22 corresponds to a time after the configuration illustrated in FIG. 21.

The illustrated farm is the same as the one illustrated in FIG. 21. However, in the configuration illustrated here, a column 273 of placeholder buoys have been inserted into the farm at the farm's expanding edge. A placeholder buoy is a simple, relatively small buoy which "holds the place" at which a converter will be added. Placeholder buoys allow the network of linkages that must be added in order to incorporate new converters to be added to, and/or incorporated within, the farm prior to the insertion of new converters, thus decoupling the deployment process.

The addition of the placeholder buoys, e.g. 274, and their corresponding linkages, e.g. 275, to the converters of the farm's prior expanding edge, has lengthened the farm, and increased the distance between the farm's tip, i.e. propulsive vessel 276, and the farm's root location, e.g. proximate to anchors 270.

FIG. 23 illustrates a conceptual top-down view of the same extruded farm embodiment of the present disclosure illustrated and discussed in relation to FIGS. 21 and 22, but the embodiment configuration illustrated in FIG. 23 corresponds to a time after the configuration illustrated in FIG. 22.

The illustrated farm is the same as the ones illustrated in FIGS. 21 and 22. However, in the configuration illustrated here, the column 273 of placeholder buoys has been partially replaced with converters, e.g. 277.

A placeholder buoy 274 is being replaced 278 by a converter 279. Another placeholder buoy 273 is being replaced 280 by a converter 281.

After the last placeholder buoy is replaced with a converter, the process of farm expansion and/or extrusion illustrated in FIGS. 21-23 can be repeated an arbitrary number of times, growing the length of the farm to any desired length.

At the same time as the length of the farm in FIGS. 21-23 was increased, the width of its base (i.e. the width of the farm, in terms of number of converters, along an axis normal to the farm's longitudinal axis) has increased. The farm being extruded in FIGS. 21-23 is not only increasing in length, e.g. with respect to the separation of propulsive vessel 276 and the farm's root location near anchors 270, the width of its base is also increasing.

Farms may be extruded so as to create elongate farms of approximately constant width. They may also be extruded so as to create elongate farms with a "tapered" configuration of converters, i.e. farms that are wider at their bases and narrower at their tips. In fact, the extrusion of farms of any shape, configuration, pattern, and/or arrangement of converters and/or propulsive buoys is within the scope of the current disclosure.

Figure 24:
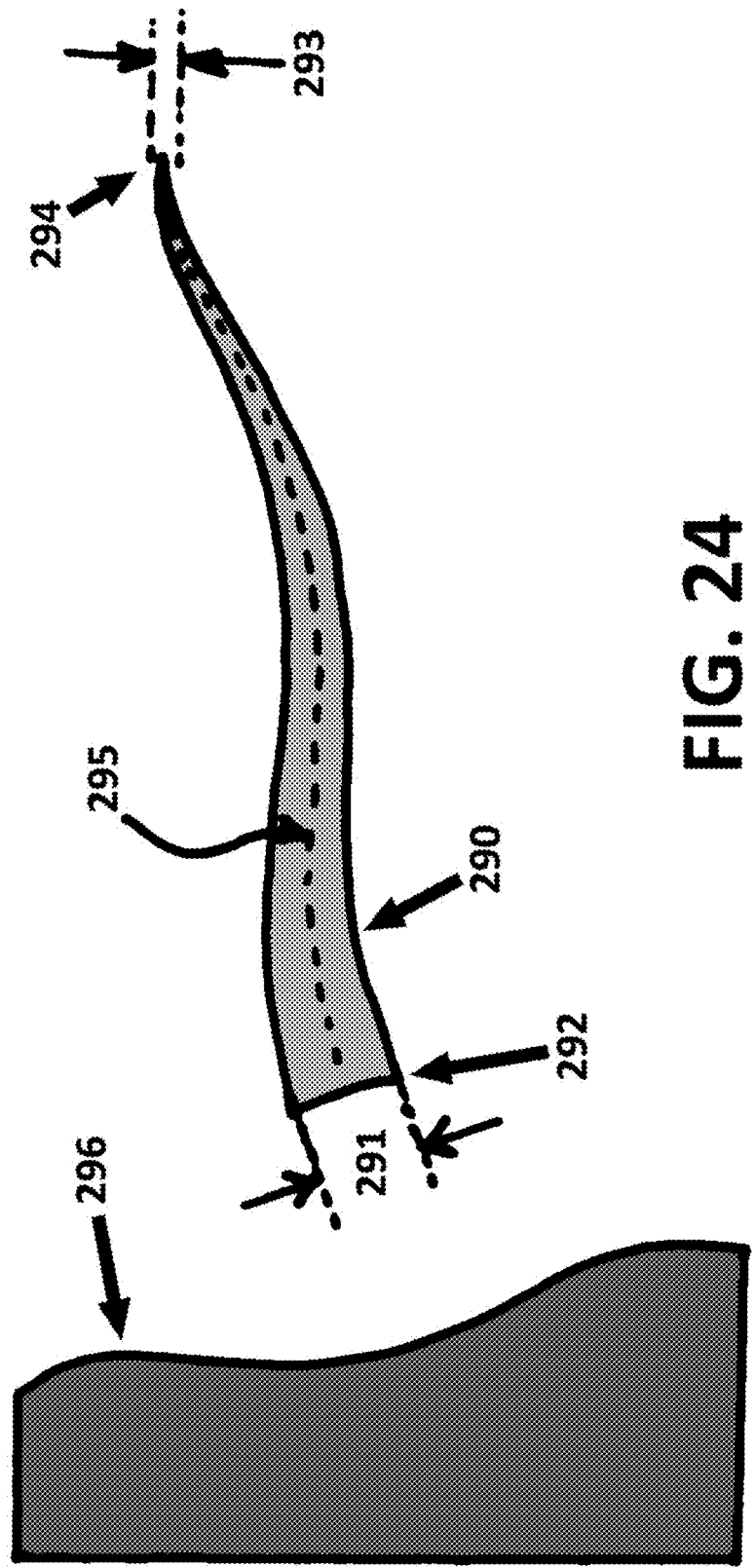
FIG. 24 illustrates a conceptual top-down view of an embodiment of the present disclosure.

FIG. 24 illustrates a conceptual top-down view of an embodiment of the present disclosure.

The illustrated farm 290 has been extruded by the method of the present disclosure. The width 291 of the farm's base 292 is greater than the width 293 of its tip 294 and/or that portion of the farm most distant (with respect to distance along its longitudinal axis 295) from the farm's base 292.

The distance of the farm 290, and/or the farm's base 292, from a shoreline 296 is arbitrary, and all deployment locations, orientations, shapes, sizes (number of converters), and lengths, are included within the scope of the present disclosure.

Figure 25:
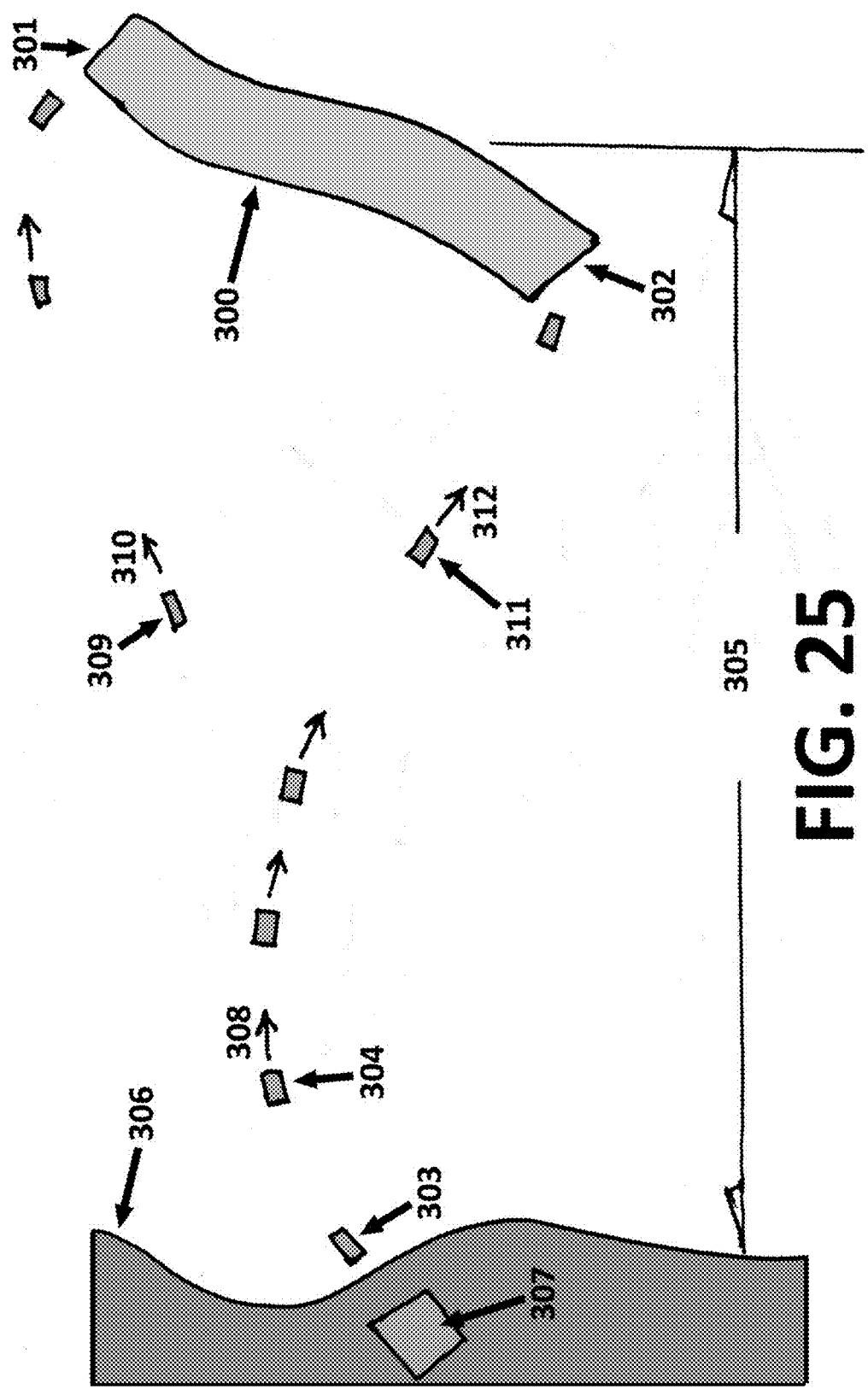
FIG. 25 illustrates a conceptual top-down symbolic view of an embodiment of the present disclosure.

FIG. 25 illustrates a conceptual top-down symbolic view of an embodiment of the present disclosure.

A farm 300 is being "extruded" into a sea (or other body of water) from two ends 301 and 302 of the farm. Individual converters and/or pre-linked assemblies of converters, e.g. 303 and 304, are moved to either end of the farm and incorporated therein. The farm's distance 305 from land 306 is arbitrary and all such distances are included within the scope of the present disclosure.

In the illustration of FIG. 25, converters are unpacked, fabricated, assembled, and/or deployed from an onshore facility 307, and placed into the sea. In one embodiment, those converters are interconnected, along with propulsive buoys, into "farm modules," e.g. 303.

In one embodiment, those farm modules, e.g. 304, when complete, migrate, e.g. 308, under their own propulsive forces to the growing farm 300. Some modules, e.g. 309, may migrate, e.g. 310, to one end 301 of the farm, while other modules, e.g. 311, may migrate 312 to another end 302 of the growing farm.

In another embodiment, the farm modules are towed to the growing farm by tug boats.

In another embodiment, the farm modules are individual self-propelling wave energy converters which move themselves to their respective places of insertion into the growing farm, i.e. using water propellers immersed in the body of water and/or air propellers operating in the air and/or rigid sails and or some other means. I.e., a plurality of wave energy converters can each have their own propulsive units and/or elements such as propellers and/or sails.

Figure 26:
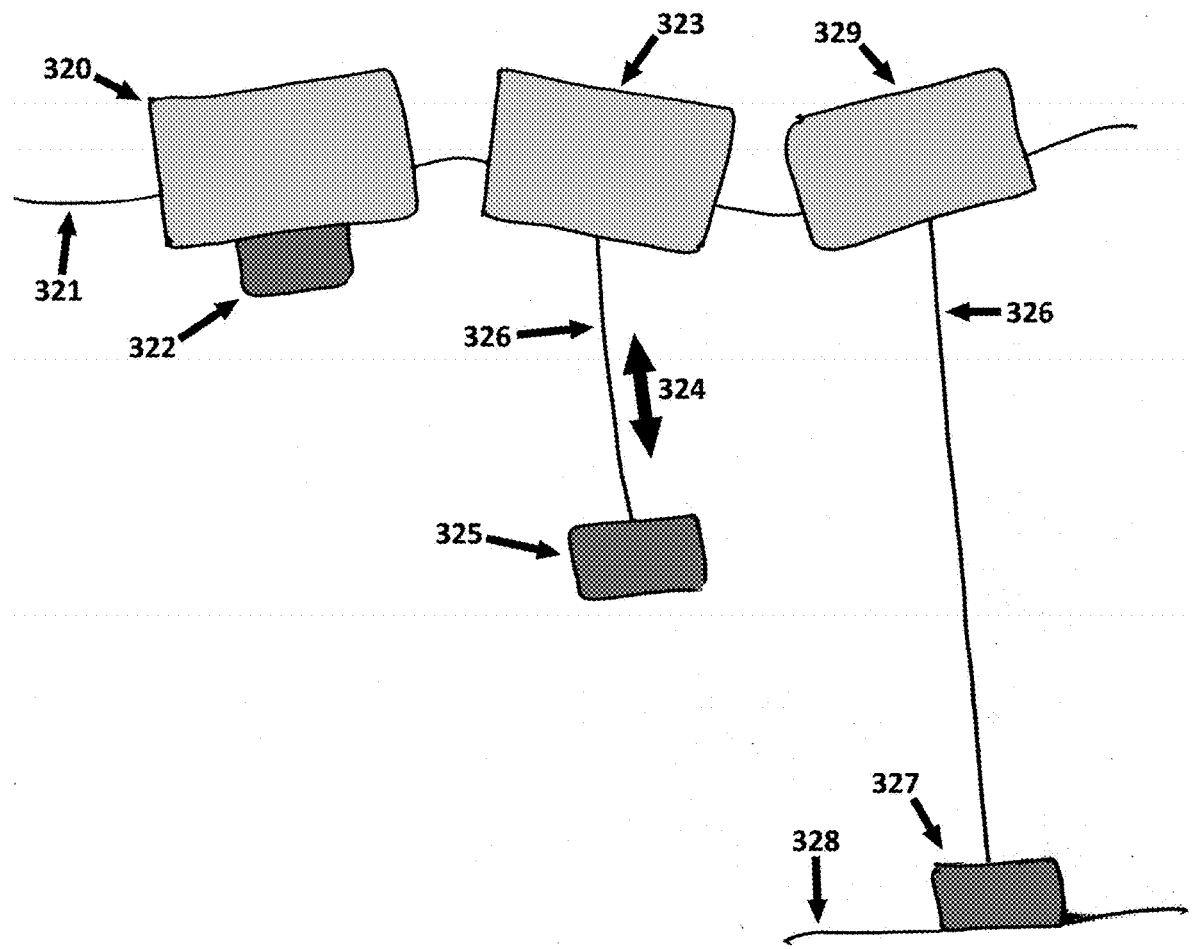
FIG. 26 illustrates a side view of an anchoring buoy of an embodiment of the present disclosure in various representative configurations.

FIG. 26 illustrates a side view of an anchoring buoy of an embodiment of the present disclosure in various representative configurations.

A buoy 320 floats adjacent to an upper surface 321 of a body of water, and is adapted to drop an anchor 322. Such a buoy is well suited for use within an extruded farm.

When a portion of an extruded farm is in a favorable position and/or location, and/or is in danger of being driven (e.g. by wind, waves, currents, etc.) into an unfavorable position and/or location, then one or more of these "anchoring buoys" 323 can drop 324 an anchor 325 (suspended by flexible cable and/or connector 326), and, after the anchor 327 is dropped, and resting on the seafloor 328, the buoy 329 can provide a relatively stable anchoring point capable of holding an extruded farm, and/or a portion thereof, in a favorable position and/or location until such a time as it becomes advantageous to raise 324 the anchor 325 and store it 321 against the underside of the buoy (or in some other raised position).

When its anchor is raised, an anchoring buoy is free to drift with the extruded farm to which it is linked. When its anchor is deployed, and resting on the seafloor, an anchoring buoy is held to a relatively fixed position adjacent to the surface 321 of the body of water on which the buoy 329 floats.

While propulsive buoys may be sufficient to keep an extruded farm in its proper shape, and/or orientation, and/or at its proper location, deploying anchors may allow the farm to avoid expending energy (e.g. in the case the propulsive buoys use electrically-powered propellers). Deploying anchors may also provide a positionally-stabilizing effect when conditions (e.g. of wind, wave, current, etc.) become extreme and potentially, if not actually, overwhelm and/or exceed the capabilities of the propulsive buoys.

Figure 27:
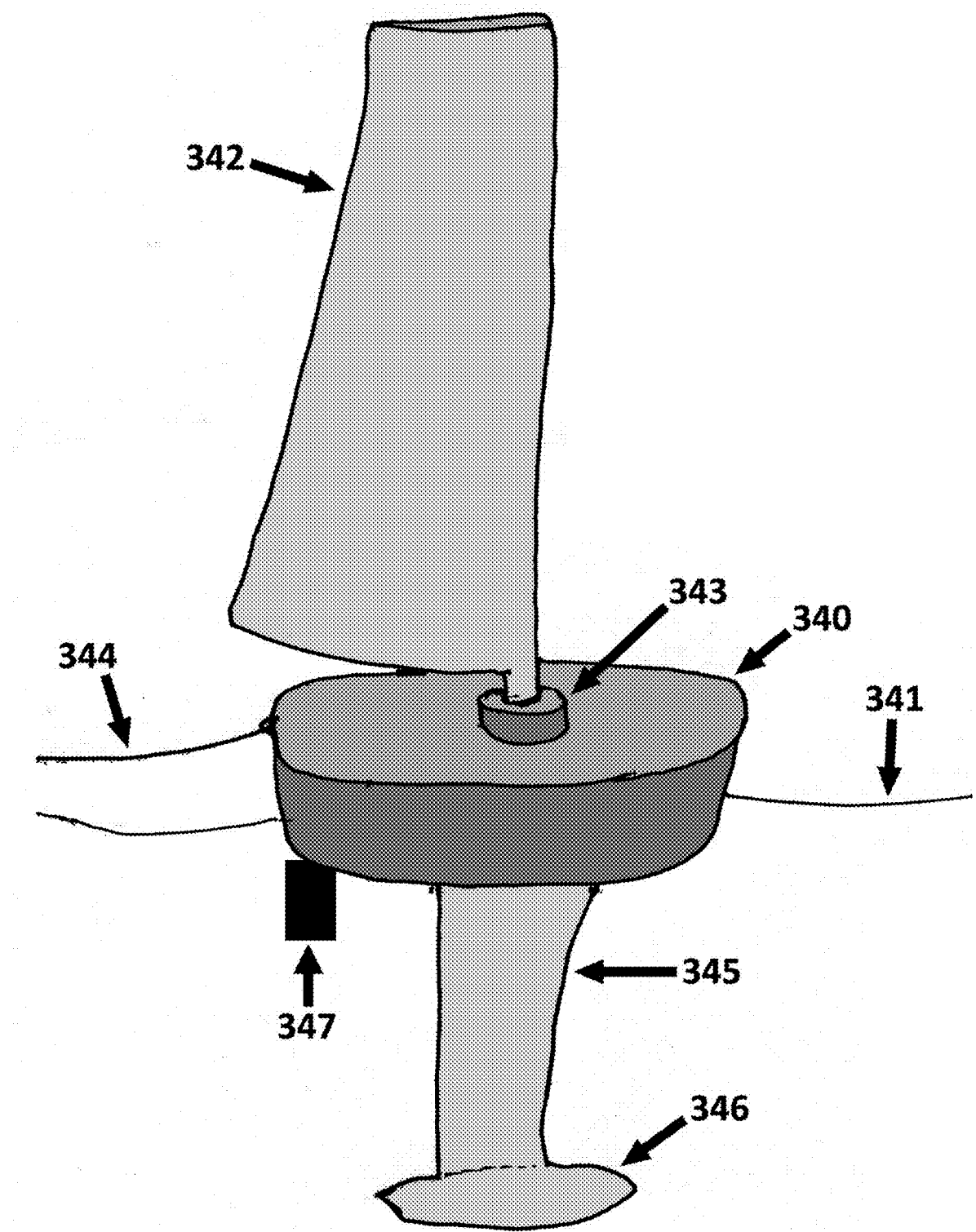
FIG. 27 illustrates a perspective view of a tug vessel, or drone, of an embodiment of the present disclosure that generates thrust with a rigid sail.

FIG. 27 illustrates a perspective view of a tug vessel, or drone, of an embodiment of the present disclosure that generates thrust with a rigid sail.

A propulsive buoy 340 floats adjacent to an upper surface 341 of a body of water. The buoy incorporates a sail 342 (in this case a rigid sail) that may be rotated about its vertical axis by a rotation assembly 343 and/or mechanism. One or more linkages, e.g. 344, connects the "sail buoy" to an extruded farm (not shown), allowing it to impart propulsive forces to the farm and change its orientation and/or position.

A keel 345 and ballast weight 346 provide the buoy with orientational stability in the same manner as a keel and ballast weight provide stability to sail boats. A rudder 347 can help to direct the orientation and thrust of the buoy.

Figure 28:
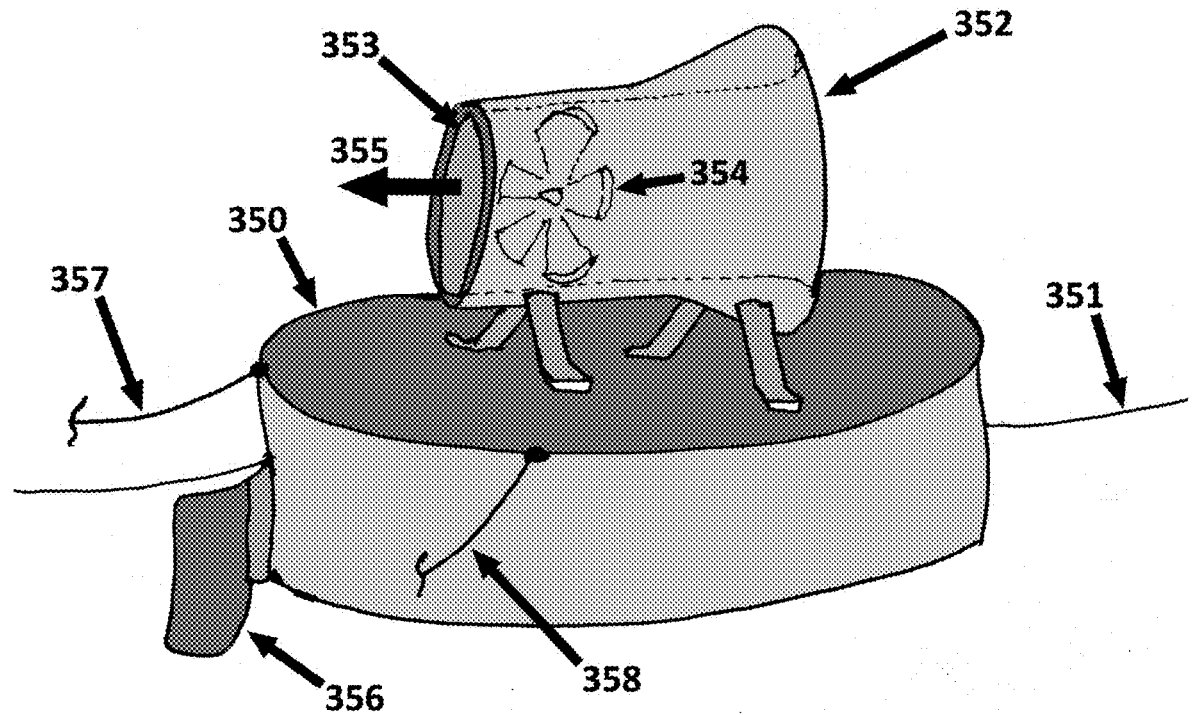
FIG. 28 illustrates a perspective view of a tug vessel, or drone, of an embodiment of the present disclosure that generates thrust with a ducted fan.

FIG. 28 illustrates a perspective view of a tug vessel, or drone, of an embodiment of the present disclosure that generates thrust with a ducted fan.

A propulsive buoy 350 floats adjacent to an upper surface 351 of a body of water. The buoy incorporates a "ducted fan" 352 adjacent to and above an upper surface of the buoy. The ducted fan has a shroud 353 within which a fan 354 or turbine (inside the shroud 353) drives 355 air through the ducted fan. A rudder 356 helps to steer the buoy and direct its thrust 355. One or more linkages, e.g. 357 and 358, connect the buoy to an extruded farm (not shown), allowing it to impart propulsive forces to the farm and change its orientation and/or position.

Figure 29:
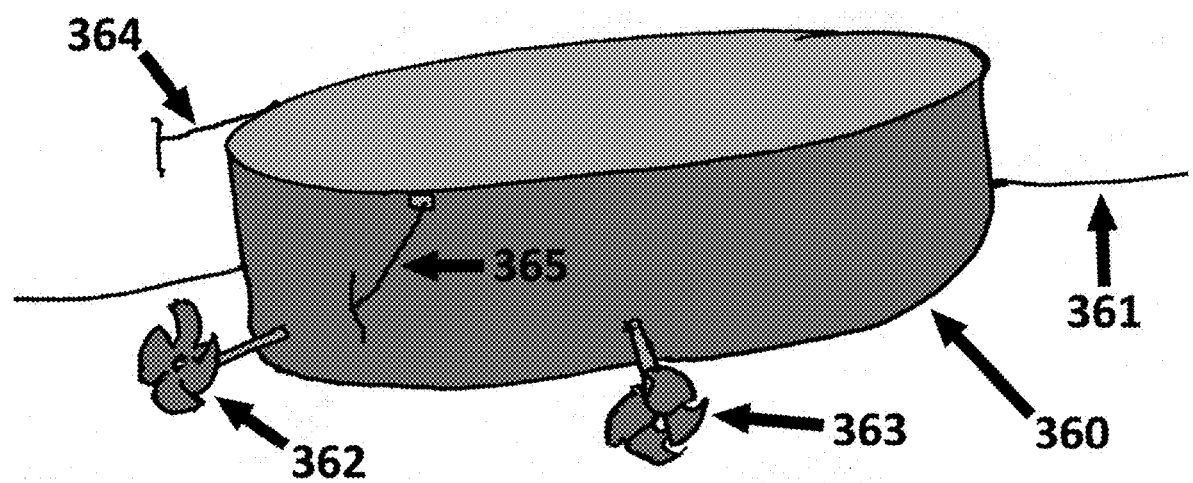
FIG. 29 illustrates a perspective view of a tug vessel, or drone, of an embodiment of the present disclosure that generates thrust with a pair of motor-driven propellers.

FIG. 29 illustrates a perspective view of a tug vessel, or drone, of an embodiment of the present disclosure that generates thrust with a pair of motor-driven propellers.

A propulsive "motorized" buoy 360 floats adjacent to an upper surface 361 of a body of water. The buoy contains two propellers 362 and 363 which are rotated by motors and/or engines within and/or adjacent to the buoy 360. One or more linkages, e.g. 364 and 365, connect the "motorized buoy" to an extruded farm (not shown), allowing it to impart propulsive forces to the farm and change its orientation and/or position. Through variations in the relative rotational speeds, and/or through differences in the absolute rotational speeds, of the two propellers, the angular orientation (relative to angular rotations about the buoy's vertical axis of symmetry) of the buoy can be adjusted.

Figure 30:
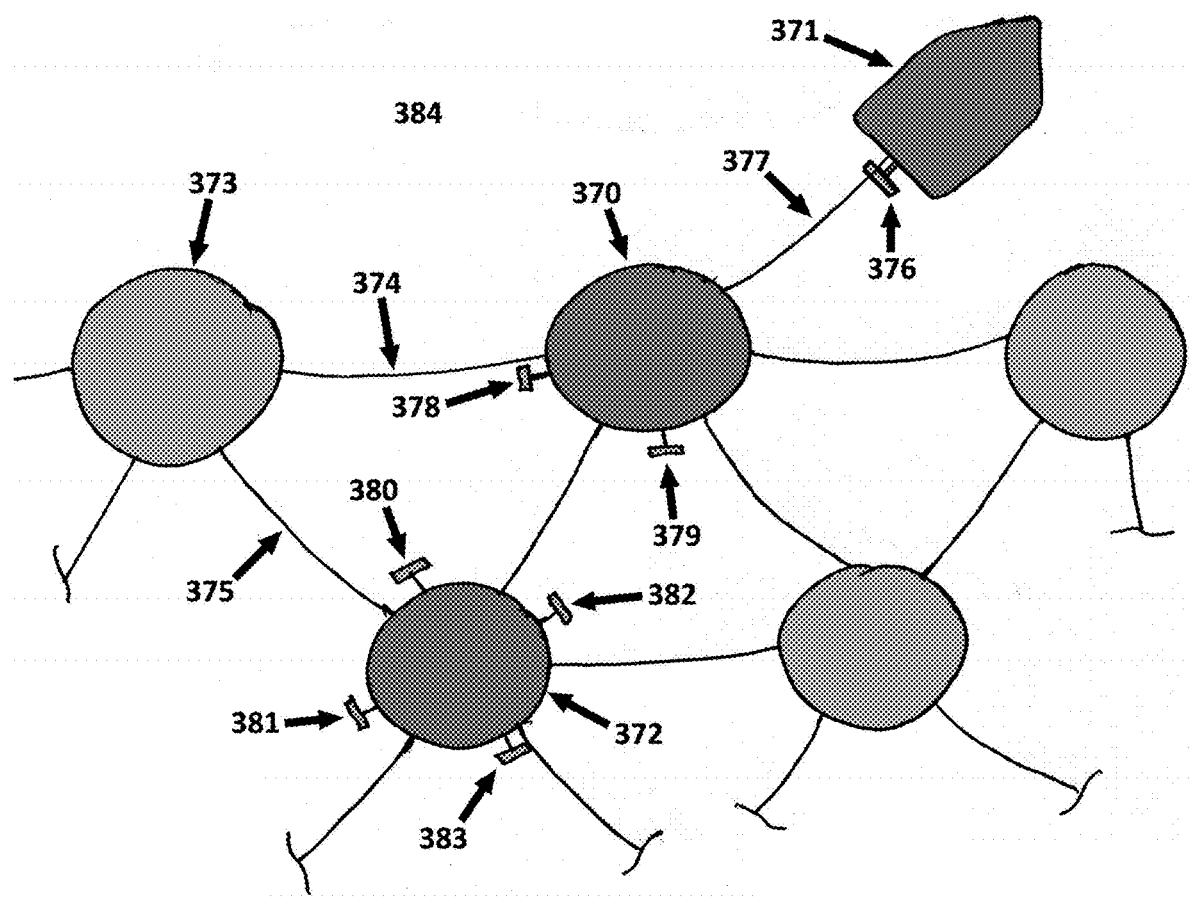
FIG. 30 illustrates a top-down view of a portion of a self-propelled farm (i.e. multi-converter) embodiment of the present disclosure.

FIG. 30 illustrates a top-down view of a portion of a self-propelled farm (i.e. multi-converter) embodiment of the present disclosure.

A number of motorized propulsive buoys 370, 371, and 372 float on a surface of a body of water 384 and provide propulsive forces to an extruded farm, e.g. including converter 373 and linkages 374 and 375.

Motorized propulsive buoy 371 has a single propeller 376 which (in conjunction with an optional rudder, not shown) can impart thrust of a range of angular orientations with respect to the longitudinal axis of its respective extruded farm, and/or of a local portion of its respective extruded farm. This motorized propulsive buoy transmits its propulsive forces to an extruded farm via linkage 377, although it could utilize two or more such linkages to transmit its propulsive forces.

Motorized propulsive buoy 370 has two propellers 378 and 379 which can each rotate in "forward" and "reverse" directions, and can therefore generate "forward" and "reverse" thrusts, with respect to the buoy 370. Thus, through the combinations of forward and reverse thrusts, this buoy is capable of imparting thrusts of any angular direction to its respective extruded farm, and/or of a local portion of its respective extruded farm. This motorized propulsive buoy transmits its propulsive forces to an extruded farm via one or more linkages, e.g. 374, and will typically utilize four or more such linkages to transmit its propulsive forces to its respective farm.

Motorized propulsive buoy 372 has four propellers 380, 381, 382, and 383. In one embodiment, the four propellers can each rotate in "forward" directions, and can therefore each generate "forward" and "reverse" thrusts, with respect to the buoy 372. In another embodiment, the four propellers can each rotate in both "forward" and "reverse" directions, and can therefore each generate "forward" and "reverse" thrusts, with respect to the buoy 372. And, opposing pairs of propellers can work together to effectively double the compound thrust imparted to the buoy.

Thus, through the combinations of forward and reverse thrusts, this buoy is capable of imparting thrusts of any angular direction to its respective extruded farm, and/or of a local portion of its respective extruded farm. This motorized propulsive buoy transmits its propulsive forces to an extruded farm via one or more linkages, e.g. 375, and will typically utilize four or more such linkages to transmit its propulsive forces to its respective farm.

Such propulsive buoys also work in concert with, and provide benefit and/or advantage, to non-extruded and/or "static" farms. They can provide propulsive forces to a farm that may be useful in countering local ocean currents, winds, etc.

Figure 31:
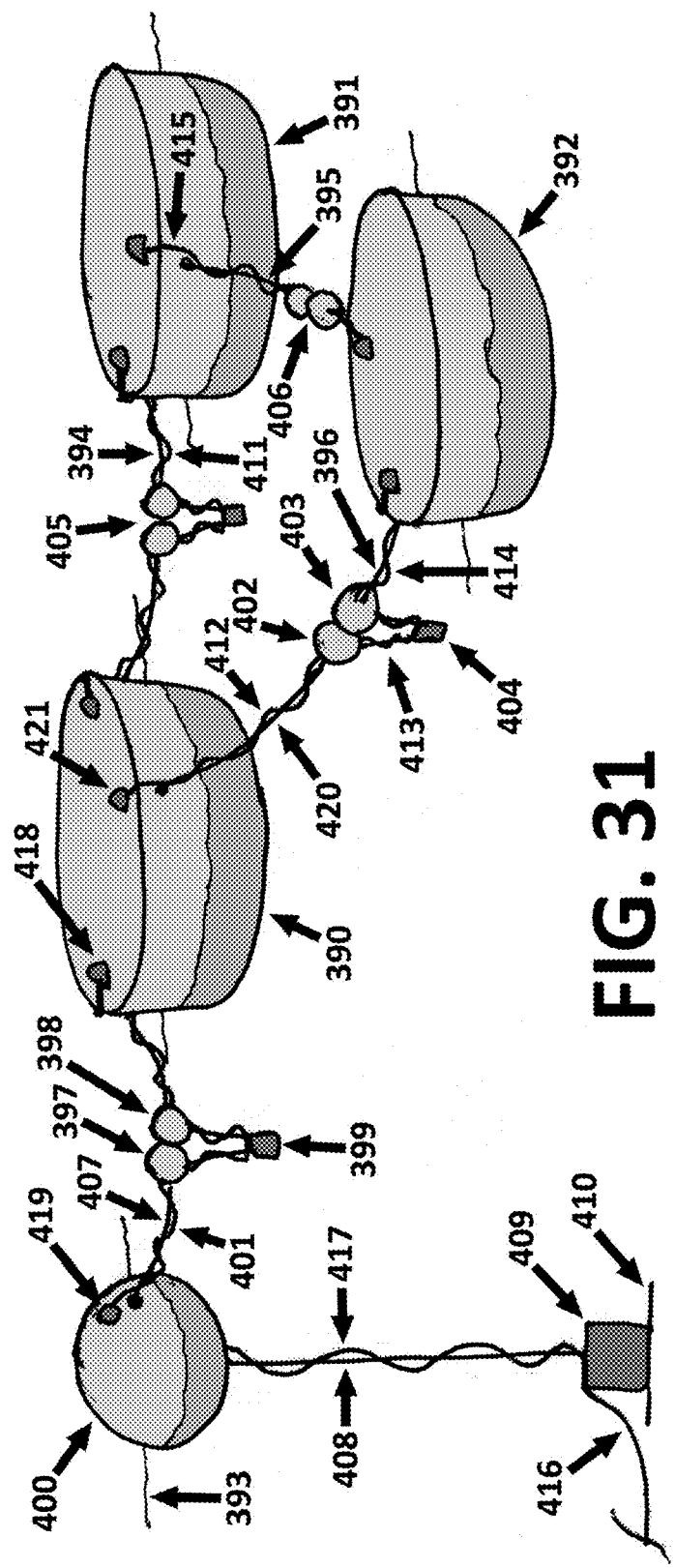
FIG. 31 is a perspective side view of a self-propelled farm of the current disclosure.

FIG. 31 is a perspective side view of a self-propelled farm of the current disclosure, in which self-propelled wave energy converters are interconnected by tensioning mooring cables and electrical cables, and in which the geospatial stability of the farm is assisted by an anchor.

Self-propelled wave energy converters 390, 391, and 392 float at an upper surface 393 of a body of water. The wave-energy converters use their self-propulsion to maintain their relative positions within the farm, and to preserve the nominal position and orientation of the farm. The three converters are tethered together by mooring cables 394, 395, and 396, which are positioned adjacent to the surface of the body of water.

These mooring cables are "elastic" in that they allow converters to move apart from one another, over a limited distance, and, when they move further apart than a nominal, default separation distance, "buoyant separation-restoring assemblies" resist that separation, storing potential energy in the process, which they then expend drawing the "over-separated" converters back to a separation distance no greater than their nominal separation distances.

Note that different mooring cables in the farm might have different "nominal, default separation distances."

In other words, the mooring cables connecting together different ones of the converters include buoyant separation-restoring assemblies composed of two floats e.g. 397 and 398 and a weight e.g. 399. When the converters or other buoyant elements at opposite ends of a mooring cable move apart, e.g. when converter 390 and mooring buoy 400 move apart, the floats 397 and 398 of buoyant separation-restoring assembly 397-399 are drawn apart, and the weight 399 is lifted, storing gravitational potential energy and increasing the tension in mooring cable 401 and in buoyant separation-restoring assembly 397-399. Accordingly, a separation-restoring force develops that tends to draw converter 390 and mooring buoy 400 back together. Likewise, for buoyant separation-restoring assemblies 402-404 and 405.

Mooring cables 394, 395, and 396, contain and/or incorporate a single buoyant separation restoring assembly each, i.e. 405, 406, and 402-404, respectively.

Converter 390 is connected, via a tensioning mooring cable 407, i.e. containing and/or incorporating a buoyant separation restoring assembly 397-399, to a mooring buoy 400 which is itself connected by a mooring cable 408 to an anchor 409 that rests on the seafloor 410.

The converters 390, 391, and 392 are interconnected by electrical cables 411, 412, 413, 414, and 415. These interconnecting electrical cables are tethered to, wound around, joined with, and/or otherwise supported by, the associated tensioning mooring cables 394, 396, and 395, respectively.

Any power, or at least some of the power, which the converters generate and/or consume is shared within at least some parts of this farm-specific electrical grid. The inter-converter electrical grid 394, 395, and 396 is electrically connected to a remote consumer and/or source of electrical power by subsea power cable 416, which ascends to the surface via electrical cable 417, which is, like the inter-converter power cables, tethered to, wound around, joined with, and/or otherwise supported by, the associated mooring cable 408, and connects to the farm electrical grid via electrical cable 401, and connectors 418 and 419, on the converter 390 and the mooring buoy 400, respectively.

Figure 32:
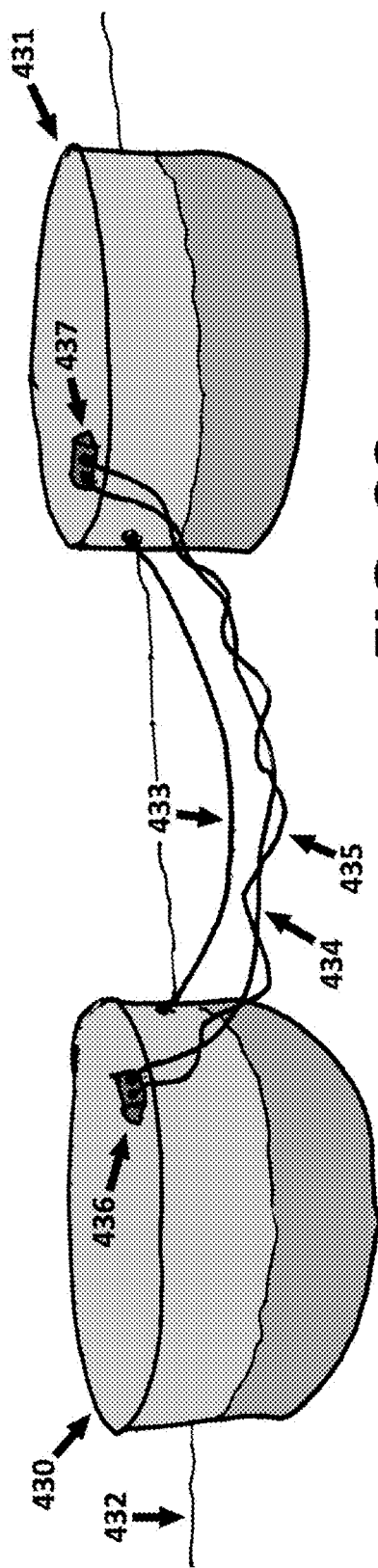
FIG. 32 is a perspective side view of an embodiment of the current disclosure.

FIG. 32 is a perspective side view of an embodiment of the current disclosure. A pair of self-propelled wave energy converters 2030 and 2040, float adjacent to the surface 2050 of a body of water, and are representative of a farm of such devices. The converters are interconnected by both mooring 2060 and by a pair 2070 and 2080 of electrical cables (connected to externally accessible electrical connectors 2090 and 2100 on the converters).

In one embodiment, each of the electrical cables in the pair may be "mono-pole" cables or wires, and one might be dedicated to transmitting electrical voltages and/or currents while the other cables serves as the "ground." Throughout this disclosure "mono-pole" or "monopole" can refer to cables having a single conducting wire, "di-pole" or "dipole" can refer to cables having two mutually insulated conducting wires, and "tri-pole" or "tripole" can refer to cables having three mutually insulated conducting wires.

Figure 33:
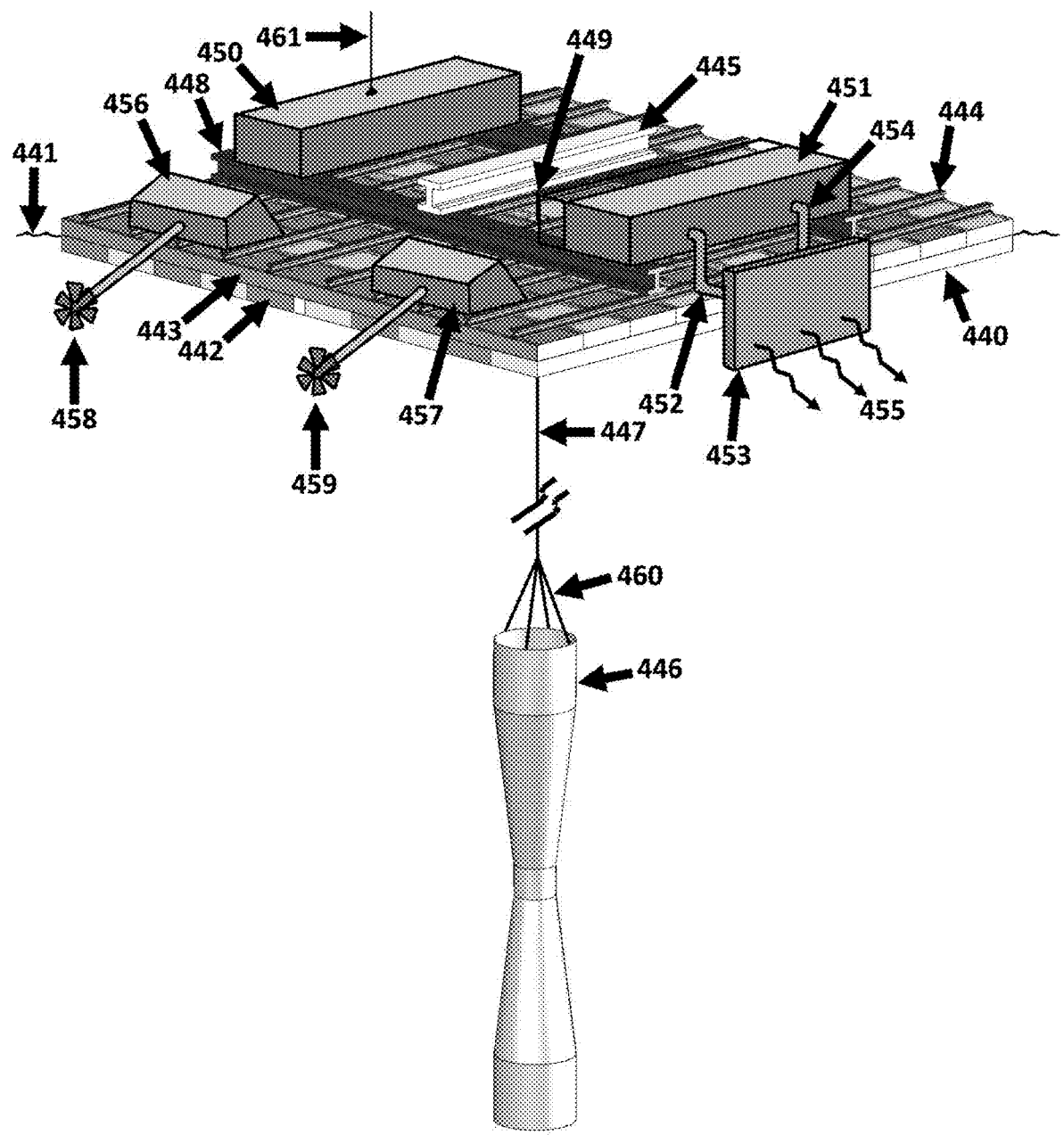
FIG. 33 illustrates a perspective view of a self-propelled wave-energy converter embodiment of the current disclosure.

FIG. 33 illustrates a perspective view of a self-propelled wave-energy converter embodiment of the current disclosure, and is representative of one of the many types of self-propelled wave-energy converters that are incorporated within a self-propelled farm embodiment of the current disclosure.

A buoy 440, and/or buoyant platform, floats adjacent to an upper surface 441 of a body of water. The buoyant platform is composed, and/or comprised, of buoyant "slats," e.g. 442 and 443. The slats, e.g. 443, of the upper layer are affixed to an underlying lower layer of slats, e.g. 442. The slats of the upper and lower layers are approximately orthogonal to one another.

Mounted on, and/or affixed to, an upper surface of the upper layer of slats, e.g. 443, are "load distribution struts," e.g. 444. These approximately rigid struts help to distribute downward forces imparted to strut 445, e.g. by the flexible connector and/or cable which connects that strut to submerged Venturi tube 446, across the upper surface of the buoyant platform 443. They also help to collect and concentrate upward, e.g. buoyant, forces imparted to lower surfaces of the buoyant platform, e.g. 442, to facilitate their non-destructive transmission to strut 445, and to the cables 447 and 460 to which it is attached.

Additional orthogonal layers of struts overly the bottom layer of struts, e.g. 444. Fewer, but larger and stronger struts, e.g. 448, are affixed to the bottom layer of struts, e.g. 444. A single upper-most strut 445 is affixed to the intermediate layer of struts, e.g. 448. Downward forces imparted to strut 445, by cable 447 attached to strut 445 at 449, are distributed down and across the underlying layers of struts, on to, and through, the orthogonal layers of buoyant struts, e.g. 442 and 443. In this way, the broad, diffuse buoyant forces applied to the buoyant platform by the body of water on which it floats, can be focused so as to counter the downward force applied to strut 445 at connector 449.

A generator located within the Venturi tube, generated electrical power in response to the up-and-down heave-driven vertical motions of the buoyant platform 440. The electrical power is communicated and/or transmitted to the buoyant platform through an electrical cable affixed to, and/or combined with, cable 447.

Mounted atop the intermediate layer of struts, e.g. 448, are two "computing chambers" 450 and 451. Inside these computing chambers are mounted, and/or affixed, computing circuits, computers, and/or computing devices, and related accessories (e.g. routers, switches, etc.). Fluid based heat exchangers, e.g. 452, 453, 454, circulate water, and/or other heat absorbing fluids and/or gases, by means of pipes, e.g. 452 and 454, through each computing chamber carrying heat generated within each computing chamber, through the operation of at least some of the computing devices therein, to a radiator 453 where at least a portion of that heat is transferred 455, communicated, radiated, and/or imparted, to the water 441 on which the embodiment floats, warming that water in the process.

Mounted atop the bottom-most layer of struts, e.g. 444, are two propeller-driven propulsion assemblies 456 and 457, units, and/or mechanisms. Using a portion of the electrical power generated by the generator in the Venturi tube 446, motors within propulsion assemblies 456 and 457, turn propellers 458 and 459. Through the controlled variation of, and/or the creation of a differential, thrust generated by propellers 458 and 459, the buoyant platform and the embodiment, may be propelled in any direction, and "driven" to a specific location (e.g. to specific geospatial coordinates) on the surface of the body of water.

Facilitating communications with remote networks, computers, stations, operators, drones, planes, ships, etc., is a radio, and its antenna 461, which enables direct communications with complementary terrestrial radios, satellites, other converters, etc.

Figure 34:
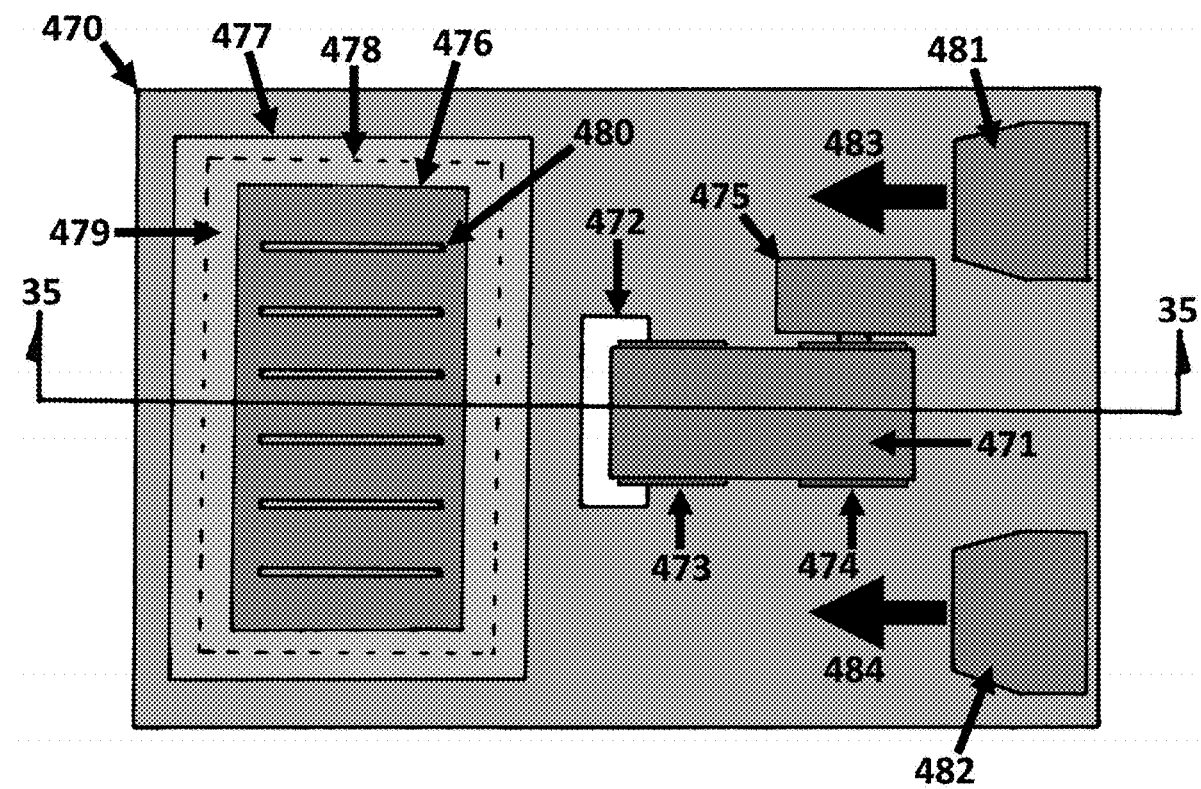
FIG. 34 illustrates a top-down view of a self-propelled wave-energy converter embodiment of the current disclosure.

FIG. 34 illustrates a top-down view of a self-propelled wave-energy converter embodiment of the current disclosure, and is representative of one of the many types of self-propelled wave-energy converters that are incorporated within a self-propelled farm embodiment of the current disclosure.

A buoy 470 floats adjacent to an upper surface of a body of water. One end of a multi-stranded, laterally-distributed, cable 471, chain, rope, and/or flexible connector, passes downward through an aperture 472 in the buoy 470 where it is connected to a submerged inertial mass (not shown). Each strand of the multi-stranded cable 471 is wound around a pair of drums 473-474, pulleys, and/or rotating capstans, which increases the frictional binding between the cable and the drum. The other end of each strand of the multi-stranded cable 471 is affixed to drum 474. As waves, especially the heave, moves the buoy up and down, the cable 471 rotates the drums 473-474 which causes a shaft of generator 475, and/or power take-off (PTO), to rotate as well, thereby generating electrical power.

Within one end of buoy 470 is embedded a sealed and/or waterproof and/or water-tight "computational chamber and/or enclosure" 476. Computational chamber 476 is attached to an upper surface of buoy 470 by a flange 477. The walls, e.g. 476, of the computational chamber below the flange, and the corresponding and/or adjacent walls of the buoy, e.g. 478, are separated by a gap 479. Within the space and/or gap, the computational chamber is surrounded by, and/or bathed in, a thermally-conductive fluid. Heat-dissipating fins, e.g. 480, are attached and/or affixed to an upper surface of the computational chamber and facilitate and/or expedite the transfer of the heat trapped within the chambers to the air above and/or around the buoy.

Affixed to and/or within the computational chamber 476 is a plurality of computing devices, computing circuits, computers, and/or networked computers. At least some of those computing devices are energized, at least in part, with electrical power generated by the PTO 475. At least a portion of the heat generated by the computing devices within the computational chamber 476 is convectively transmitted to the thermally conductive upper wall of the chamber, and to the fins, e.g. 480, thereon, from which it is convectively transmitted and/or transferred to the air above the buoy.

A pair of ducted fans 481 and 482 mounted to an upper surface of the buoy 470 provide forward thrust 483 and 484, respectively, with which the embodiment may propel itself (e.g., to the right of the page with respect to the orientation of the illustration) across the surface of the water on which it floats. When active, the ducted fans consume a portion of the electrical power generated by the generator 475. Through the controlled variation of, and/or the creation of a differential, thrust generated by the fans, the buoy, may propel itself in any direction, and/or to any specific location (e.g. to specific geospatial coordinates) on the surface of the body of water.

Figure 35:
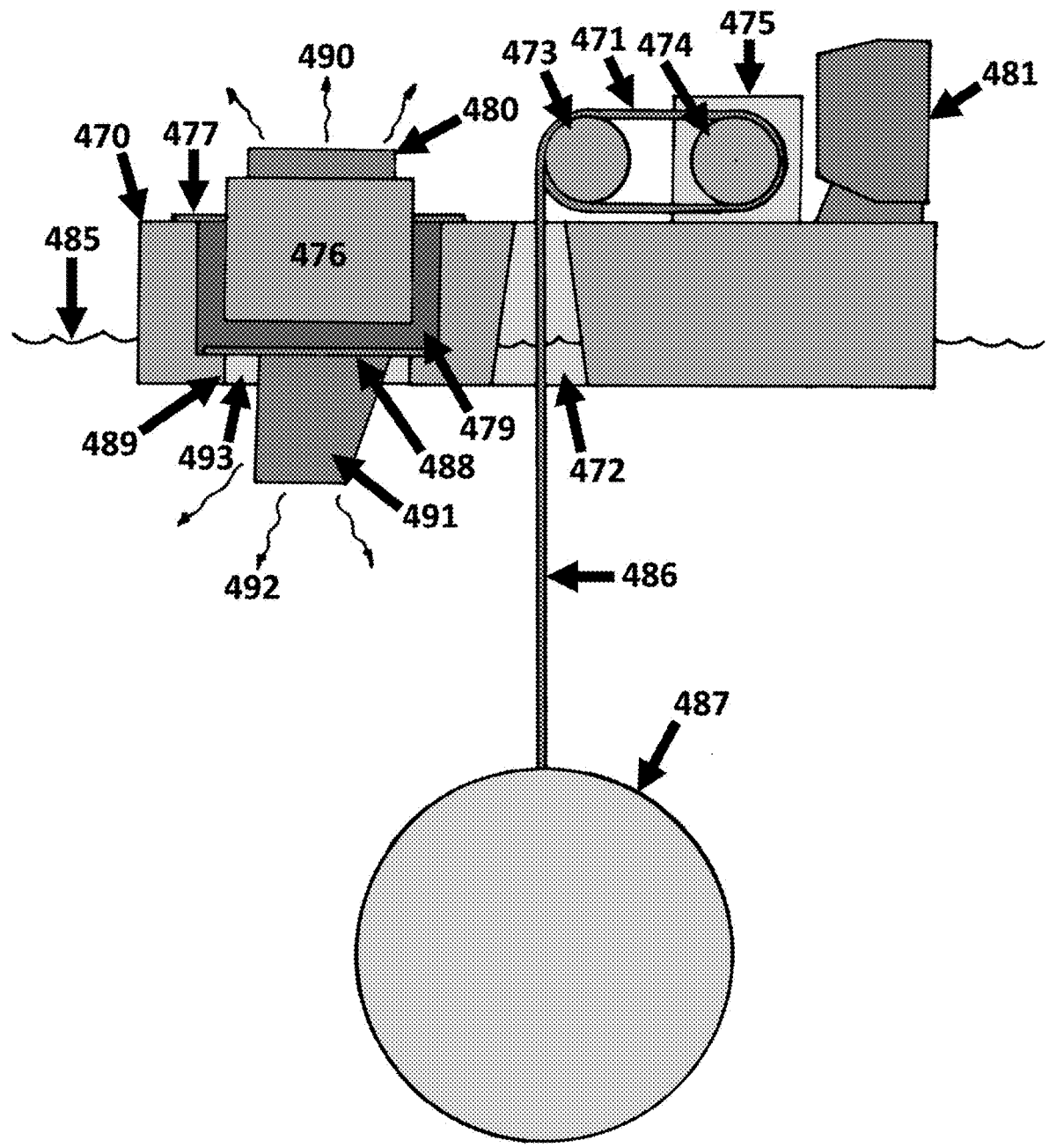
FIG. 35 illustrates a sectional view of the same self-propelled wave-energy converters embodiment of the current disclosure illustrated in FIG. 34.

FIG. 35 illustrates a sectional view of the same self-propelled wave-energy converter embodiment of the current disclosure illustrated in FIG. 34, and taken along section line 35-35 specified in FIG. 34.

A buoy 470 floats adjacent to an upper surface 485 of a body of water. One end of a multi-stranded, laterally-distributed, cable 471/486, chain, rope, and/or flexible connector, passes downward through an aperture 472 in the buoy 470 where it is connected to a submerged inertial mass 487. Each strand of the multi-stranded cable 471/486 is wound around a pair of drums 473 and 474, pulleys, and/or rotating capstans, which increases the frictional binding between the cable and the drum. The other end of each strand of the multi-stranded cable 471 is affixed to drum 474.

As waves, especially the heave, moves the buoy up and down, the cable 471 rotates the drums 473 and 474 which causes a shaft of generator 475, and/or power take-off (PTO), to rotate as well, thereby generating electrical power.

Within one end of buoy 470 is embedded a sealed and/or waterproof and/or water-tight "computational chamber and/or enclosure" 476. Computational chamber 476 is attached to an upper surface of buoy 470 by a flange 477. Those walls of the computational chamber 476 which are located below the flange 477, and the corresponding and/or adjacent walls of the buoy, are separated by a gap, space, and/or void 479. Within the space 479 and/or gap, the computational chamber 476 is surrounded by, and/or bathed in, a thermally-conductive fluid. A thermally-conductive plate 488 and/or wall is affixed to an upper surface of a "ledge" 489 at the base of the aperture 479 and/or space containing the thermally-conductive fluid 479. This structural configuration provides a secure surface on which to attach plate 488 while providing the downward surface of that plate with significant contact with the water below the buoy.

Heat-dissipating fins, e.g. 480, are attached and/or affixed to an upper surface of the computational chamber 476 and facilitate and/or expedite the transfer 490 of the heat trapped within the chambers to the air above and/or around the buoy. Heat-dissipating fins, e.g. 491, are also attached and/or affixed to a thermally-conductive plate 488, and/or wall, that separates the space 479 from the water 485 surrounding the buoy 470. The fins 491 allow heat conductively transmitted and/or transferred from the fluid 479 to the plate 488 to be more quickly and efficiently transmitted 492 and/or transferred to the water beneath the buoy.

Affixed to and/or within the computational chamber 476 is a plurality of computing devices, computing circuits, computers, and/or networked computers. At least some of those computing devices are energized, at least in part, with electrical power generated by the PTO 475. At least a portion of the heat generated by the computing devices within the computational chamber 476 is convectively transmitted to the thermally conductive upper wall of the chamber, and to the upper, e.g. 480, fins thereon, from which it is convectively transmitted and/or transferred to the air above the buoy.

At least a portion of the heat generated by the computing devices within the computational chamber 476 is convectively transmitted to the thermally conductive side and bottom walls of the chamber 476, and thereafter and/or therethrough to the heat-conductive fluid surrounding the chamber 476. At least a portion of the heat in the fluid 479 is transferred and/or transmitted to the plate 488, and thereafter and/or therethrough to lower fins, e.g. 491, thereon, from which it is convectively transmitted and/or transferred to the water below the buoy.

A pair of ducted fans, e.g. 481, are mounted to an upper surface of the buoy 470 and provide forward thrust with which the embodiment may propel itself across the surface 485 of the water on which it floats. When active, the ducted fans consume a portion of the electrical power generated by the generator 475. Through the controlled variation of, and/or the creation of a differential, thrust generated by the fans, and in conjunction with the directionally-stabilizing influence of the rudder-like fins 491, the buoy, may propel itself in any direction, and/or to any specific location (e.g. to specific geospatial coordinates) on the surface of the body of water.

Figure 36:
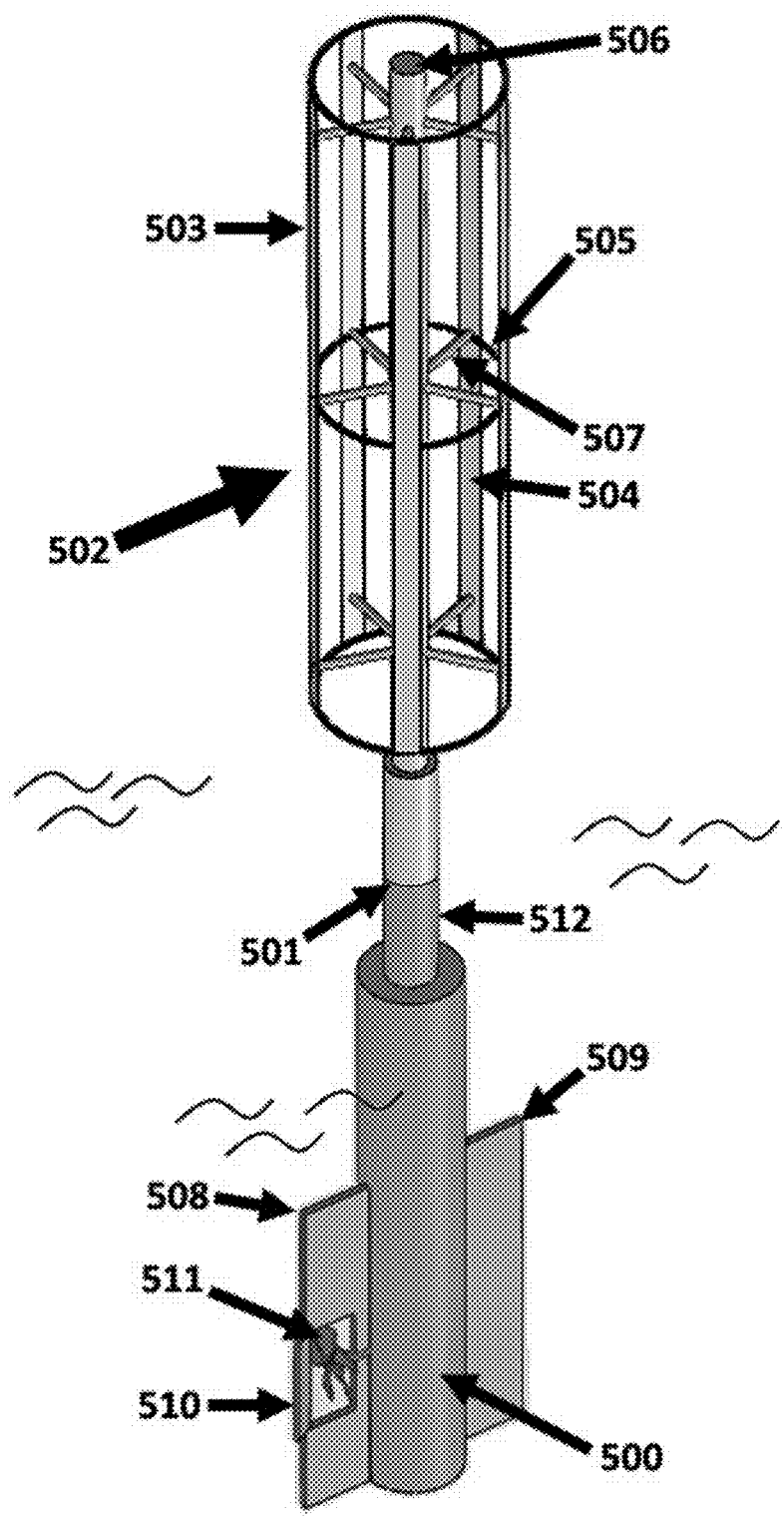
FIG. 36 illustrates a perspective view of a self-propelled wind-energy converter embodiment of the current disclosure.

FIG. 36 illustrates a perspective view of a self-propelled wind-energy converter embodiment of the current disclosure, and is representative of one of the many types of self-propelled wind-energy converters that are incorporated within a self-propelled farm embodiment of the current disclosure.

The illustrated embodiment extracts energy from the wind by means of a vertical-axis wind turbine (VAWT), and propels itself by means of a propeller driven by an electrical motor (inside the spar buoy). Through the control of the orientation of a rudder and the rate at which the propeller rotates, the embodiment is able to adjust and/or control its course, e.g., its angular orientation, and its speed.

A "spar buoy" 500 floats adjacent to an upper surface 501 of a body of water over which wind 502 passes, flows, and/or blows. Wind 502 drives and turns the blades of a vertical-axis wind turbine 503 rotatably connected to a generator positioned inside the spar buoy 500. The blades, e.g., 504, of the wind turbine are fixedly attached to rings, e.g., 505, that are fixedly attached to a central shaft 506 by spokes, e.g., 507.

A pair of opposing vanes 508 and 509 act as a keel and help to direct the forward motion of the device. Movably attached to one of the vanes 508 is a rudder 510 whose rotation about a vertical axis (e.g., via an electrical motor controlled hinge or gear) helps to guide the angular orientation, e.g., the course, of the device when thrust is generated by the propeller 511, and/or by the drag force imparted to the turbine by the wind 502 that it obstructs.

The portion 512 of the spar buoy 500 that crosses the surface 501 of the water is of a smaller diameter than the lower portion of the buoy so that the responsivity of the buoy to heave wave motion is reduced.

At least a portion of the electrical power generated by the embodiment's generator in response to the turning of the VAWT when blown by wind 502 is communicated to, and/or consumed by, a plurality, plethora, network, assembly, collection, and/or array, of computational devices, circuits, devices, machines, and/or modules, positioned within the spar buoy 500, so as to provide at least a portion of those computational devices with the electrical power required to enable them to execute, process, complete, and/or compute, various computational tasks communicated to them from an external source, network, computer, customer, client, application, and/or system.

At least a portion of the electrical power generated by the embodiment's generator in response to the turning of the VAWT when blown by wind 502 is communicated to, and/or consumed by electric motors that spin the propeller 511 (e.g., in either clockwise and/or counter-clockwise directions, thereby providing forward and/or backward thrust), and control the angular orientation of the rudder 510.

Figure 37:
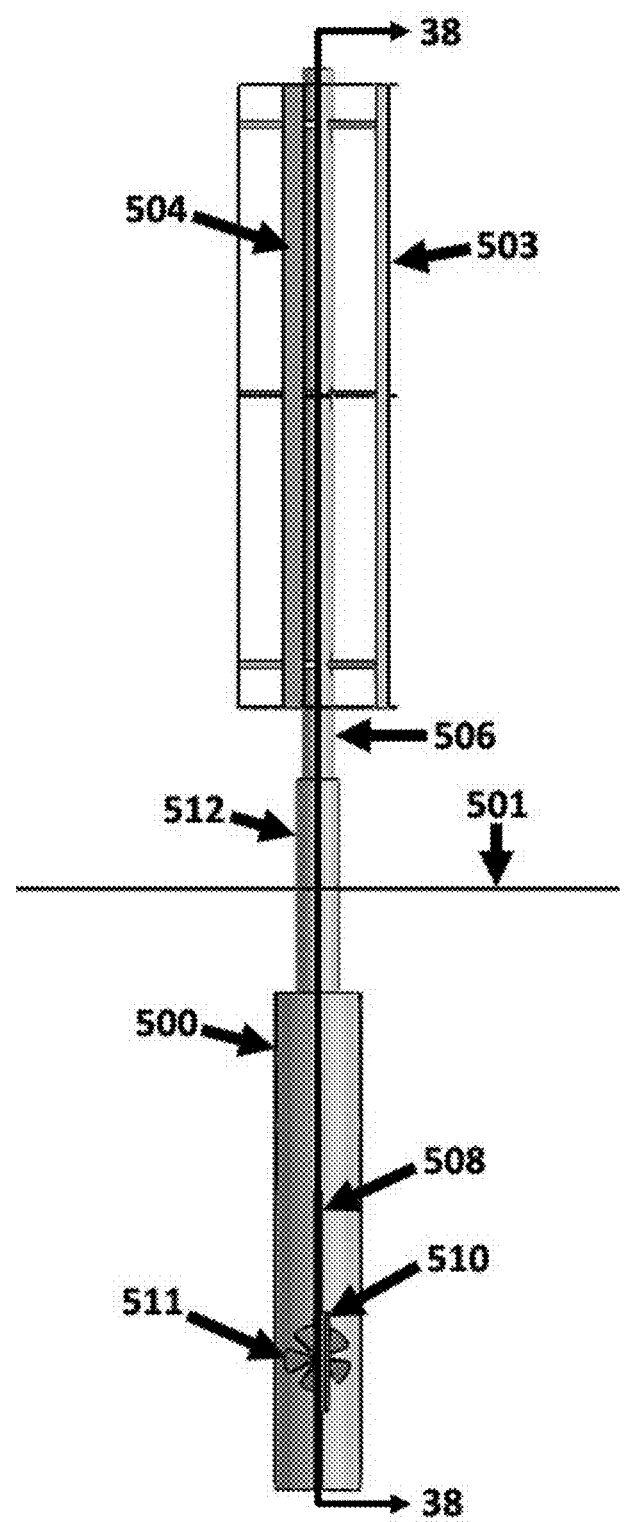
FIG. 37 illustrates a side view of the same self-propelled wind-energy converter illustrated and discussed in relation to FIG. 36.

FIG. 37 illustrates a side view of the same self-propelled wind-energy converter illustrated and discussed in relation to FIG. 36.

Figure 38:
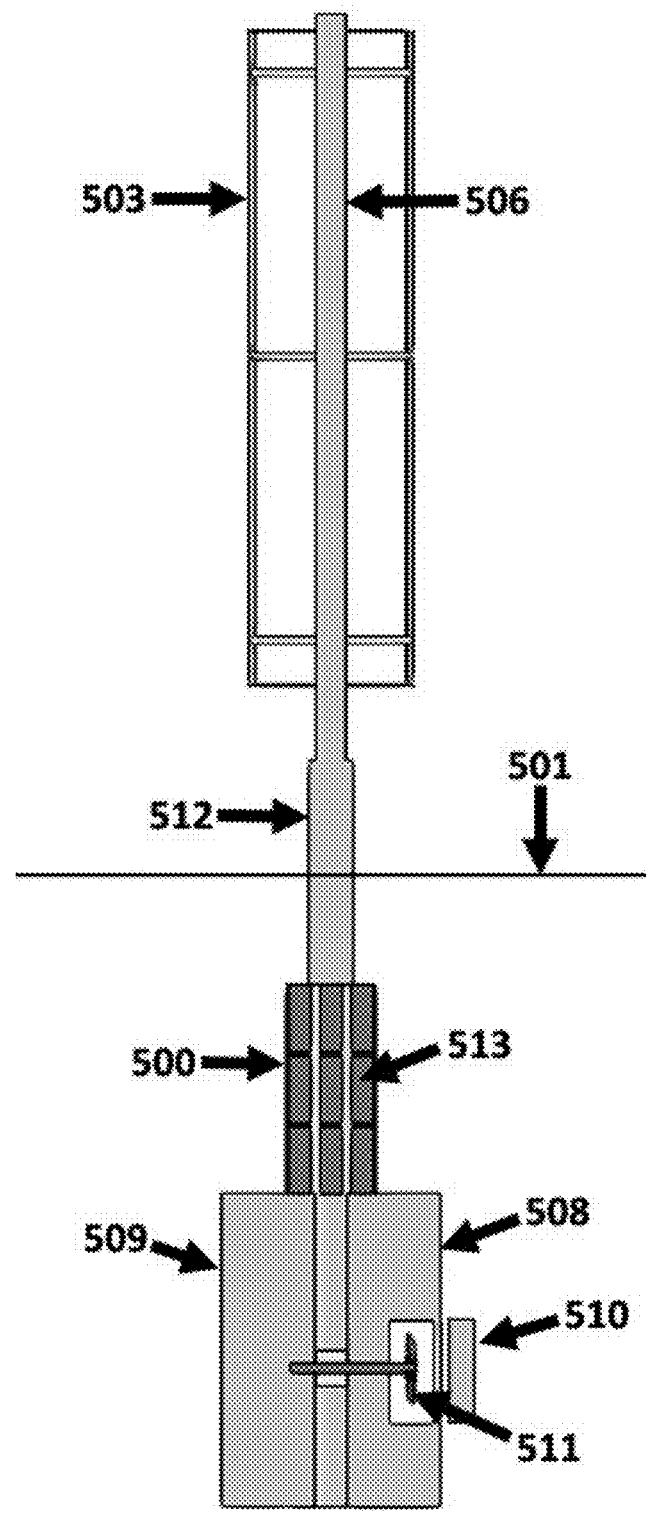
FIG. 38 illustrates a side sectional view of the same self-propelled wind-energy converter illustrated and discussed in relation to FIGS. 36 and 37.

FIG. 38 illustrates a side sectional view of the same self-propelled wind-energy converter illustrated and discussed in relation to FIGS. 36 and 37, wherein the vertical section plane is specified in FIG. 37 and the section is taken across line 38-38.

Mounted against the interior wall of the hollow spar buoy 500 are a plurality of computational modules 513 and/or devices. Heat generated by those computational modules 513 is conductively and passively transferred to the outside water 501.

Figure 39:
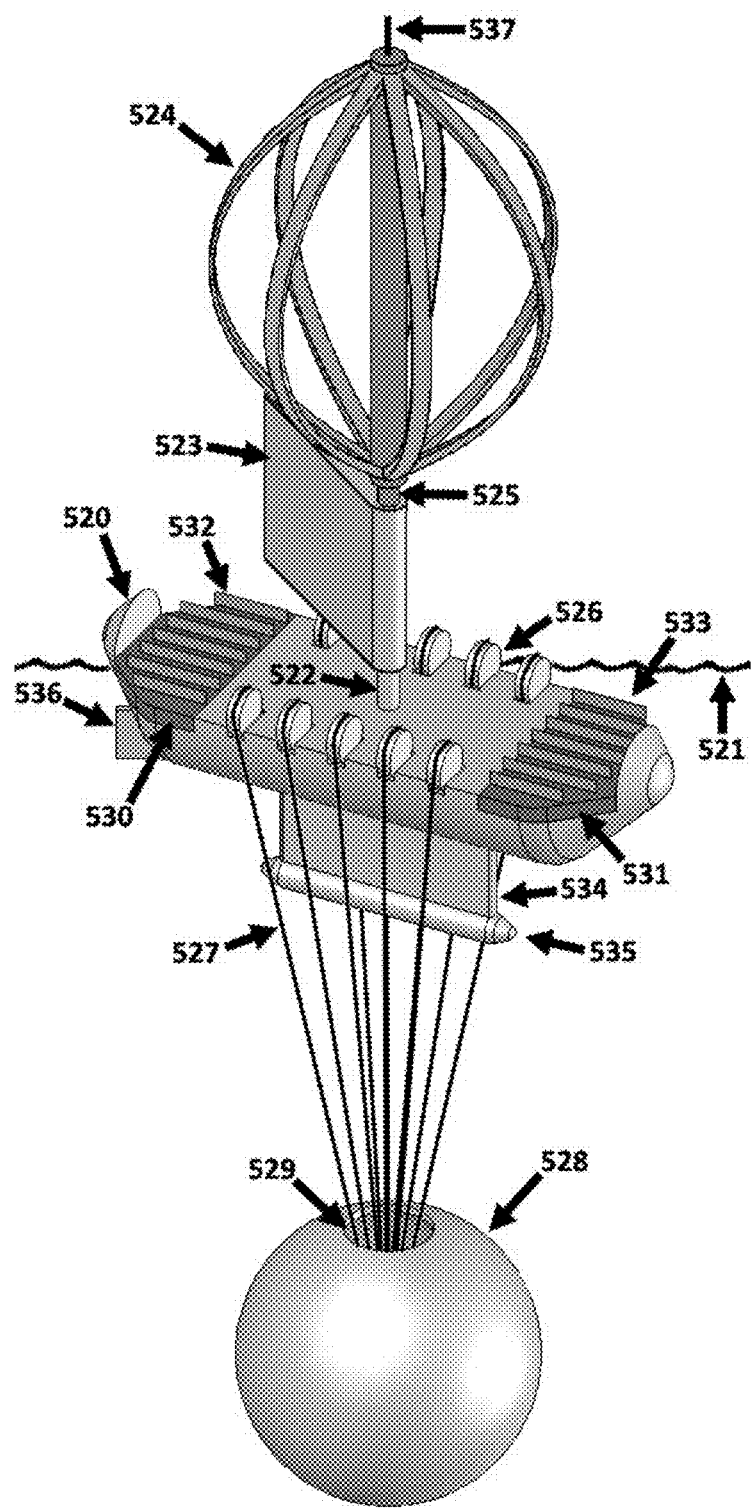
FIG. 39 illustrates a perspective view of a self-propelled wind- and wave-energy converter embodiment of the current disclosure.

FIG. 39 illustrates a perspective view of a self-propelled wind- and wave-energy converter embodiment of the current disclosure, and is representative of one of the many types of self-propelled wind- and wave-energy converters that are incorporated within a self-propelled farm embodiment of the current disclosure.

A buoy 520, flotation module, floating platform, vessel, raft, and/or buoyant object, floats adjacent to the surface 521 of a body of water over which waves and winds pass.

The embodiment illustrated in FIG. 39 extracts energy from both winds and waves.

Rotatably mounted atop a cylindrical pole 522 to which a rigid sail 523 is attached, is a "Darrieus" wind turbine 524. When buffeted by wind, the turbine 524 causes the shaft 525 to which it is attached to rotate, thereby causing the rotation of an extension of that shaft 525 through the hollow cylindrical outer pole 522. The shaft 525 passes out of a lower end of pole 522 and rotatably engages a generator (not shown, and positioned within the buoy 520), thereby causing rotations of the turbine to result in the generation of electrical power.

Attached to, mounted on, and/or incorporated within, the buoy 520 is a plurality of pulleys, e.g. 526, and rotatably connected wave-driven power take-offs (PTOs) and/or electrical power-generation assemblies. PTO-specific cables, e.g. 527, chains, ropes, linkages, and/or flexible connectors, connect each respective PTO to the approximate center of a submerged inertial mass 528. The cables pass through a hole 529 and/or aperture in a top surface of the inertial mass 528.

Mounted on and/or in, attached and/or affixed to, and/or incorporated within, the buoy 520 are two "computing chambers and/or modules" 530 and 531. These are sealed, waterproof chambers inside of which are mounted and/or affixed computing circuits, computing devices, and/or computing resources and/or networks. The computing circuits are energized directly and/or indirectly by electrical power generated by the embodiment's wind- and wave-driven PTOs in response to wave action. Thermally-conductive fins, e.g. 532 and 533, are affixed to top surfaces of the respective computing chambers 530 and 531. These fins expedite the transfer of heat, generated by computers within the computing chambers, to the air above and/or around the embodiment.

The illustrated embodiment 520 contains and/or incorporates a keel 534, with a weighted end 535, that enhances and/or promotes the stability of the device. The embodiment 520 also incorporates a rigid sail 523 that is able to impart thrust to the device when driven by wind. The amount of thrust being adjustable and/or able to be optimized through the rotation of the sail to an optimal angle with respect to the wind direction. A rudder 536 allows the device's control system (e.g. one or more computers that control the behavior of the device) to steer the embodiment when it is moved in response to wind passing over its rigid sail 523.

Facilitating communications with remote networks, computers, stations, operators, drones, planes, ships, etc., is a radio, and its antenna 537, which enables direct communications with complementary terrestrial radios, satellites, other converters, etc. Antenna 537 mounted on, and/or affixed to, the top of the rigid sail 523, and its operably connected communications system, allows the device to send and receive electronic, and/or electromagnetic, transmissions, preferably encrypted. In some embodiments, this antenna exchanges digital data with a satellite through which the device can exchange data, programs, instructions, status information, and/or other digital values, with a remote computer and/or server. In some embodiments, this antenna exchanges digital data with other similar devices, e.g. allowing them to be joined and/or connected within a virtual computing network that includes and/or extends to at least a portion of the computers on the so-linked devices.

Figure 40:
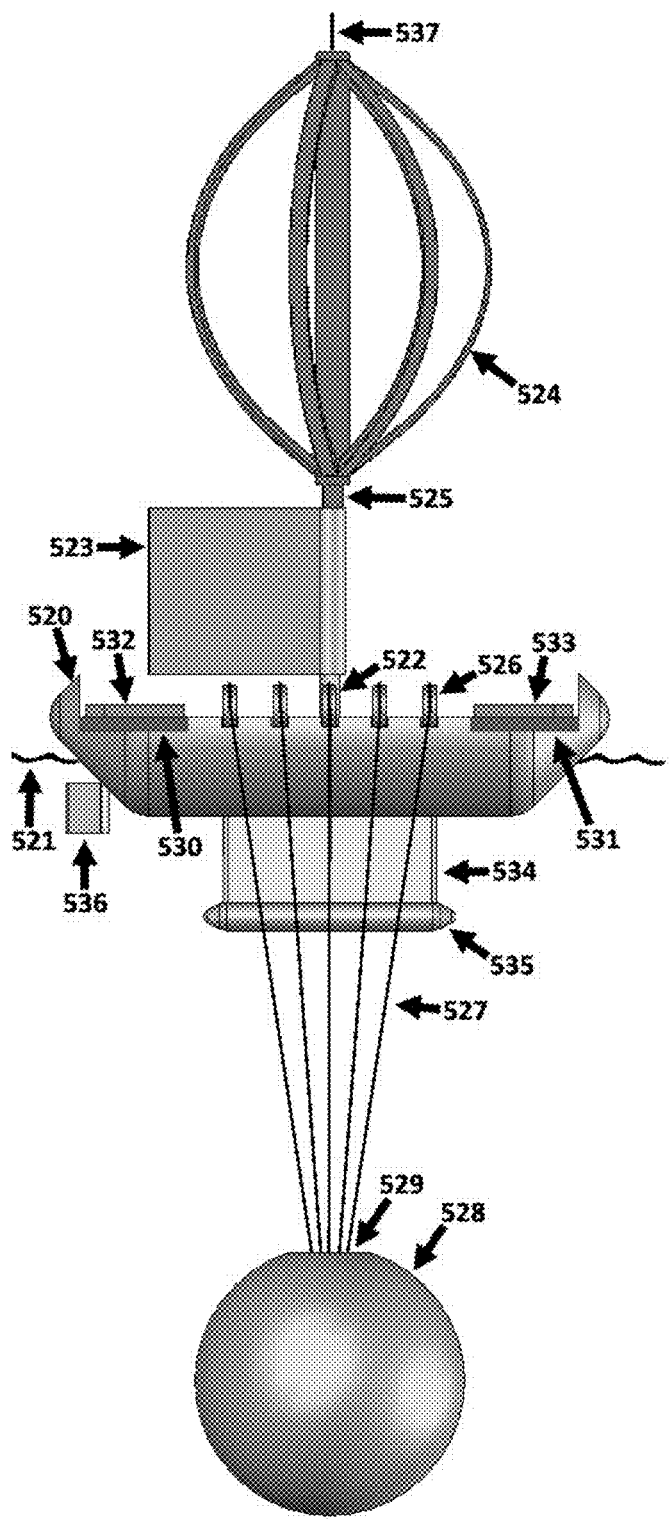
FIG. 40 illustrates a side view of the same self-propelled wind- and wave-energy converter embodiment illustrated and discussed in relation to FIG. 39.

FIG. 40 illustrates a side view of the same self-propelled wind- and wave-energy converter embodiment illustrated and discussed in relation to FIG. 39.

Figure 41:
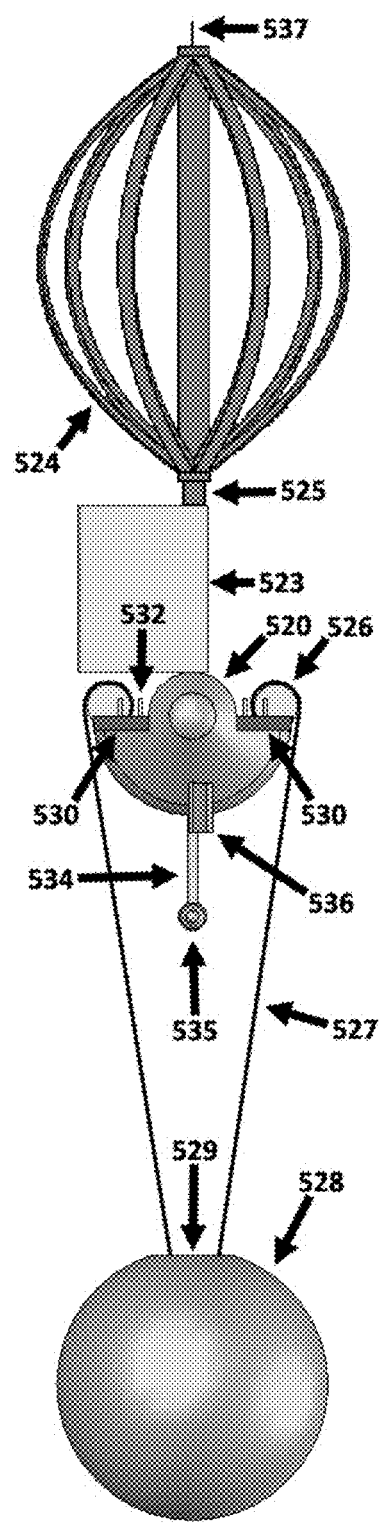
FIG. 41 illustrates a back-side view of the same self-propelled wind- and wave-energy converter embodiment illustrated and discussed in relation to FIGS. 39 and 40.

FIG. 41 illustrates a back-side view of the same self-propelled wind- and wave-energy converter embodiment illustrated and discussed in relation to FIGS. 39 and 40.

Figure 42:
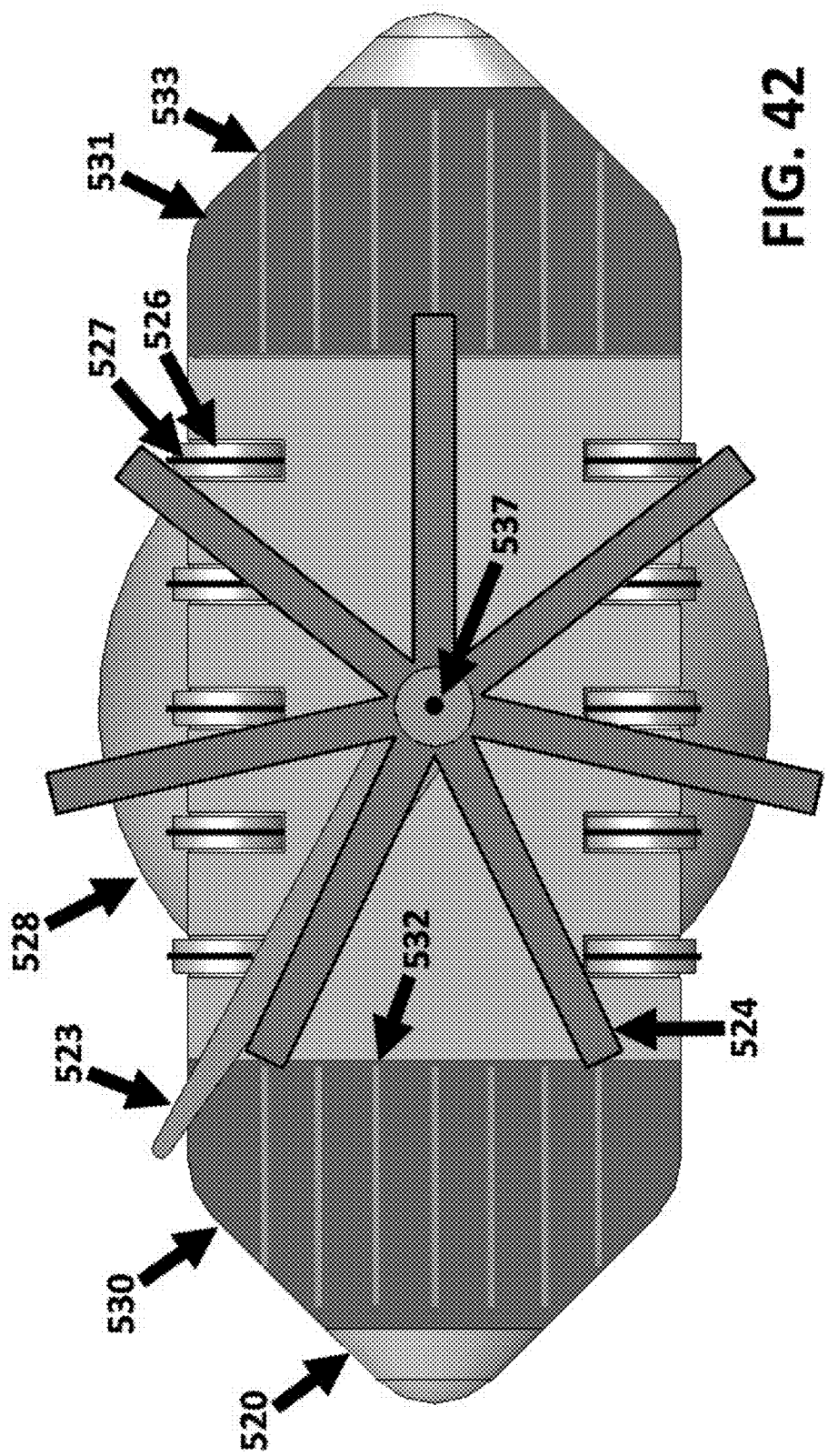
FIG. 42 illustrates a top-down view of the same self-propelled wind- and wave-energy converter embodiment illustrated and discussed in relation to FIGS. 39-41.

FIG. 42 illustrates a top-down view of the same self-propelled wind- and wave-energy converter embodiment illustrated and discussed in relation to FIGS. 39-41.

Figure 43:
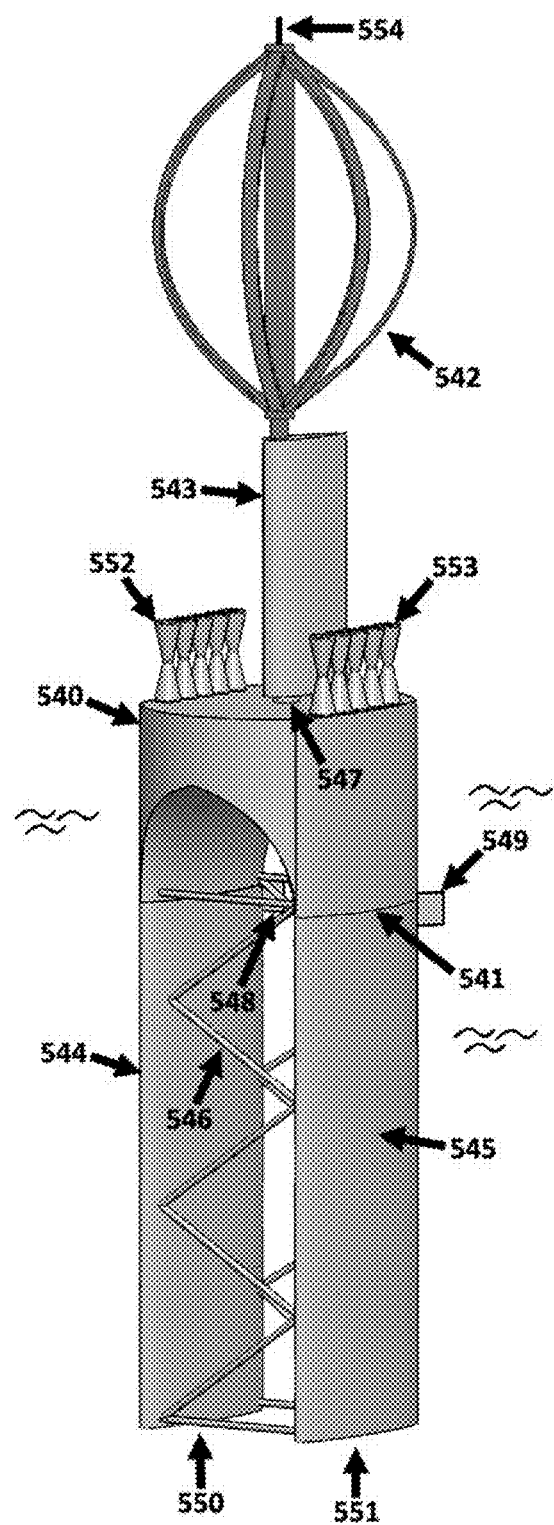
FIG. 43 illustrates a perspective view of a self-propelled wind- and wave-energy converter embodiment of the current disclosure.

FIG. 43 illustrates a perspective view of a self-propelled wind- and wave-energy converter embodiment of the current disclosure, and is representative of one of the many types of self-propelled wind- and wave-energy converters that are incorporated within a self-propelled farm embodiment of the current disclosure. The illustrated embodiment extracts energy from both the heave of waves and the blowing of winds.

The embodiment 540 floats adjacent to an upper surface 541 of a body of water over which winds and waves pass. It 540 incorporates a Darrieus-type wind turbine 542 atop a rigid sail 543, with the turbine and the sail sharing coaxial concentric shafts. When air blows through the turbine causing it to rotate then a rotatably connected generator positioned within the buoy 540 is energized and produces electrical power.

The embodiment also extracts energy from heave of waves by means of two arrays of oscillating water columns (OWCs) embedded within opposing and parallel airfoil shaped keels 544 and 545. A rigid sail 543 rotatably connected to the top of the device provides wind-driven propulsion, and a rudder moveably connected to each keel permits the device to be steered.

Opposing pairs of airfoil-shaped keels 544 and 545 support a platform 540 at an upper portion of the device and typically above the water line 541. The keels are supported by a crossing assemblage of truss struts, e.g., 546.

The rigid sail 543 is attached to a shaft 547 which is rotated by a mechanism within the upper portion 540 of the device. Rudders 548 and 549 allow the thrust imparted to the device by the rigid sail 543 to be controlled and used to direct the motion of the device to desired angular orientations and/or geospatial coordinates.

Within each keel 544 and 545 are five OWC tubes whose lower mouths open to the sea at the bottoms 550 and 551 of their respective keels 544 and 545. And, whose respective upper mouths 552 and 553 are constricted, forming Venturi nozzles in the throats of which are turbines and rotatably-connected generators.

As a wave approaches, the pressure that would raise the level of water in each OWC tube increases. However, due to the significant length of each tube, and the significant volume and inertia of the water therein, the increase in the force pushing the water in each tube upwards results in only a relatively small acceleration of that water. However, in the same way that the inertia of the water in the OWC tubes resists its rise, it also resists its descent. And, by the time the wave has passed, and the device has begun to descend, in concert with the falling water level outside the device, the inertia of the water in the tube delays that water's reversal of its prior rising, with the result that the water continues rising, albeit while decelerating. The continued rise of the level of the water in the OWC tubes, coupled with the downward acceleration of the nozzles through which the compressed air must exit, causes the air at the top of each tube to be compressed, causing compressed air to flow out of each Venturi nozzle, and through each nozzle turbine, and to energize the generator rotatably coupled to each nozzle turbine.

Each OWC tube behaves in a manner, and by physics, similar to those that characterize "water hammers" and "hydraulic rams."

One-way valves (e.g., check valves) allow air to freely enter an OWC when the pressure in that tube falls, and is reduced to a pressure less than that of the air outside the OWC tube. However, when the pressure of the air in an OWC tube exceeds that of the outside pressure, then the air in that tube is forced to exit the tube through the tube's respective Venturi nozzle and intra-throat turbine, energizing the turbine's coupled generator, and generating electrical power in the process.

A portion of the electrical power generated by the generators energized by the turbines inside the OWC Venturi nozzles is used to energize and/or power computational circuits positioned within the upper portion 540 of the device.

At least a portion of the electrical power generated by the embodiment's wind turbine and OWCs in response to the blowing of winds and the passage of waves, respectively, is communicated to, and/or consumed by, a plurality, plethora, network, assembly, collection, and/or array, of computational devices, circuits, devices, machines, and/or modules, positioned within the buoy 540, so as to provide at least a portion of those computational devices with the electrical power required to enable them to execute, process, complete, and/or compute, various computational tasks communicated to them from an external source, network, computer, customer, client, application, and/or system.

An antenna 554 mounted on, and/or affixed to, the top of the wind turbine 542, in conjunction with the antenna's associated communications devices, electronics, modules, and/or systems, allows the device to send and receive electronic, and/or electromagnetic, transmissions, preferably encrypted. This antenna exchanges digital data with a satellite through which the device can exchange data, programs, instructions, status information, and/or other digital values, with a remote computer and/or server. This antenna also provides the embodiment with the ability to exchange digital data with other similar embodiments, e.g. allowing them to be joined and/or connected within a virtual computing network that includes and/or extends to at least a portion of the computers on the so-linked devices. This antenna also provides the embodiment with the ability to exchange digital data with aerial drones, surface water drones (automated boats), underwater drones, and/or any other remote data relaying and/or daisy-chaining device, system, module, and/or circuit.

Using the antenna and its associated electronics, the embodiment receives programs, data, and/or computational tasks, from a remote server, computer, network, client, customer, command-and-control system, and/or ground station, which it sends to at least one of the embodiment's onboard computational devices, circuits, systems, networks, and/or modules. After receiving a program, data, and/or computational task, at least one of the embodiment's onboard computational devices, circuits, systems, networks, and/or modules, runs the program(s), processes the data, and/or executes, processes, and/or completes, the specified computational task(s).

After the program has been run, the data processed, and/or the computational task completed, the embodiment uses its antenna and its associated electronics, to transmit the results of the processing to a remote server, computer, network, client, customer, command-and-control system, and/or ground station.

Figure 44:
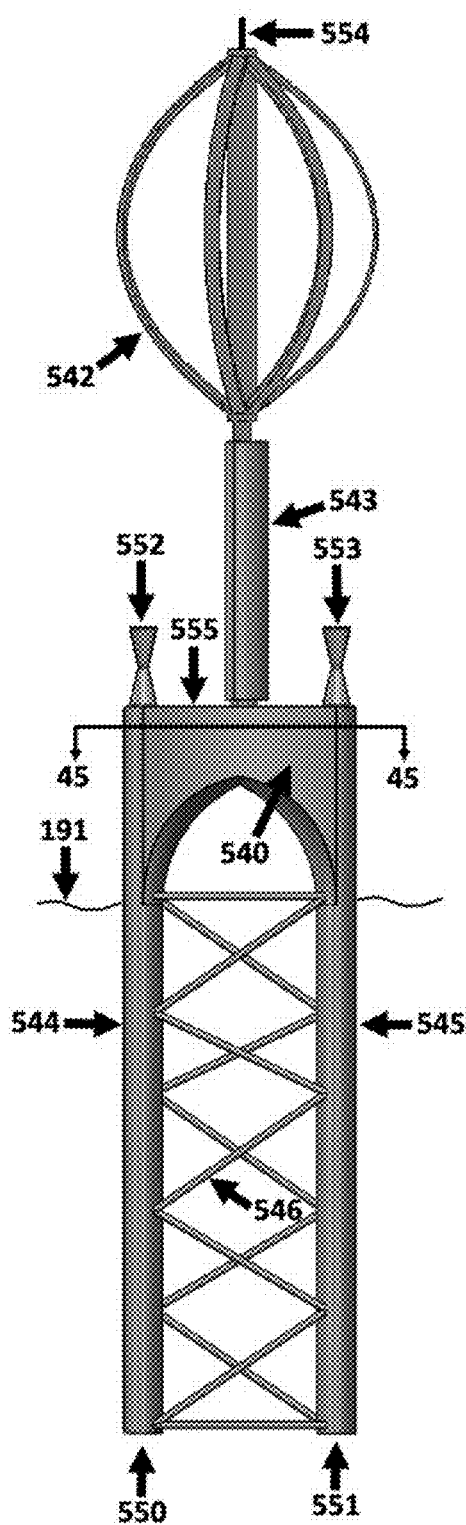
FIG. 44 illustrates a front view of the same self-propelled wind- and wave-energy converter embodiment illustrated and discussed in relation to FIG. 43.

FIG. 44 illustrates a front view of the same self-propelled wind- and wave-energy converter embodiment illustrated and discussed in relation to FIG. 43.

Rigid sail 543 is rotatably connected to an upper surface 555 of the embodiment. Computational devices are positioned within the upper portion 540 of the device and are powered, at least in part, by electrical power generated by the wind turbine 542 and the OWC turbines positioned within the throats of the Venturi nozzles, e.g., 552 and 553, atop the OWC tubes.

Figure 45:
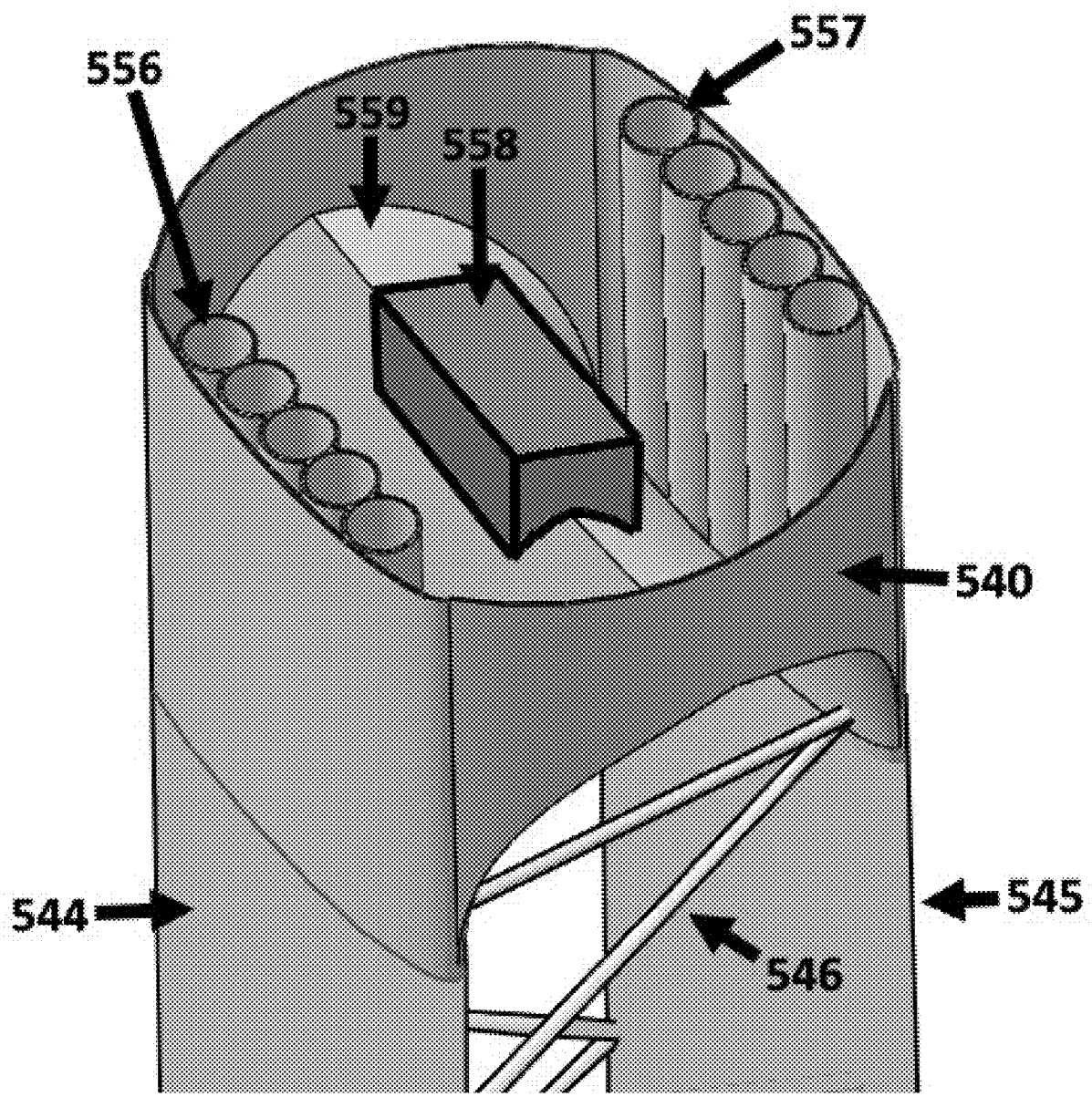
FIG. 45 illustrates a top-down sectional view of the same self-propelled wind- and wave-energy converter embodiment illustrated and discussed in relation to FIGS. 43 and 44.

FIG. 45 illustrates a top-down sectional view of the same self-propelled wind- and wave-energy converter embodiment illustrated and discussed in relation to FIGS. 43 and 44, wherein the horizontal section plane is specified in FIG. 44 and the section is taken across line 45-45.

Each keel 544 and 545 contains five OWC tubes, e.g., 206 and 207, upper ends of which are constricted (not visible above the section plane) so as to form Venturi nozzles.

Inside the upper portion 190 of the device is a chamber containing computational equipment inside an enclosure 208 which is conductively cooled through the lower wall 209 of the chamber inside the upper portion 190 of the device.

Computational modules are mounted against an interior wall of the hollow buoy 190. At least a portion of the heat generated by the computational circuits 208 is conductively communicated through the adjacent and/or common surfaces of the circuits 208 and the buoy 209, and thereafter transferred, at least in part, into the surrounding air beneath the upper portion of the embodiment 190, thereby passively cooling those circuits and avoiding the need to expend additional energy to achieve that cooling.

In an embodiment similar to the one illustrated and discussed in relation to FIGS. 36-38, the module 208 generates a chemical (e.g., hydrogen) and stores at least a portion of the generated chemical inside tanks positioned within the upper portion 190 of the device.

Figure 46:
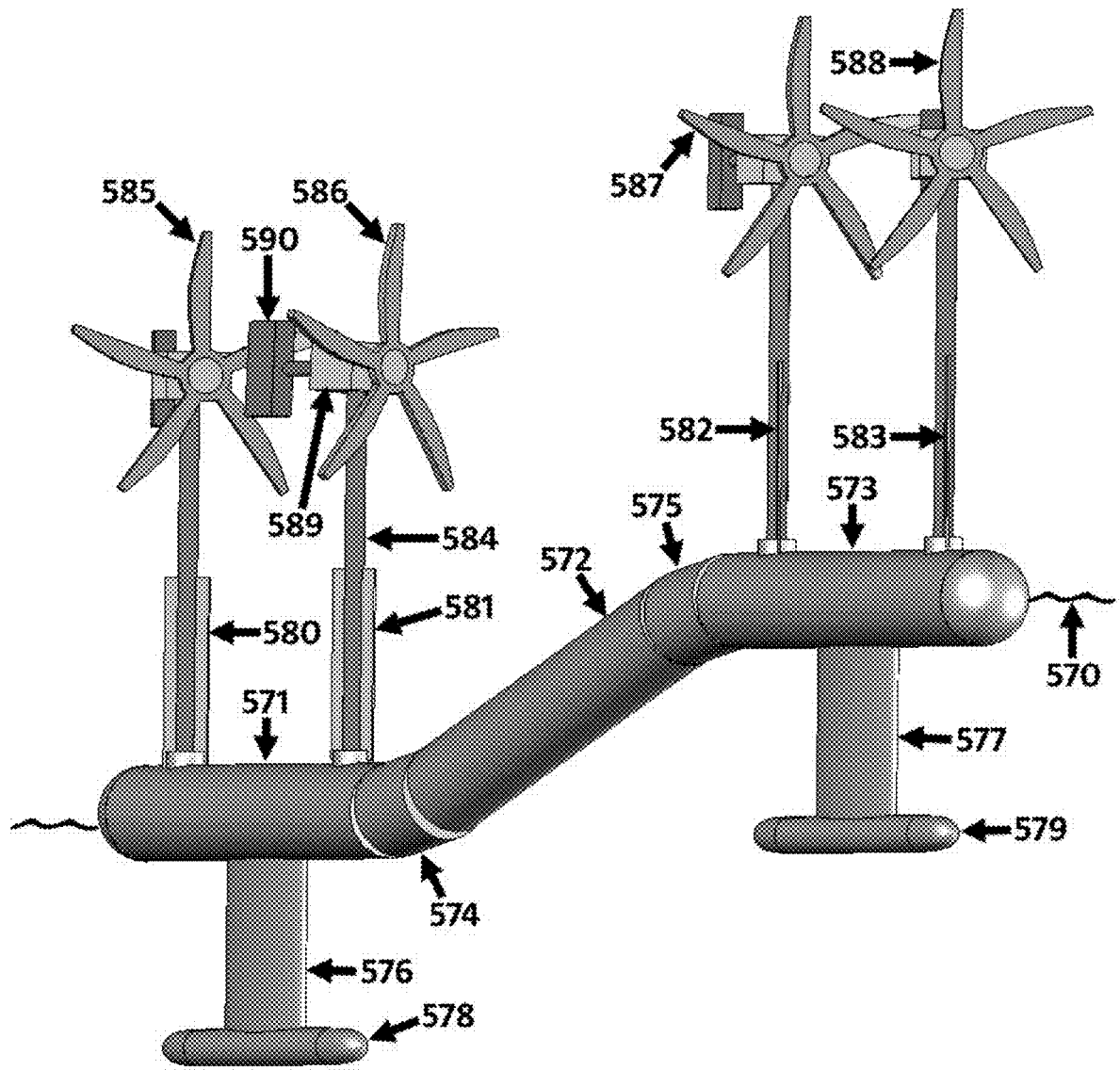
FIG. 46 illustrates a side perspective view of a self-propelled wind- and wave-energy converter embodiment of the current disclosure.

FIG. 46 illustrates a side perspective view of a self-propelled wind- and wave-energy converter embodiment of the current disclosure, and is representative of one of the many types of self-propelled wave-energy converters that are incorporated within a self-propelled farm embodiment of the current disclosure. The illustrated embodiment extracts energy from both the heave and surge of waves and the blowing of winds.

The illustrated embodiment floats adjacent to an upper surface 570 of a body of water over which waves and winds pass. The embodiment is comprised of hinged tubular sections 571-575, three 571-573 of which are relatively long and contain computational equipment and circuits, and two 574-575 contain wave-driven power take-offs that utilize and/or incorporate hydraulic rams that convert the flexing between the adjacent tubular sections into pressurized hydraulic fluid, which then flows through at least one hydraulic generator, thereby generating electrical power. End segments 571 and 573 incorporate keels 576 and 577, respectively, each of which is connected to respective weights 578 and 579.

Atop the two end segments 571 and 573 are rigid vertical panels 580-583 that are rotatably connected to their respective tubular segments 571 and 573. By varying the angles of the panels with respect to the direction of the prevailing wind, lateral and forward thrusts may be applied to each respective segment. The application of dissimilar thrust vectors to each end segment allows the entire to move forward as well as execute turns.

Rotatably connected to the top of each of the poles, e.g., 584, or struts, that provide structural support for each respective rigid vertical panel, e.g., 581, are respective horizontal-axis wind turbines 585-588. Each turbine, e.g., 586, is connected to, and rotates, a shaft that is supported by a respective nacelle, e.g., 589, and rotatably connects to the rotor of a respective generator positioned inside the nacelle. Each nacelle, and thereby each turbine, is able to rotate about the longitudinal axis of its respective pole, and a wind vane, e.g., 590, attached to each nacelle, tends to cause each turbine to be turned into the prevailing wind such that the rotational axis of each turbine is parallel to the direction of the wind, thereby maximizing the cross-sectional (and/or "swept area") of each turbine and the resulting energy captured from the wind.

The blades of each turbine may be feathered in order to minimize and/or control the amount of energy captured from the wind.

At least a portion of the electrical power generated by the embodiment's wind turbines and wave-driven power take-offs is communicated to, and/or consumed by, a plurality, plethora, network, assembly, collection, and/or array, of computational devices, circuits, devices, machines, and/or modules, positioned within each of the relatively long tubular sections 571-573 of the embodiment, so as to provide at least a portion of those computational devices with the electrical power required to enable them to execute, process, complete, and/or compute, various computational tasks communicated to them from an external source, network, computer, customer, client, application, and/or system.

At least a portion of the heat generated by the computational modules sequestered within the long tubular sections 571-573 is convectively and/or conductively communicated through the walls of those tubular sections, and thereafter transferred, at least in part, into the surrounding water 165, thereby passively cooling those circuits and avoiding the need to expend additional energy to achieve that cooling.

Figure 47:
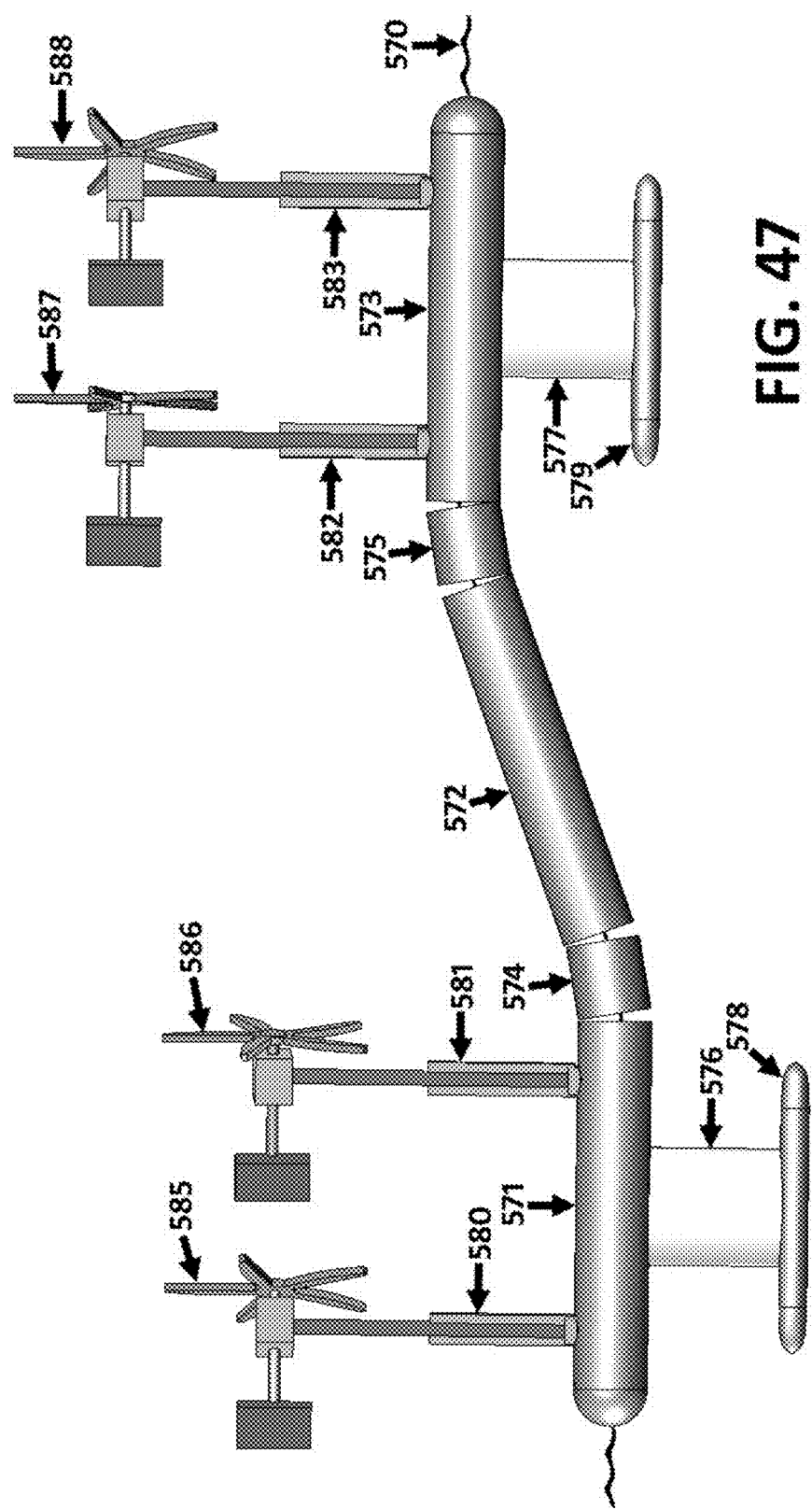
FIG. 47 illustrates a side view of the same self-propelled wind- and wave-energy converter embodiment illustrated in FIG. 46.

FIG. 47 illustrates a side view of the same self-propelled wind- and wave-energy converter embodiment illustrated in FIG. 46.

Figure 48:
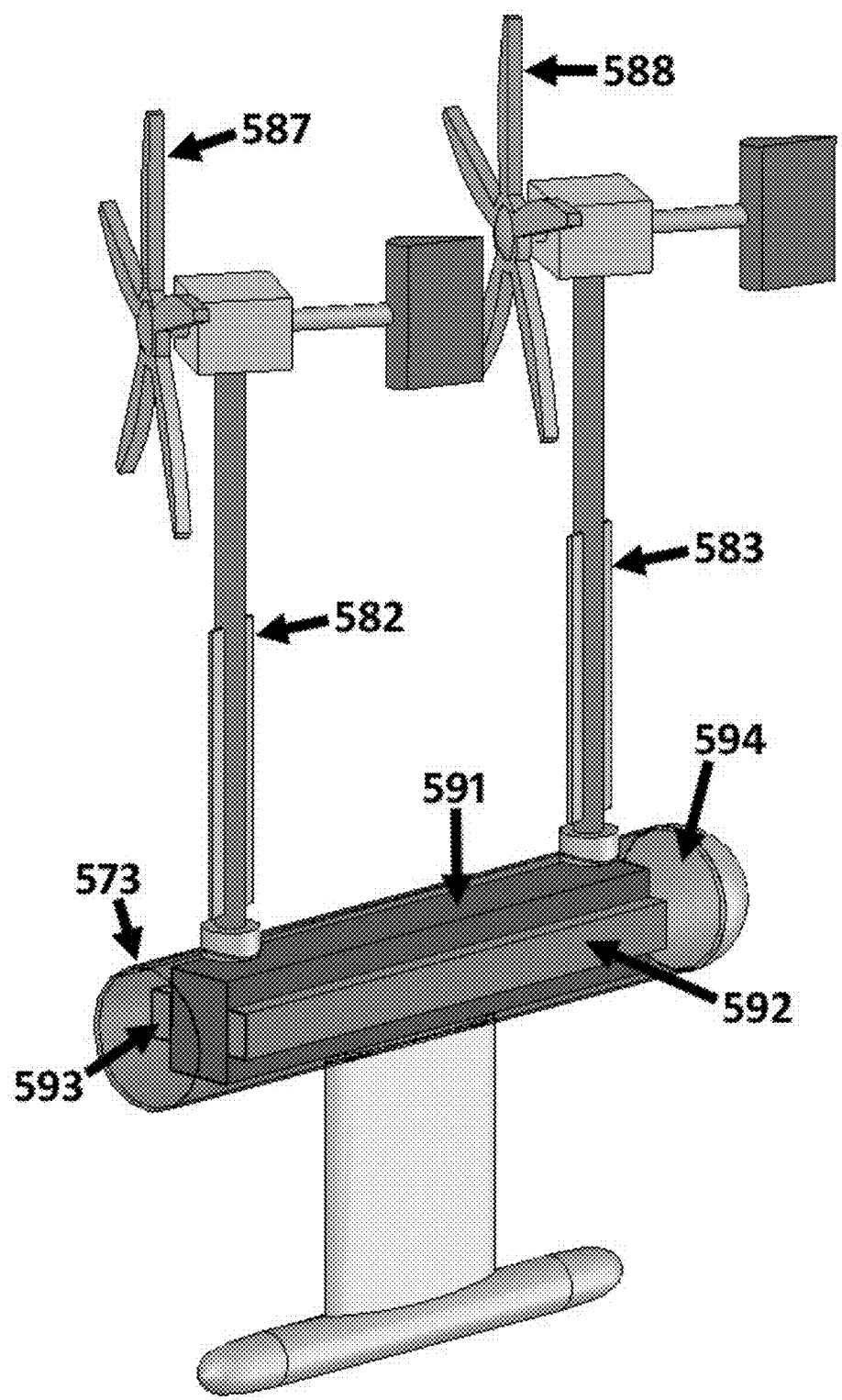
FIG. 48 illustrates a side perspective view of one of the long tubular sections characterizing the same self-propelled wind- and wave-energy converter embodiment illustrated in FIGS. 46 and 47.

FIG. 48 illustrates a side perspective view of one of the long tubular sections characterizing the same self-propelled wind- and wave-energy converter embodiment illustrated in FIGS. 46 and 47. The outer cylindrical wall of the illustrated tubular section is drawn as semi-transparent in order to better reveal the inside of the tube.

Tubular section 573 contains a computational module 591 comprising arrays, racks, and/or assemblies, of computing devices, computing circuits, computers, and/or computational equipment and/or resources, as well as energy-storage modules 592 and 593, units, and/or assemblies.

At least a portion of the electrical power generated in response to wind and/or wave action on the device is stored in energy-storage modules 592 and 593, units, and/or assemblies, positioned within the tubular section 573 and which may include, but is not limited to: batteries, capacitors, and/or chemical fuel (e.g. hydrogen) generators and storage mechanisms.

The computational module 591 comprising arrays, racks, and/or assemblies, of computing devices, computing circuits, computers, and/or computational equipment and/or resources mounted and/or positioned within tubular section 573 are energized, at least in part, by at least a portion of the electrical power generated by the wind turbines and the hydraulic PTOs in the shorter tubular sections (574 and 575 in FIGS. 46 and 47).

In some embodiments, the space 594 within the tubular section 573 in which the computers are affixed and operate is filled with air. In other embodiments, it is filled with a heat-conductive fluid, and/or a phase-change material. The heat transferred from the computers, as they consume electrical power, to the air or liquid surrounding them, is thereafter transferred to the thermally-conductive walls, and/or a portion thereof, which transfers it to the water (570 in FIGS. 46 and 47) on which the device floats. This process of heat transfer efficiently and passively cools the computers and energy modules.

Figure 49:
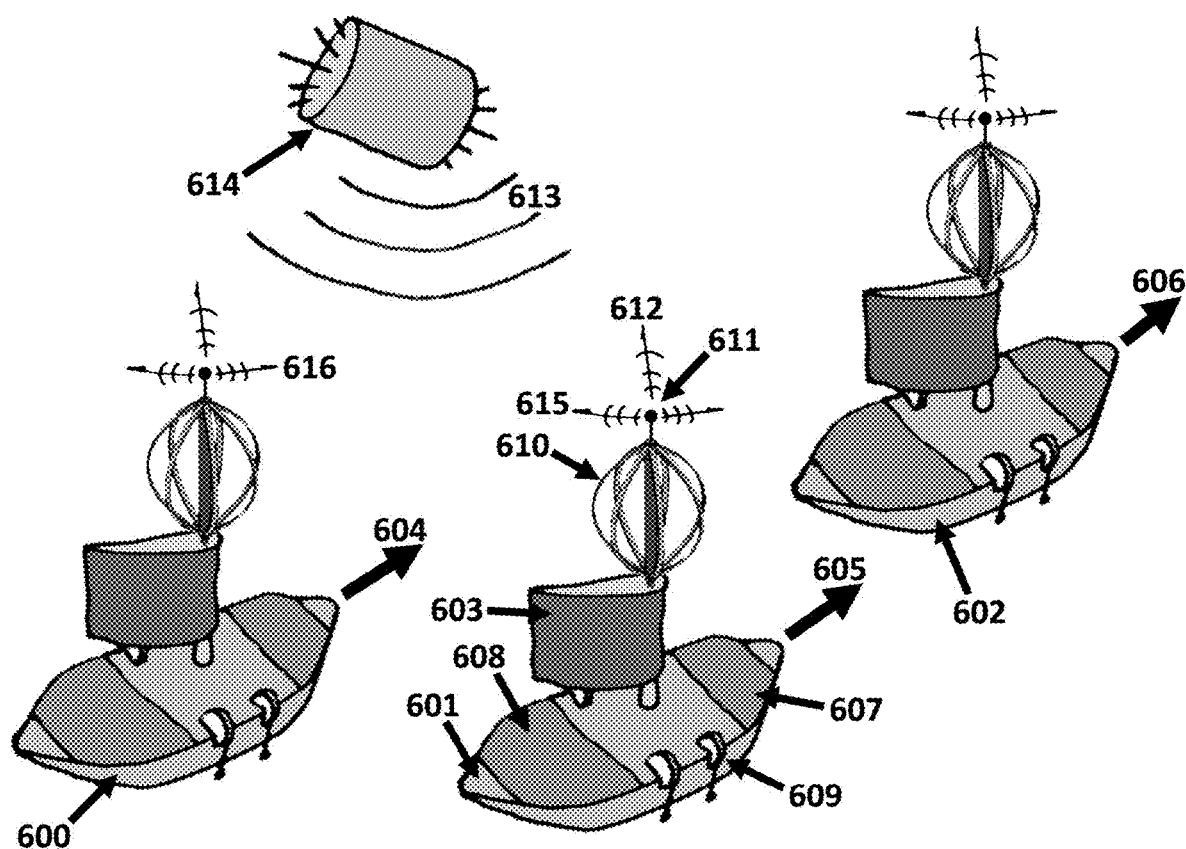
FIG. 49 illustrates a perspective view of three self-propelled wind- and wave-energy converter embodiments of the current disclosure as they sail in approximate formation across the surface of a body of water.

FIG. 49 illustrates a perspective view of three self-propelled wind- and wave-energy converter embodiments 600-602 of the current disclosure as they sail in approximate formation across the surface of a body of water. These embodiments are similar to the one illustrated and discussed in relation to FIGS. 39-42.

Rigid sails, e.g. 603, allow the devices to generate device-specific thrust 604-606 when buffeted by winds of sufficient speed and stability. In sealed chambers and/or enclosures, e.g. 607 and 608, affixed to their upper surfaces are enclosed computing devices that are energized, at least in part, by electrical power generated by the wave-driven PTOs, e.g. 609, and/or the Darrieus wind turbines, e.g., 610, on each device. These computing devices perform calculations, at least some of which provided by, and/or coordinated with, a remote source and/or server. Each device has an antenna, e.g. 611, and an operably connected communications system, with and/or through which it exchanges, e.g. 612 and 613, data with a satellite 614, and/or with each other, e.g. 615 and 616.

In some embodiments, a single device, e.g. 601, transmits 612 data to, and/or receives 613 data from, the satellite 614. This single "interface device" 601 then communicates data received from the satellite 614 to, e.g. 615, each of the other devices, e.g. 600. This interface device 601 also receives, e.g. 616, the data from each other device, e.g. 600, and may transmit some or all of that data, perhaps after synthesis with data supplied by other devices, to the satellite from where it is forwarded to a remote source and/or server.

By traveling and/or moving together, and/or in approximate formation, i.e., while maintaining sufficient proximity to one another to permit device-to-device communications, self-propelled wind and/or wave conversion devices can share information and leverage the equipment, features, capabilities, and/or options, inherent in at least one of their group (i.e., but not available in all). This also provides some redundancy in case a piece of equipment, feature, capability, or option, on one or more devices fails.

By traveling and/or moving such self-propelled devices can seek out and extract energy from optimal winds and/or waves, whereas devices moored to the seafloor would only have access to the wind and/or waves at their unchanging position in the sea.

Figure 50:
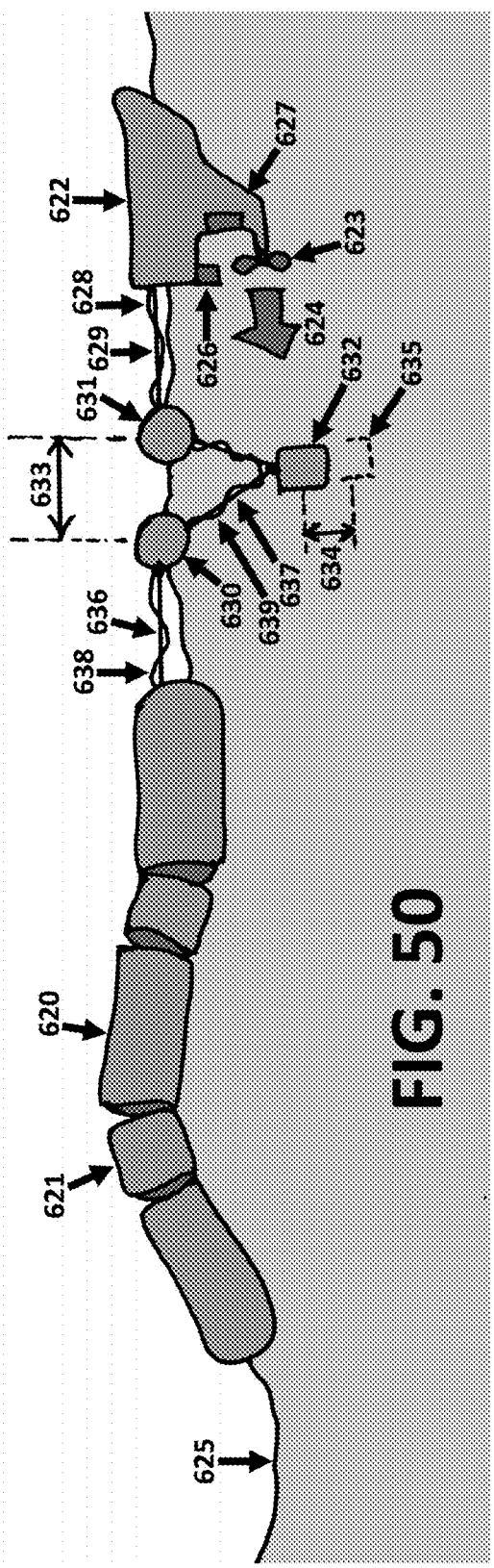
FIG. 50 illustrates a side perspective view of an alternate wave-energy converter.

FIG. 50 illustrates a side perspective view of a wave-energy converter embodiment of the current disclosure. The embodiment is comprised of a "snake-like" portion that incorporates three relatively long tubes, e.g., 620, and two intermediate connecting shorter tubes, e.g., 621, in which wave-driven flexing of the hinged joints between the long and short tubes generates electrical power (e.g., similar to a "Pelamis" device). The embodiment also comprises a dedicated "surface" propulsive vessel, boat, or drone uses at least a portion of the electrical power generated by the snake-like portion, e.g., 620-621, to drive a propeller thereby generating thrust that pulls the entire embodiment across an upper surface 625 of the body of water on which the embodiment floats.

The propulsive drone 622 includes a rudder 626 and a keel 627. The propulsive drone receives electrical power and control signals via an electrical and data cable 628. The propulsive drone communicates forward thrust to the rest of the embodiment via mooring cable 629.

Propulsive thrusts generated by the drone 622 are buffered and/or smoothed by an intermediate "elasticity module" comprised of two floats 630 and 631 that are tethered to, and mutually support a suspended weight 632. When drone 622 applies a forward thrust to the embodiment, mooring cable 629 pulls forward float 631, while the inertia of the snake-like portion, e.g., 620-621, holds back float 630. The separation 633 of floats 630 and 631, raises 634 weight 632 from a resting position 635, thereby imparting to the weight gravitational potential energy and creating a "restoring force" that tends to pull the floats 630 and 631 back together and thereby allow the weight 632 to return to its resting depth at 635.

Propulsive forces are transmitted from the drone 622 to the snake-like portion, e.g., 620-621, by mooring cables, e.g., 636, 637, and 629, that flexibly connect the two. Attached to those mooring cables is a cable, e.g., 638, 639, and 628, that conducts electrical power, thereby providing the drone with energy, and control signals and other data, thereby allowing the snake-like portion, e.g., 620-621, and the drone 622 to exchange data, signals, messages, and/or other information.

In the illustrated embodiment, the wave-energy converting portion of the embodiment, e.g., 620-621, is propelled by a tethered drone that, like the snake-like portion, floats adjacent to an upper surface of the body of water on which both the snake-like portion and the drone float. An intermediate elasticity module buffers the forward-backward oscillations that complicate the delivery of forward thrust to the embodiment due to the oscillations of the waves on which the embodiment floats.

Figure 51:
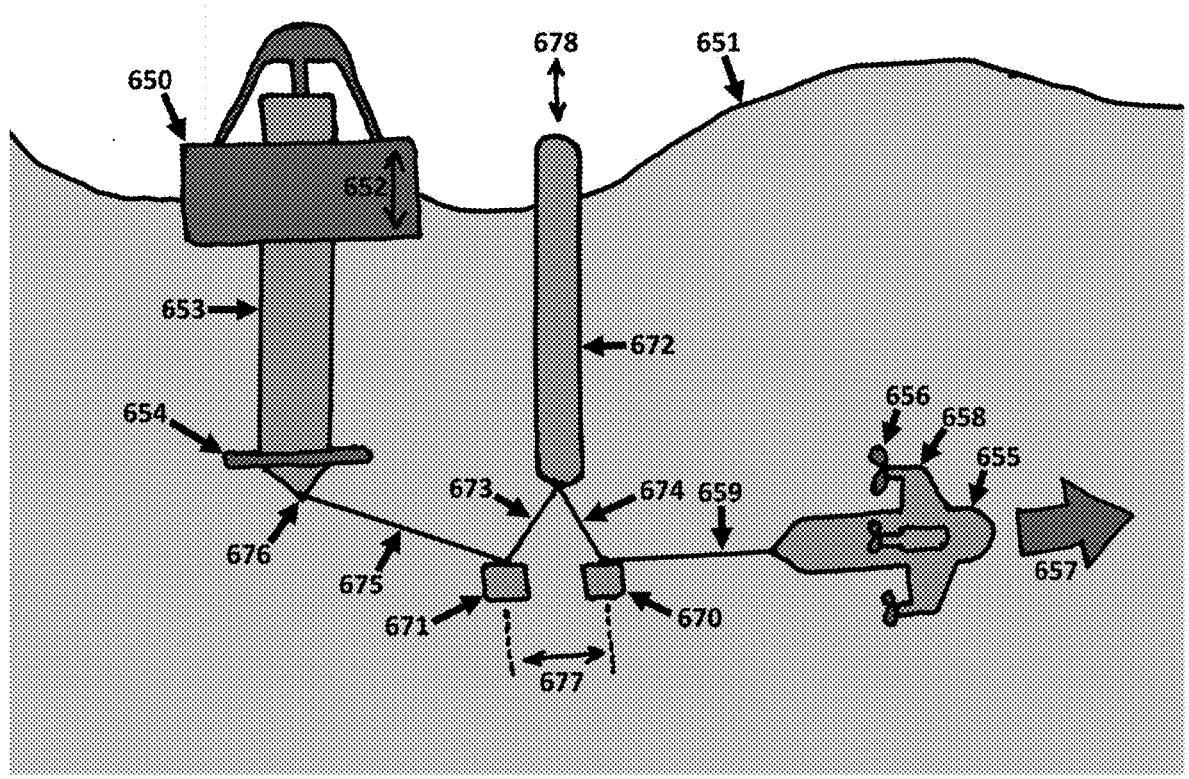
FIG. 51 illustrates a side perspective view of an alternate wave energy converter.

FIG. 51 illustrates a side view of a wave-energy converter embodiment of the current disclosure. The embodiment is comprised of a "PowerBuoy-like" portion in which an outer coaxial "donut-shaped" buoyant ring 650 moves up and down in response to passing waves 651 while laterally constrained by a central spar buoy 653 that is significantly less responsive to passing waves. The oscillations 652 of the outer ring 650 relative to the less-wave-responsive central spar buoy 653 creates a net vertical oscillation 652 from which electrical power is generated. A heave plate 654 attached to a lower portion of the spar buoy 653 further reduces the responsivity and oscillations of the spar buoy 653 relative to wave motions.

The embodiment incorporates an underwater propulsive drone 655 whose electrically-powered propellers, e.g., 656, thrust 657 that tends to pull the embodiment in a "forward" lateral direction 657. The drone's propellers are mounted on radial fins, e.g., 658. Only three of the drone's propellers are visible in the illustration, with one additional propeller being hidden behind the drone such that the drone's four propellers and radial fins are arranged radially about the longitudinal axis of the drone and angularly spaced by approximately 90 degrees from each neighboring propeller and radial fin. The variation or adjustment of the rotational frequencies of the drone's four propellers such that at least two propellers spin at different angular velocities permits the drone to change its direction of motion, and/or the magnitude of its thrust, thereby controlling the course and, at least to a degree, the speed of the embodiment's motion.

The drone imparts forward thrusts to a mooring cable 659 that pulls one side and/or element 670 of an elasticity module comprised of two weights 670 and 671 that are both suspended by and/or beneath a spar buy 672 by respective mooring cables 673 and 674. Another side and/or element 671 of the elasticity module is connected to the wave-energy conversion portion 650, 653, 654 of the embodiment by a mooring cable 675 that is connected 676 to the wave-energy conversion portion at a connection point 676 at a lower end of the conversion portion.

When the underwater drone 655 applies a forward thrust 657 to the embodiment, a weight 670 of the elasticity module is pulled away 677 from its complementary weight 671, thereby creating a gap which pulls down 678 spar buoy 672 thereby storing gravitational/buoyant potential energy in the module. As drone 655 pulls apart the weights 670 and 671 of the elasticity module, one of those weights 671 pulls forward the wave-energy conversion portion 653 of the embodiment. The elasticity module smoothes the wave-induced oscillations in the relative positions of the drone and the wave-energy conversion portion, oscillations that if left unsmoothed might damage the drone, the wave-energy conversion portion, and/or the mooring cable connecting them.

Mooring cable(s) 675, 673, 674, and 659 provide not only structural and/or mooring support, they also incorporate electrical and data cables therethrough providing some of the electrical power generated by the wave-energy conversion portion 653 to the drone which the drone then consumes while generating thrust, and facilitating the exchange of data, signals, messages, and/or other information, between the drone and the wave-energy conversion portion of the embodiment.

Figure 52:
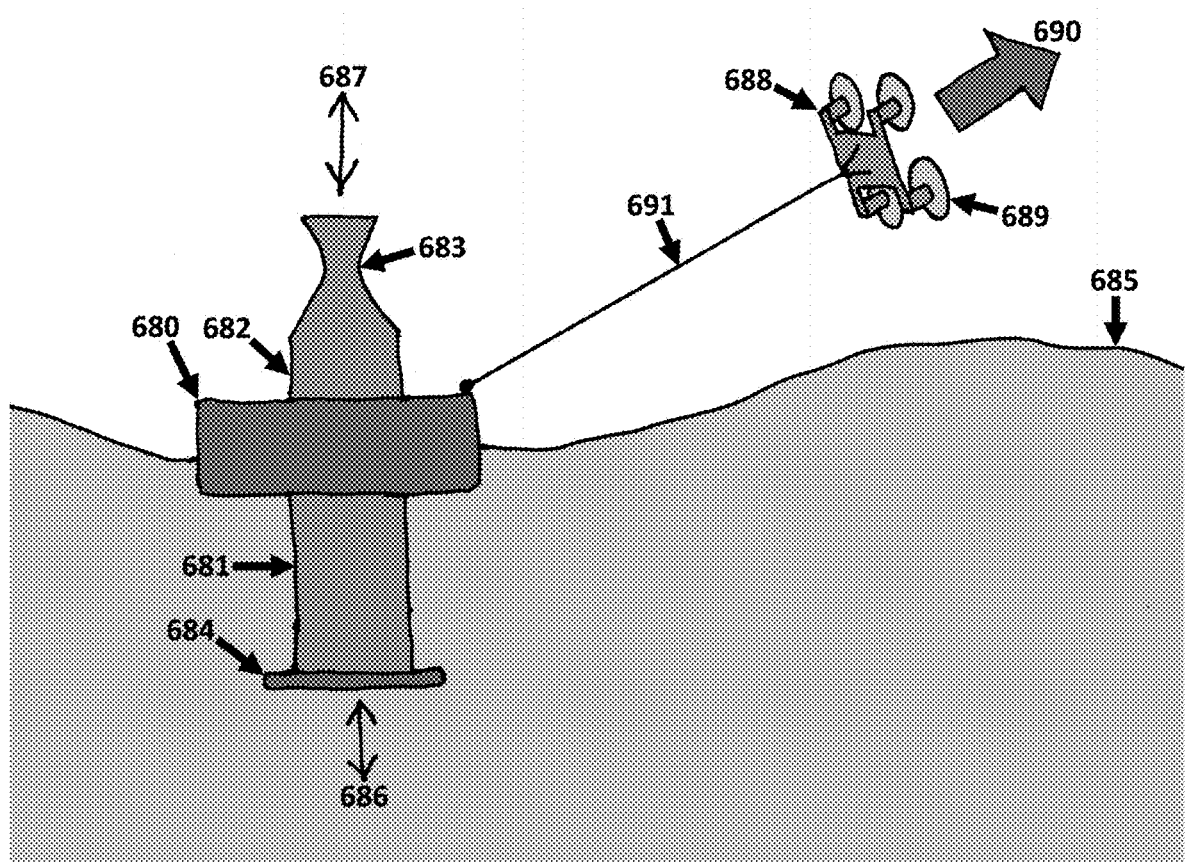
FIG. 52 illustrates a side perspective view of an alternate wave energy converter.

FIG. 52 illustrates a side view of a wave-energy converter embodiment of the current disclosure. The embodiment is comprised of an "oscillating water column" (OWC) portion in which a buoy 680 with an attached tube 681-683 and a heave plate 684. The heave plate reduces the responsivity of the buoy and tube to passing waves 685. Therefore, as the level of the water 685 changes in response to passing waves water flows 686 into and out of the relatively stationary (or at least more positionally vertically stable). The flow of water into and out of the tube 681-683 changes the volume of the air trapped in the upper portion 682-683 of the tube, thereby causing air to flow 687 into and out of the upper portion of the tube. A turbine (not visible) positioned within the constricted portion 683 of the tube, where the speed of the flowing air is amplified, is driven by the flowing air and in turn energizes a generator and generates electrical power.

The embodiment includes an unmanned aerial vehicle (UAV) 688 that incorporates four propellers, e.g., 689, that generate "forward" thrust 690. The thrust generated by the UAV 688 is transmitted to the OWC 682 by cable 691. Cable 691 also incorporates an electrical cable that transmits at least a portion of the electrical power generated by the OWC to the UAV thereby providing it with at least a portion of the energy that it expends generating thrust. Cable 691 also incorporates a data cable or channel through which it exchanges data, signals, commands, messages, and/or other information, with the UAV.

The variation or adjustment of the rotational frequencies of the UAV's four propellers such that at least two propellers spin at different angular velocities permits the UAV to change its direction of motion and/or the magnitude of its thrust, thereby controlling the course and, at least to a degree, the speed of the embodiment's motion.

We claim:

1. An expandable, buoyant, physically and electrically interconnected network of wave energy converters, comprising:
    an automated system for controlling a location of the network of wave energy converters without user intervention;
    a plurality of physically and electrically connected wave energy converters for generating electrical power from wave motion, said plurality of physically and electrically connected wave energy converters being self-propelled;
    a plurality of flexible linkages connecting the plurality of physically and electrically connected wave energy converters while preserving approximate positions of the connected converters relative to the other converters, the linkages further carrying electricity conducting cables to transfer electrical power between connected wave energy converters; and
    propulsion units in communication with the automated system for moving the network of wave energy converters in response to commands from the automated system, the propulsion units powered by a portion of electrical energy generated by the wave energy converters; and
    a plurality of computers on the network of wave energy converters, the plurality of computers powered by a portion of electrical energy generated by the wave energy converters;
    wherein the network of wave energy converters transfers electrical energy among the converters as the network of wave energy converters is expanded, and during migration of the network across a body of water.

2. The expandable, buoyant, physically and electrically interconnected network of wave energy converters of claim 1, wherein the propulsion units are submerged autonomous underwater vehicles.

3. The expandable, buoyant, physically and electrically interconnected network of wave energy converters of claim 1, further comprising a control module for determining a desired course and speed of the network, and the control system controlling the propulsion units to obtain and hold the desired course and speed of the network.

* * * * *